United States Patent
Henry et al.

(10) Patent No.: US 11,703,864 B2
(45) Date of Patent: Jul. 18, 2023

(54) SCANNING STRUCTURES VIA UNMANNED AERIAL VEHICLES

(71) Applicant: SKYDIO, INC., Redwood City, CA (US)

(72) Inventors: Peter Henry, San Francisco, CA (US); Jack Zhu, San Francisco, CA (US); Brian Richman, San Francisco, CA (US); Harrison Zheng, Palo Alto, CA (US); Hayk Martirosyan, San Francisco, CA (US); Matthew Donahoe, Redwood City, CA (US); Abraham Bachrach, Redwood City, CA (US); Adam Bry, Redwood City, CA (US); Ryan David Kennedy, Redwood City, CA (US); Himel Mondal, Windsor (CA); Quentin Allen Wah Yen Delepine, Cupertino, CA (US)

(73) Assignee: SKYDIO, INC., Redwood City, CA (US)

( * ) Notice: Subject to any disclaimer, the term of this patent is extended or adjusted under 35 U.S.C. 154(b) by 230 days.

(21) Appl. No.: 17/174,583

(22) Filed: Feb. 12, 2021

(65) Prior Publication Data
US 2021/0263488 A1    Aug. 26, 2021

Related U.S. Application Data

(60) Provisional application No. 63/050,860, filed on Jul. 12, 2020, provisional application No. 62/976,231, filed on Feb. 13, 2020.

(51) Int. Cl.
*G06T 17/00* (2006.01)
*G05D 1/00* (2006.01)
(Continued)

(52) U.S. Cl.
CPC ......... *G05D 1/0094* (2013.01); *B64C 39/024* (2013.01); *B64D 31/06* (2013.01);
(Continued)

(58) Field of Classification Search
CPC .... G05D 1/0094; G05D 1/0088; G05D 1/101; G06T 7/55; G06T 7/74; G06T 17/00;
(Continued)

(56) References Cited

U.S. PATENT DOCUMENTS

| 10,121,117 | B1 | 11/2018 | Boyd et al. |
| 2016/0292869 | A1 | 10/2016 | Hammond et al. |
| 2019/0228573 | A1 | 7/2019 | Sen et al. |

FOREIGN PATENT DOCUMENTS

| KR | 1020190013176 | 2/2019 |
| WO | 2019222798 | 11/2019 |

OTHER PUBLICATIONS

Brian Curless, et al., "A Volumetric Method for Building Complex Models from Range Images", Proc. SIGGRAPH 1996, Computer Science Department, Stanford University, Stanford, CA 94305; http://www-graphics.stanford.edu.
(Continued)

*Primary Examiner* — Mathew Franklin Gordon
(74) *Attorney, Agent, or Firm* — Mattingly & Malur, PC

(57) ABSTRACT

In some examples, an unmanned aerial vehicle (UAV) may determine, based on a three-dimensional (3D) model including a plurality of points corresponding to a scan target, a scan plan for scanning at least a portion of the scan target. For instance, the scan plan may include a plurality of poses for the UAV to assume to capture images of the scan target. The UAV may capture with one or more image sensors, one or more images of the scan target from one or more poses of the plurality of poses. Further, the UAV may determine an update to the 3D model based at least in part on the one or
(Continued)

more images. Additionally, the UAV may update the scan plan based at least in part on the update to the 3D model.

20 Claims, 23 Drawing Sheets

(51) Int. Cl.
| | |
|---|---|
| G05B 17/02 | (2006.01) |
| B64C 39/02 | (2023.01) |
| B64D 47/08 | (2006.01) |
| B64D 31/06 | (2006.01) |
| G05D 1/10 | (2006.01) |
| G06T 7/55 | (2017.01) |
| G06T 7/73 | (2017.01) |
| G05B 13/02 | (2006.01) |
| G06T 19/20 | (2011.01) |
| H04N 23/60 | (2023.01) |
| H04N 23/90 | (2023.01) |
| H04N 23/695 | (2023.01) |
| G06V 20/13 | (2022.01) |
| G06V 20/64 | (2022.01) |
| B64U 10/13 | (2023.01) |
| B64U 101/30 | (2023.01) |

(52) U.S. Cl.
CPC ......... *B64D 47/08* (2013.01); *G05B 13/0265* (2013.01); *G05B 17/02* (2013.01); *G05D 1/0088* (2013.01); *G05D 1/101* (2013.01); *G06T 7/55* (2017.01); *G06T 7/74* (2017.01); *G06T 17/00* (2013.01); *G06T 19/20* (2013.01); *G06V 20/13* (2022.01); *G06V 20/64* (2022.01); *H04N 23/64* (2023.01); *H04N 23/695* (2023.01); *H04N 23/90* (2023.01); *B64U 10/13* (2023.01); *B64U 2101/30* (2023.01); *G06T 2207/10032* (2013.01); *G06T 2207/20221* (2013.01); *G06T 2219/2004* (2013.01)

(58) Field of Classification Search
CPC .......... G06T 19/20; G06T 2207/10032; G06T 2207/20221; G06T 2219/2004; G06V 20/64; G06V 20/13; H04N 23/695; H04N 23/90; H04N 23/64; B64C 39/024; B64D 31/06; B64D 47/08; G05B 13/0265; G05B 17/02; B64U 10/13; B64U 2101/30
See application file for complete search history.

(56) References Cited

OTHER PUBLICATIONS

Richard A. Newcombe, et al., "KinectFusion: Real-Time Dense Surface Mapping and Tracking" 2011 10th IEEE International Symposium of Mixed and Augmented Reality.
Richard A. Newcombe, "KinectFusion: Real-Time Dense Surface Mapping and Tracking" PhD. work from Imperial College, London, Microsoft Research, Cambridge, May 6, 2013.
International Search Report and Written Opinion of PCT/US2021/017795, dated Nov. 12, 2021.

SCANNING STRUCTURES VIA UNMANNED AERIAL VEHICLES

CROSS-REFERENCES TO RELATED APPLICATIONS

This application claims the benefit of U.S. Provisional Patent Application No. 63/050,860, filed Jul. 12, 2020, and U.S. Provisional Patent Application No. 62/976,231, filed Feb. 13, 2020, both of which are incorporated by reference herein.

BACKGROUND

Unmanned aerial vehicles (UAVs), sometimes referred to as "drones", typically are operated manually by a human using a controller to remotely control the movements of the UAV. For example, such UAVs may be used to capture images from vantage points that would otherwise be difficult to reach. More recently, UAVs with some automated flight and autonomous control features have become available. For example, some automated image capture capabilities have been implemented on UAVs, such as for recording video while following a recognized user or a user carrying a beacon device as the user moves through an environment.

BRIEF DESCRIPTION OF THE DRAWINGS

The detailed description is set forth with reference to the accompanying figures. In the figures, the leftmost digit(s) of a reference number identifies the figure in which the reference number first appears. The use of the same reference numbers in different figures indicates similar or identical items or features.

DESCRIPTION

Figure 1:
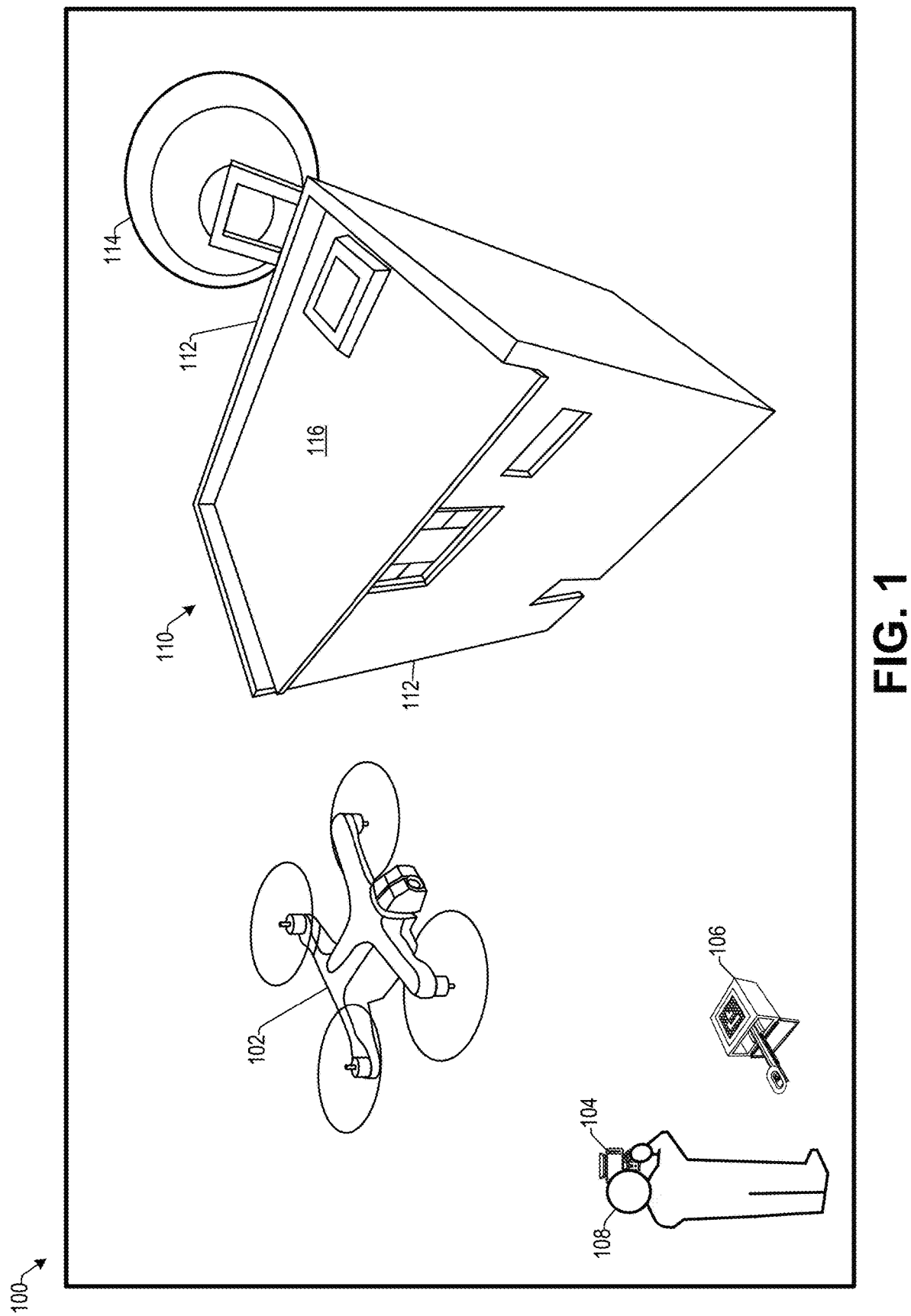
FIG. 1 illustrates an example system able to perform autonomous scanning using an unmanned aerial vehicle (UAV) according to some implementations.

Some implementations herein are directed to techniques and arrangements for configuring a UAV to scan three-dimensional (3D) scan targets, such as structures, buildings, bridges, pipelines, equipment, objects, sites, geographic features, crime scenes, accident scenes, or any other scan target that may be designated by an operator. For instance, the UAV may be configurable to scan a scan target autonomously based on an initial indication of the scan target. The scanning may include, capturing a series of images, capturing video, or the like, of the indicated scan target in a thorough and repeatable manner, such as for generating a high resolution 3D map or other 3D model of the scan target. The UAV herein is able to capture scan targets having complex geometries, such as scan targets that include concavities, irregular and oblique surfaces, openings, asymmetric geometries, and so forth.

The examples herein provide advantages over conventional systems, such as by enabling real-time in-flight scan target 3D reconstruction to automate full dynamic exploration and capture of the scan target. The 3D reconstruction may include capturing the appearance of the scan target based on range data, such as by initially generating a lower-resolution 3D model from an initial rough scan. In some cases, the lower-resolution 3D model may be iteratively refined and the accuracy improved as additional scanning is performed to enable 3D reconstruction of a higher-resolution 3D model in real time (which may include near real time) while the UAV is performing the scan of the scan target.

In addition, the UAV may autonomously provide reliable framing of scanned images by maintaining a desired distance and orientation with respect to a section of the surface of the scan target being imaged that is more consistent than can be achieved by manual control of the UAV. Furthermore, examples herein may enable robust detection of relevant features of a scan target using machine learning or human review of the scan data. In addition, the scan data may be reviewed while the UAV is still on site, thereby reducing the likelihood of having to return to the site to perform additional scanning. Further, the examples herein reduce the need for human operator attention and may perform faster comprehensive scans of large scan targets than is possible using conventional systems.

In some examples, one or more processors onboard the UAV may be configured by program code or other executable instructions to perform the autonomous operations described herein. For instance, the one or more processors may control and navigate the UAV along an intended flight path, while also performing other operations described herein, such as generating or accessing an initial lower-resolution 3D model of the scan target, determining a scan plan for scanning the scan target based on the lower-resolution 3D model, and navigating the UAV to a series of poses to perform scanning to carry out the scan plan while also avoiding obstacles. The 3D model and/or the scan plan may be updated in real time during the scanning based on information acquired by the UAV during the scanning. Additionally, or alternatively, in some cases, one or more processors on a remote UAV controller or other computing device that is remote from the UAV and in communication with the UAV may provide instructions to the one or more processors onboard the UAV, such as for assisting with or managing one or more of the operations discussed above. For instance, the initial 3D model may be received by the UAV from the controller or another computing device remote from the UAV.

To begin a scan, a user may initially indicate a scan target of interest, or a portion of the scan target, such as by making one or more inputs to a user interface presented on a UAV controller or other computing device able to provide the input information to the UAV. As one example, the user may navigate the UAV manually to obtain an image of the scan target, and the user may create a polygon or other 2D shape on the image of the scan target presented in the user interface to indicate the scan target. Alternatively, the user may specify a bounding volume around an image of the scan target in the user interface, may specify a bounding area, such as based on three or more reference points (e.g., "pillars"), or may use any of a plurality of other techniques, as discussed additionally below, to specify the scan target to the UAV. For instance, the user may employ a technique for specifying the scan target that is determined to be most effective from among the plurality of different available techniques, such as depending on the shape of the scan target, the type of scan desired, the portions of the target desired to be scanned, and the like.

Based on the received indication of the scan target, the UAV may correlate the indication of the scan target with one or more positions in space, such as based on correlation with a global coordinate system, or through various other techniques. For instance, the UAV may autonomously perform an initial coarse scan of the scan target, e.g., by performing the initial scan with a range sensor or the like to determine a location of the scan target surface in 3D space. As one example, the range sensor may be provided by one or more onboard image sensors, such as an array of lower-resolution image sensors configured for stereoscopic imaging or monocular imaging. For instance, the plurality of lower-resolution image sensors may also be used by the UAV for autonomous navigation and may provide one or more lower-resolution images (e.g., as opposed to images from a higher-resolution image sensor that may also be included onboard the UAV) that are able to be used to determine a distance to surfaces of the scan target. In case that the image sensors include a stereo imaging pair, the UAV may use input from the image sensors to determine a parallax between two related images of the same surface for determining a relative distance from the UAV to one or more points on the surface of the scan target. Alternatively, images from one or more monovision image sensors may be used, and/or various other distance sensing and 3D reconstruction techniques may be used, for determining the locations of surfaces of the scan target in 3D space, such as relative to a known location of the UAV.

As one example, the UAV may fuse range images from stereo pair navigation image sensors and/or wide baseline MultiView Stereo (MVS) image sensor pairs into a volumetric Truncated Signed Distance Function (TSDF) which can generate a surface mesh estimate including a plurality of points. The initial TSDF-generated 3D model may typically be of lower resolution and lower accuracy because the scan target has not yet been imaged or otherwise scanned from sufficiently diverse points of view and/or sufficiently close distance for higher accuracy. For example, the closer the UAV flies to a surface, the more accurate the estimate of the surface location and surface shape becomes in the TSDF as the UAV continues to fuse stereo pair range images into the 3D model.

The initial scan may be performed by the UAV to generate a lower-resolution 3D model of the scan target at a first resolution. During the initial scan, the UAV may autonomously image one or more surfaces of the scan target and may dynamically improve the completeness and/or resolution of the lower-resolution 3D model in real time while flying proximate to the scan target and performing the initial scan. For instance, the lower-resolution 3D model may include a set of a plurality of points in 3D space, with the locations of the points corresponding to surfaces of the scan target determined based on the distance measurements. Further, the UAV may determine respective normals to some or all of the points in the set of points included in the lower-resolution 3D model. As one example, each normal may be a virtual line extending outward from the surface on which a respective point is located at an approximately normal (perpendicular) angle relative to the surface of the scan target on which the respective point is located. For instance, each respective normal may extend outward from the respective point of the 3D model approximately perpendicular to a plane corresponding to the surface of the scan target in an area surrounding the respective point.

The UAV may use the lower-resolution 3D model to generate and dynamically update a scan plan for scanning the scan target. For instance, scanning may include capturing a series of images of the scan target from a desired distance (e.g., a specified ground sampling distance) between the UAV and the scan target for capturing images of a desired resolution, detail, or the like. As one example, determining the scan plan may include determining a sequence of poses for the UAV to assume to for performing a higher-resolution scan than the initial scan for capture a plurality of images of the scan target at a specified distance from the scan target surface using one or more image sensors onboard the UAV. As one example, based on the lower-resolution 3D model, the one or more processors onboard the UAV may determine the scan plan for the scan target while the UAV is in flight following generation of at least a portion of the lower-resolution 3D model. Determining the scan plan may include determining or taking into consideration various parameters, such as how many images to capture, a distance from the scan target at which to capture each image, an orientation (pose) of the UAV with respect to the scan target when capturing each image (e.g., a maximum angle away from normal to still consider a point covered), a resolution and quality of the images to be captured, an amount of overlap of the captured images, a maximum UAV flight speed, maximum lateral and angular speeds while capturing images, other camera settings, such as exposure, white balance, and so forth.

Based on the scan plan and the lower-resolution 3D model, the UAV may use real-time 3D reconstruction to scan the scan target and update the 3D model and/or the scan plan. In some examples, the scanning may be performed without requiring satellite positioning information, without requiring the lower-resolution 3D model or other data about the scan target to be provided from sources external to the UAV, and without requiring a network connection. The UAV may navigate autonomously to capture images of the scan target based on the sequence of poses determined for the scan plan. For instance, based on the scan plan, the images may be captured without gaps while the UAV flies from one pose to the next while also avoiding collisions with any obstacles that may be present.

During the scanning of the scan target based on the scan plan, the UAV may use 3D reconstruction techniques to generate a higher-resolution version of the 3D model of the scan target in real time, such as based at least in part on the newly scanned images and/or newly detected distances to surface points. In the examples herein, "real time" may include "near-real time", and may refer to performing the referred to processing or other operation(s) without undue delay, e.g., as the processing capacity becomes available while the UAV is still in flight following capture of one or more images and/or while the UAV is performing the scan, traveling between poses, or the like. The actual amount of time for the real-time processing herein may vary based on the processing capabilities of the onboard processor(s) and other components of the UAV. For example, the UAVs herein may perform any of a plurality of different processing operations in real time, such as updating a 3D model, updating a scan plan, building a higher-resolution 3D model, such as a point cloud model and/or a 3D mesh model and so forth.

In some examples, the scanning and 3D reconstruction may be performed iteratively such as by adding points or other information to the 3D model during scanning of the scan target according to the initial scan plan, and dynamically updating the initial scan plan based on the information added to the 3D model. As mentioned above, the UAV may use an initial course scan to generate an initial lower-resolution 3D model, such as based on the TSDF. The UAV may determine an initial scan plan for covering the surface(s) corresponding to the lower-resolution 3D model defined by the TSDF. The UAV may fly some or all of the initial scan plan while continuing to update the 3D model by fusing additional range images as the UAV navigates the scan plan. Accordingly, the quality of the surface information for the 3D model continues to be improved as the UAV navigates the scan plan and additional surfaces may be discovered. In some cases, as the 3D model is iteratively improved in accuracy, coverage, etc., the scan plan may be dynamically updated such as to cover new points that were previously not included or to avoid obstructions that were not previously identified, or the like.

A higher-resolution 3D model and the images captured during the scan may be exported from the UAV to one or more computing devices, such as over a network connection, e.g., after the UAV has completed the scan of the scan target or has completed at least a portion of the scan. In some examples, the captured images and/or the 3D model information may be sent wirelessly to the controller or to another computing device as the scan of the scan target is taking place. In some cases, the images may be correlated with the points on the 3D model for enabling creation of a textured 3D model of the scan target, such as for viewing the scan target, performing high-resolution inspection of the scan target, or any of various other observation, computer graphic, or computer modeling operations that may be performed with such a high-resolution 3D model and high-resolution images.

For discussion purposes, some example implementations are described for configuring a UAV to autonomously scan a scan target, such as for capturing images and/or generating a 3D model. However, implementations herein are not limited to the particular examples provided, and may be extended to other types of scan targets, other types of vehicles, other types of 3D reconstruction techniques, other types of flight planning techniques, other types of scanning techniques, other types of modeling techniques, and so forth, as will be apparent to those of skill in the art in light of the disclosure herein.

FIG. 1 illustrates an example system 100 able to perform autonomous scanning using an unmanned aerial vehicle (UAV) 102 according to some implementations. In this example, the UAV 102 is viewed from above at an oblique angle. In addition to the UAV 102, the system 100 may also include a controller 104 and a docking station 106. The controller 104 may be controlled by a user 108 and may be configured to communicate with the UAV 102 via a wireless communication link. As several examples, the controller 104 may communicate via various types of radio protocols and frequencies, such as via a Wi-Fi network, a BLUETOOTH® radio link, direct ISM band communications, or any other suitable radio communications. For example, 900 MHz, 2.4 GHz and 5.8 GHz are the most common radio frequencies used for two-way communications with UAVs, but implementations herein are not limited to any particular communication types, frequencies, or protocols.

The controller 104 may receive images (which may include video or still images) from the UAV 102 via the wireless communication link. In addition, the user 108 may cause the controller 104 to issue commands to the UAV 102, e.g., "takeoff", "land", "follow", such as via one or more virtual controls presented in a graphical user interface (GUI) and/or via one or more physical controls, such as joysticks, buttons, or the like, included on the controller 104 (not visible in FIG. 1). Accordingly, the controller 104 may allow the user 108 to make manual control inputs in addition to the virtual control inputs enabled via the GUI presented on a display associated with the controller 104. An example controller 104 is illustrated and discussed additionally below with respect to FIG. 6.

The controller 104 may enable the user 108 to input commands related to conducting an autonomous or semi-autonomous scan of a scan target, such as the scan target 110 in this example. In some implementations, the controller 104 may include a mobile device, a tablet, or a laptop running software configured to communicate with and control the UAV 102. For example, the system 100 may be used to carry out or otherwise implement one of more of the processes discussed below with respect to FIGS. 15-23.

As discussed additionally below, e.g., with respect to FIGS. 2-4, the UAV 102 includes a propulsion mechanism, one or more image sensors, and one or more processors able to control the propulsion mechanism for navigating the UAV 102, such as based on input from the one or more image sensors and/or other sensors onboard the UAV 102. In some examples, the user 108 may use the controller 104 to select or otherwise indicate to the UAV 102 that the scan target 110 is a scan target for executing a scan. Examples of selecting a scan target (or scan target portion) are discussed additionally below, e.g., with respect to FIGS. 6-10. The controller 104 may further be used to indicate a specified scanning distance (e.g., a ground sampling distance (GSD)) from the surface of the scan target 110 for the scan to be performed, as well as other scan parameters as discussed additionally below.

The processor(s) onboard the UAV 102 may be configured by executable instructions to generate, receive, or otherwise access a lower-resolution 3D model (not shown in FIG. 1) of the scan target 110 for performing the scan of the scan target 110. In this example, the scan target 110 includes a building 112 having a dish antenna 114 mounted adjacent to a roof 116. As mentioned above, implementations are not limited to any particular type of scan target, and some examples of possible scan targets are listed elsewhere herein. The lower-resolution 3D model generated or otherwise accessed by the UAV 102 may include a set of points in 3D space corresponding to surfaces of the scan target 110 detected during an initial scan of the scan target 110 at a first, lower resolution.

Based on the lower-resolution 3D model, the processor(s) may determine and execute a scan plan for scanning the scan target 110 by capturing a series of images of the scan target 110 at a second, higher resolution. The scan plan may include a series of poses determined by the processor(s) for the UAV 102 to adopt to capture, using the one or more image sensors, the series of images of the scan target 110. For instance, a pose of the scan plan may be determined based on a selected point selected from the set of points in the lower-resolution 3D model and a respective normal for the selected point. As one example, the scan plan may select points to use as center points for respective images, while selecting the successive center points to be sufficiently close to preceding center points to provide a desired amount of overlap of images taken at a specified ground sampling distance and at a desired resolution. For each pose, the processor(s) may control the propulsion mechanism to cause the UAV 102 to fly to assume the pose corresponding to the pose for traversing the sequence of poses of the scan plan.

The UAV 102 may use the one or more image sensors to capture one or more images of the scan target 110 from each pose in the scan plan. As one example, a position of the pose may be determined to be along the respective normal for the selected point (e.g., a selected center point of a respective image), and at a selected distance from the selected point corresponding to the scanning distance parameter of the scan plan. However, implementations herein are not limited to capturing images along the normals of points, but rather, in some examples, image capture may be performed at an angle with respect to the normal for a selected point. Further, there is not necessarily a one-to-one correspondence between points and poses. To the contrary, the points on the lower-resolution 3D model provide points of reference for determining optimal poses for covering the entire selected area of the scan target with optimal efficiency for a desired resolution of the images and at the specified scanning distance from the surface of the scan target 110.

The UAV 102 may be configured to systematically cover the points of the lower-resolution 3D model of the scan target 110 with the fields of view (FOVs) of the poses included in the scan plan. For example, the processor(s) may be configured to partition the set of points of the lower-resolution 3D model into a subset of covered points and a subset of uncovered points. The covered points may be points on the lower-resolution 3D model for which one or more poses have already been specified, while the uncovered points may be those points for which poses have not yet been specified.

During development of the scan plan, for determining a next pose, the processor(s) of the UAV 102 may select a next center point from the subset of uncovered points, and may determine the next pose based on the selected next center point and a respective normal for the selected next center point. For example, determining the next center point may be performed as a function of the designated distance of the image sensor from the surface of the scan target 110, the amount of area the FOV of the image sensor will cover at the designated distance, the desired amount of overlap between consecutive images, and the distance between the next center point and one or more adjacent covered center points.

In some implementations, the processor(s) may generate the scan plan to cover all points based on balancing various considerations such as obtaining full coverage of all accessible surfaces of the scan target 110, having a regular and predictable pattern for the poses, and enabling efficient navigation of the UAV 102 during execution of the scan plan. In some cases, the processor may determine the entirety of the scan plan in advance before beginning scanning of the scan target 110 according to the scan plan. In other examples, the processor may determine a first portion of the scan plan, and then may determine remaining portions of the scan plan while executing the first portion of the scan plan. In addition, the processor may be configured to dynamically update the 3D model and the scan plan during execution of the scan plan based on new sensor data received during execution of the scan plan. As one example, if an obstacle is encountered during execution of the scan plan, the processor may dynamically update the scan plan based on the location of the obstacle, such as to avoid collision with the obstacle.

In some cases, the scan plan and the 3D model may be iteratively updated during flight. For example, as mentioned above, the UAV 102 may determine an initial scan plan to ensure surface coverage on the surface(s) corresponding to the lower-resolution 3D model defined by the TSDF. The UAV 102 may traverse at least a portion of the initial scan plan while continuing to update the 3D model based on additional range distance measurements determined as the UAV 102 navigates the scan plan. Accordingly, the accuracy of the surface information for the 3D model may continue to be improved as the UAV 102 navigates the scan plan. Based on updates to the 3D model, the scan plan may be dynamically updated such as to cover new points that were previously not included or to avoid obstructions, or the like, which may result in additional updates to the 3D model, additional updates to the scan plan, and so forth.

In some examples, the 3D model may include a 3D point cloud, and the ranges determined from images taken during the scanning may be used to add more points to the 3D point cloud to provide a higher-resolution 3D model. In addition, in some examples, a mesh 3D model may be generated, such as based on the 3D point cloud using known 3D modeling techniques. Furthermore, at least the lower-resolution 3D model may be made immediately available for viewing by a user, such as the user 108 through the controller 104 or through other computing devices able to communicate with the UAV 102. As one example, the user 108 may review the 3D model to ensure that all desired portions of the scan target 110 have been captured during the scanning and/or to specify rescanning any areas that have missing images or other missing information. Because the user review of the 3D model may be performed in the field, e.g., immediately on site, such as while the UAV 102 is still in the air or after landing, this ability may negate any necessity of having to return to the site of the scan target 110 to perform additional scanning at a later time.

Furthermore, in some examples, multiple UAVs 102 may be used to scan the scan target 110 concurrently. For instance, the multiple UAVs 102 may communicate with each other to divide up the scan target 110 into portions, and may each scan a designated portion of the scan target 110. In some examples, one of the UAVs 102 may first build a lower-resolution 3D model of the entire scan target 110, while in other examples, each UAV 102 may build its own lower-resolution 3D model of at least its own designated portion of the scan target 110. Further, in some examples, each UAV 102 may calculate and execute its own scan plan for its own designated portion of the scan target 110, or alternatively, one of the UAVs 102 may determine the scan plan and may provide the scan plan to the other UAVs 102. As yet another alternative, in other examples, a remote computing device (e.g., controller 104 or a mobile device) may build the lower-resolution 3D model and/or may determine the scan plan.

Figure 2:
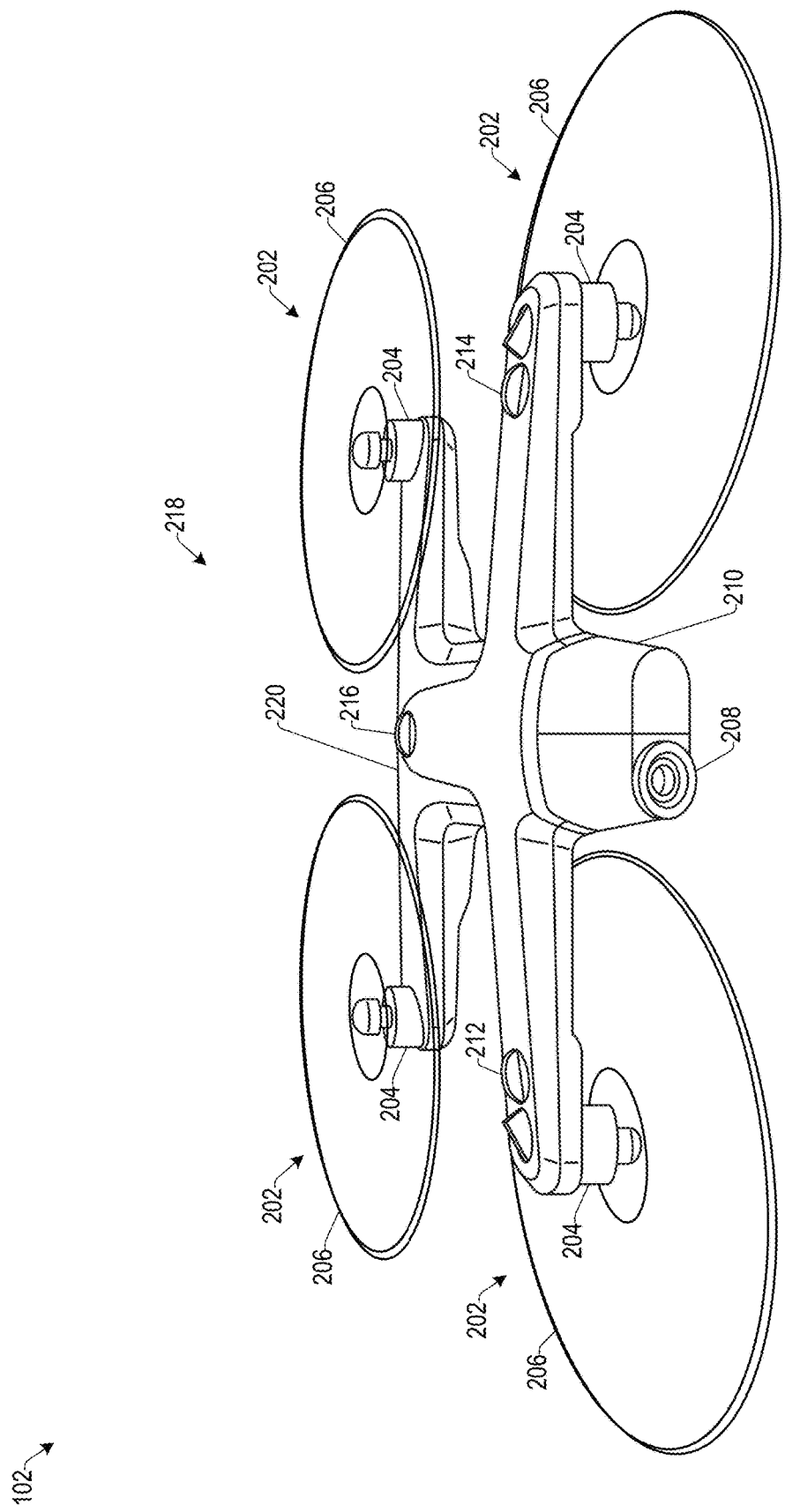
FIG. 2 illustrates an example configuration of a top side of the UAV able to perform scanning of a scan target according to some implementations.

FIG. 2 illustrates an example configuration of a top side of the UAV 102 able to perform scanning of a scan target according to some implementations. The UAV 102 may include one or more propulsion mechanisms 202. In this example, four propulsion mechanisms 202 are included, each including a motor 204 for turning a propeller 206. As one example, the UAV 102 may be a quadcopter drone as illustrated, although implementations herein are not limited to any particular configuration for the UAV 102.

In addition, the UAV 102 may include one or more image sensors, such as cameras, which may be able to sense visible light, infrared light, and/or in some cases, other wavelengths of electromagnetic radiation for capturing images of surroundings. In the illustrated example, the image sensors include a high-resolution image sensor 208 that is mounted on a gimbal 210 to support steady, low-blur image capture and object tracking. For instance, the image sensor 208 may be used for high resolution scanning of surfaces of a scan target during execution of a scan plan.

The UAV 102 also includes a plurality of lower-resolution image sensors 212, 214, and 216 that are spaced out around the topside 218 of the body 220 of the UAV 102. As one example, the image sensors 212, 214, and 216 may be covered by respective fisheye lenses to provide a wide FOV and the ability to support stereoscopic computer vision.

The UAV 102 also includes one or more onboard processors (not shown in FIG. 2).

For example, the UAV 102 may include an electronics and hardware configuration such as discussed additionally below with respect to FIG. 4. The processor(s) may receive images from the image sensors 208, 212, 214 and 216, such as for performing image processing, computer vision, navigation, scanning of the scan target, 3D model building, and the like.

Figure 3:
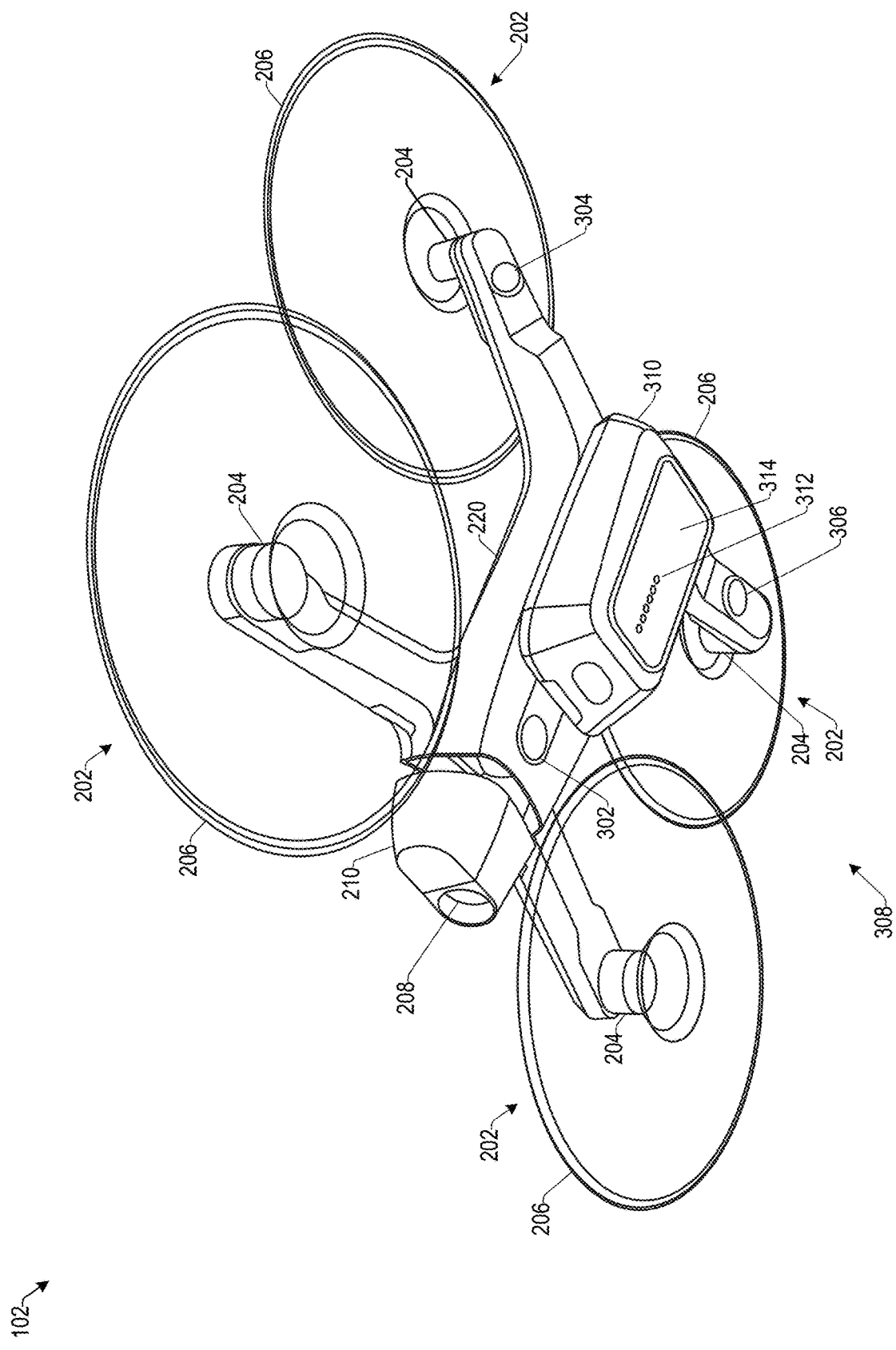
FIG. 3 illustrates an example configuration of a bottom side of the UAV able to perform scanning of a scan target according to some implementations.

FIG. 3 illustrates an example configuration of a bottom side of the UAV 102 able to perform scanning of a scan target according to some implementations. From this perspective, three more image sensors are visible, namely image sensor 302, image sensor 304, and image sensor 306, arranged on the bottom side 308 of the body 220 of the UAV 102. The image sensors 302, 304, and 306 may also be covered by respective fisheye lenses to provide a wide field of view and may be able to support stereoscopic computer vision. In some examples, the lower-resolution image sensors 212, 214, 216, 302, 304, and 306 may enable visual inertial odometry (VIO) for high resolution localization and obstacle detection and avoidance. Further, some or all of the image sensors 208, 212, 214, 216, 302, 304, and 306 may be used to scan a scan target to obtain range data that is provided to the TSDF to determine the configuration of the 3D model of the scan target.

The UAV 102 may be configured for autonomous landing on a UAV support of the docking station 106, as discussed additionally below, e.g., with respect to FIG. 5. The UAV 102 also includes a battery in a battery pack 310 attached to the body 220 on the bottom side 308 of the UAV 102. The battery pack 310 includes external conducting contacts 312 to enable battery charging when the UAV 102 is supported on the UAV support of the docking station 106. For example, the battery pack 310 may be tapered and shaped to fit within the UAV support of the docking station 106. A bottom surface 314 of the battery pack 310 is a bottom-most surface of the UAV 102.

The techniques described in relation to FIG. 5 below may be used to land the UAV 102 on the UAV support of the docking station 106. For instance, as the UAV 102 lands on the UAV support, the bottom of the battery pack 240 may contact the UAV support and may be mechanically guided by the tapered sides of the UAV support to a centered location at the bottom of the UAV support. When the landing is complete, the external electrical contacts 312 of the battery pack 310 may come into contact with the electrical contacts on the UAV support, making electrical connection to enable charging of the battery of the UAV 102. For example, the docking station 106 may include a charger configured to charge the battery while the UAV 102 is supported on the UAV support.

Figure 4:
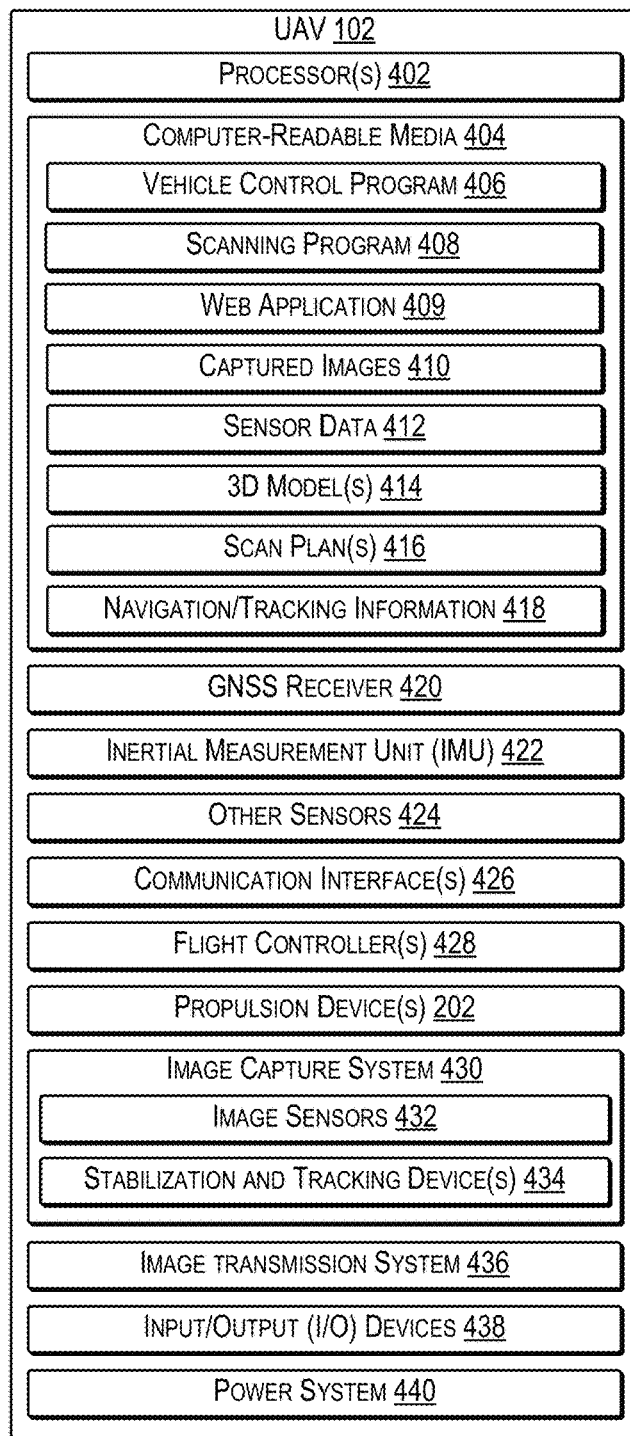
FIG. 4 illustrates select components of an example UAV according to some implementations.

FIG. 4 illustrates select components of an example UAV 102 according to some implementations. In the examples herein, the UAV 102 may sometimes be referred to as a drone and may be implemented as any type of UAV capable of controlled flight without a human pilot onboard. For instance, the UAV 102 may be controlled autonomously by one or more onboard processors 402 that execute one or more executable programs. Additionally, or alternatively, the UAV 102 may be controlled via a remote controller, such as through a remotely located controller 104 operated by a human pilot and/or controlled by an executable program executing on or in cooperation with the controller 104.

In the illustrated example, the UAV 102 includes the one or more processors 402 and one or more computer readable media 404. For example, the one or more processors 402 may execute software, executable instructions, or the like, for controlling the flight, navigation and other functions of the UAV 102. Each processor 402 may be a single processing unit or a number of processing units, and may include single or multiple computing units or multiple processing cores. The processor(s) 402 can be implemented as one or more microprocessors, microcomputers, microcontrollers, digital signal processors, central processing units, graphics processing units, state machines, logic circuitries, and/or any devices that manipulate signals based on operational instructions. For instance, the processor(s) 402 may be one or more hardware processors and/or logic circuits of any suitable type specifically programmed or configured to execute the algorithms and processes described herein. The processor(s) 402 can be configured to fetch and execute computer-readable instructions stored in the computer-readable media 404, which can program the processor(s) 402 to perform the functions described herein.

The computer-readable media 404 may include volatile and nonvolatile memory and/or removable and non-removable media implemented in any type of technology for storage of information, such as computer-readable instructions, data structures, program modules, or other code and data. Such computer-readable media 404 may include, but is not limited to, RAM, ROM, EEPROM, flash memory or other memory technology, optical storage, solid state storage, magnetic storage, or any other medium that can be used to store the desired information and that can be accessed by a computing device. Depending on the configuration, the computer-readable media 404 may be a type of computer-readable storage media and/or may be a tangible non-transitory media to the extent that, when mentioned herein, non-transitory computer-readable media exclude media such as energy, carrier signals, electromagnetic waves, and signals per se.

The computer-readable media 404 may be used to store any number of functional components that are executable by the processor(s) 402. In many implementations, these functional components comprise instructions or programs that are executable by the processors 402 and that, when executed, specifically configure the one or more processors 402 to perform at least some of the actions attributed above to the UAV 102. Functional components stored in the computer-readable media 404 may include a vehicle control program 406 that may receive inputs and perform processing for controlling navigation and other functions of the UAV 102. The functional components further include a scanning program 408 that may be executed by the one or more processors to perform at least a portion of the scan target scanning functions described herein. Furthermore the functional components may include a web application 409 that may be provided by the UAV 102 to a user device, such as a mobile device or the controller 104, as discussed additionally below. For example, the web application may execute on a browser on the user device, such as to enable the user to receive images of a current view of the UAV 102, view scan progress of the UAV 102 during scanning of a target, receiving scanned images, 3D models, and the like.

In addition, the computer-readable media 404 may store data used for performing the navigation and scanning operations described herein. Thus, the computer-readable media 404 may store, at least temporarily captured images 410, sensor data 412, one or more 3D models 414, one or more scan plans 416, and navigation/tracking information 418. In addition, the UAV 102 may include many other logical, programmatic, and physical components, of which those described herein are merely examples that are related to the discussion.

To assist in navigation, the UAV 102 may include a global navigation satellite system (GNSS) receiver 420 onboard the UAV 102. The GNSS receiver 420 may be able to receive signals from one or more satellites of a GNSS, such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), and so forth.

The UAV 102 may further include an inertial measurement unit (IMU) 422. In some examples, the IMU 422 may be configured to detect linear acceleration using one or more accelerometers and to detect rotational rate using one or more gyroscopes. As one example, the IMU 422 may be a self-contained system with a three-axis gyroscope, a three-axis accelerometer, and an embedded processor for processing inputs from the gyroscope and the accelerometer for providing an output of acceleration, attitude, and the like. For instance, the IMU 422 may measure and report the velocity, acceleration, orientation, and gravitational forces on the UAV 102, such as by using the combination of the gyroscopes and accelerometers. In addition, the UAV 102 may include other sensors 424, such as a magnetometer, a barometer, proximity sensors, lidar, radar, ultrasonic, or any of various other types of sensors as is known in the art.

Furthermore, the UAV 102 may include the one or more communication interfaces 426, one or more flight controllers 428, the one or more propulsion devices 202, an image capture system 430, one or more image sensor 432, one or more stabilization and tracking devices 434, an image transmission system 436, input/output (I/O) devices 438, and a power system 440. The components included in the UAV 102 may be able to communicate at least with the one or more processors 402, such as over one or more communication buses, signal lines, or the like (not shown).

The UAV 102 may include more or fewer components than shown in the example of FIG. 4, may combine two or more components as functional units, or may have a different configuration or arrangement of the components. Some of the various components of the example UAV 102 shown in FIG. 4 may be implemented in hardware, software or a combination of both hardware and software, including one or more signal processing and/or application specific integrated circuits.

As described earlier, the propulsion devices 202 may comprise motors 204 and propellers 206. The propellers 206 may be fixed pitch, or alternatively, may include variable-pitch propellers (varied, for example, using a gimbal mechanism). Alternatively, the propulsion devices 202 may include one or more variable-pitch jet engines, or any other mode of propulsion device and associated actuators having the effect of providing force. The propulsion devices 202 may include a controller for varying the applied thrust, for example, via an electronic speed controller controlled by or included in the flight controller(s) 428 for varying the speed of each propeller.

The flight controller(s) 428 may include a combination of hardware and/or software configured to receive input data (e.g., sensor data, image data, generated trajectories, or other instructions) from the vehicle control program 406, interpret the data and/or instructions, and output control signals to the propulsion devices 202 of the UAV 102. Alternatively, or in addition, the flight controller(s) 824 may be configured to receive control commands generated by another component or device (e.g., processors 402 and/or a remote computing device or controller 104), interpret those control commands and generate control signals to the propulsion devices 202 of the UAV 102. In some implementations, the previously mentioned vehicle control program 406 of the UAV 102 may comprise the flight controller(s) 428 and/or any one or more of the other components of the UAV 102. Alternatively, the flight controller(s) 428 may exist as a component separate from the vehicle control program 406.

The communication interface(s) 426 may enable transmission and reception of communications signals such as in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some implementations, the communication interface(s) 426 may include RF circuitry (not shown in FIG. 4). In such implementations, RF circuitry may convert electrical signals to/from electromagnetic signals and communicate with communications networks and other communications devices via the electromagnetic signals. The RF circuitry may include known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). For example, communications may be over a wide area network (WAN), a local area network (LAN), or a network of networks such as the Internet.

Communications may be facilitated over wired transmission media (e.g., via Ethernet) or wirelessly. Wireless communications may be over a wireless cellular telephone network, a wireless local area network (LAN, e.g., Wi-Fi) and/or a metropolitan area network (MAN), and other modes of wireless communications. The wireless communications may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11n and/or IEEE 802.11ac), voice over Internet Protocol (VoIP), Wi-MAX, or any other suitable communication protocols.

The communication interface(s) 426 may include one or more interfaces and hardware components for enabling communication with various other devices, such as over one or more networks. For example, communication interface(s) 426 may enable communication through one or more of the Internet, cable networks, cellular networks, wireless networks (e.g., Wi-Fi) and wired networks (e.g., fiber optic and Ethernet), as well as close-range radio communications, such as BLUETOOTH®, and the like, as additionally listed elsewhere herein. For example, 900 MHz, 2.4 GHz and 5.8 GHz are the most common radio frequencies used for communicating with UAVs, but implementations herein are not limited to any particular frequency.

The input/output (I/O) devices 438 may include physical buttons (e.g., push buttons, rocker buttons, etc.), LEDs, dials, displays, touch screen displays, speakers, and so forth, that may be used to interact with, or otherwise operate certain features of the UAV 102. The UAV 102 also includes the power system 440 for powering the various components. The power system 440 may include a power management system, one or more power sources (e.g., battery, alternating current, etc.), a recharging system, a power failure detection circuit, a power converter or inverter, a power status indicator (e.g., a light-emitting diode (LED)) and any other components associated with the generation, management and distribution of power in a computerized device.

The image capture system 430 of the UAV 102 may include the image sensors 432, which may correspond to some or all of the image sensors 208, 212, 214, 216, 302, 304, and 306 discussed above with respect to FIGS. 2 and 3 in some examples. For instance, the image sensors 208, 212, 214, 216, 302, 304, 306 may be cameras and may include one or more optical sensors for capturing images (including still images and/or video). In some implementations, the UAV 102 may include some cameras 422 dedicated for image capture of a scan target and other cameras dedicated for image capture for visual navigation (e.g., through visual inertial odometry). For example, the higher-resolution image sensor 208 may be used for capturing high resolution images, while the lower-resolution image sensors 212-216 and 302-306 may be used for navigation, distance estimation, and the like.

The stabilization and tracking device(s) 434 may include one or more devices to adjust an orientation and/or position of an image sensor, such as the image sensor 208, relative to the body of the UAV 102 based on the motion of the UAV 102 and/or the tracking of a scan target, a point on a scan target, an object or the like. Such stabilization and tracking device(s) 434 may include a mechanical gimbal or a hybrid digital-mechanical gimbal, etc., such as the gimbal 210 discussed above with respect to FIG. 2. For example, while tracking a scan target relative to the UAV 102, the stabilization and tracking device(s) 434 may adjust an orientation of a camera, such as the image sensor 208, so as to keep the tracked scan target, such as a point on the scan target, centered in the field of view (FOV) of the image sensor 208 while the UAV 102 is in motion. The image transmission system 436 may be configured to transmit captured video in real time to a remote computing device or the like. For instance, in some cases, the image transmission system 436 may transmit the images using a separate transmission protocol and communication interface from that used for communications with the controller 104, or the like.

In some examples, similar to an airplane, the UAV 102 may utilize fixed wings or other aerodynamic surfaces along with one or more propulsion devices 202 to achieve lift and navigation. Alternatively, in other examples, similar to a helicopter, the UAV 102 may directly use the one or more propulsion device(s) 202 to counter gravitational forces and achieve lift and navigation. Propulsion-driven lift (as in the case of helicopters) may offer advantages in some implementations because it allows for more controlled motion along all axes as compared with UAVs that employ fixed aerodynamic surfaces for lift.

The UAV 102 illustrated in FIGS. 1-4 is an example provided for illustrative purposes. The UAV 102 in accordance with the present disclosure may include more or fewer components than are shown. For example, while a quadcopter is illustrated, the UAV 102 is not limited to any particular UAV configuration and may include hexacopters, octocopters, fixed wing aircraft, or any other type of independently maneuverable aircraft, as will be apparent to those of skill in the art having the benefit of the disclosure herein. Furthermore, while techniques for controlling the navigation of an autonomous UAV 102 for performing a scan of a scan target are described herein, the described techniques may similarly be applied to guide navigation by other types of vehicles (e.g., spacecraft, land vehicles, watercraft, submarine vehicles, etc.).

Figure 5:
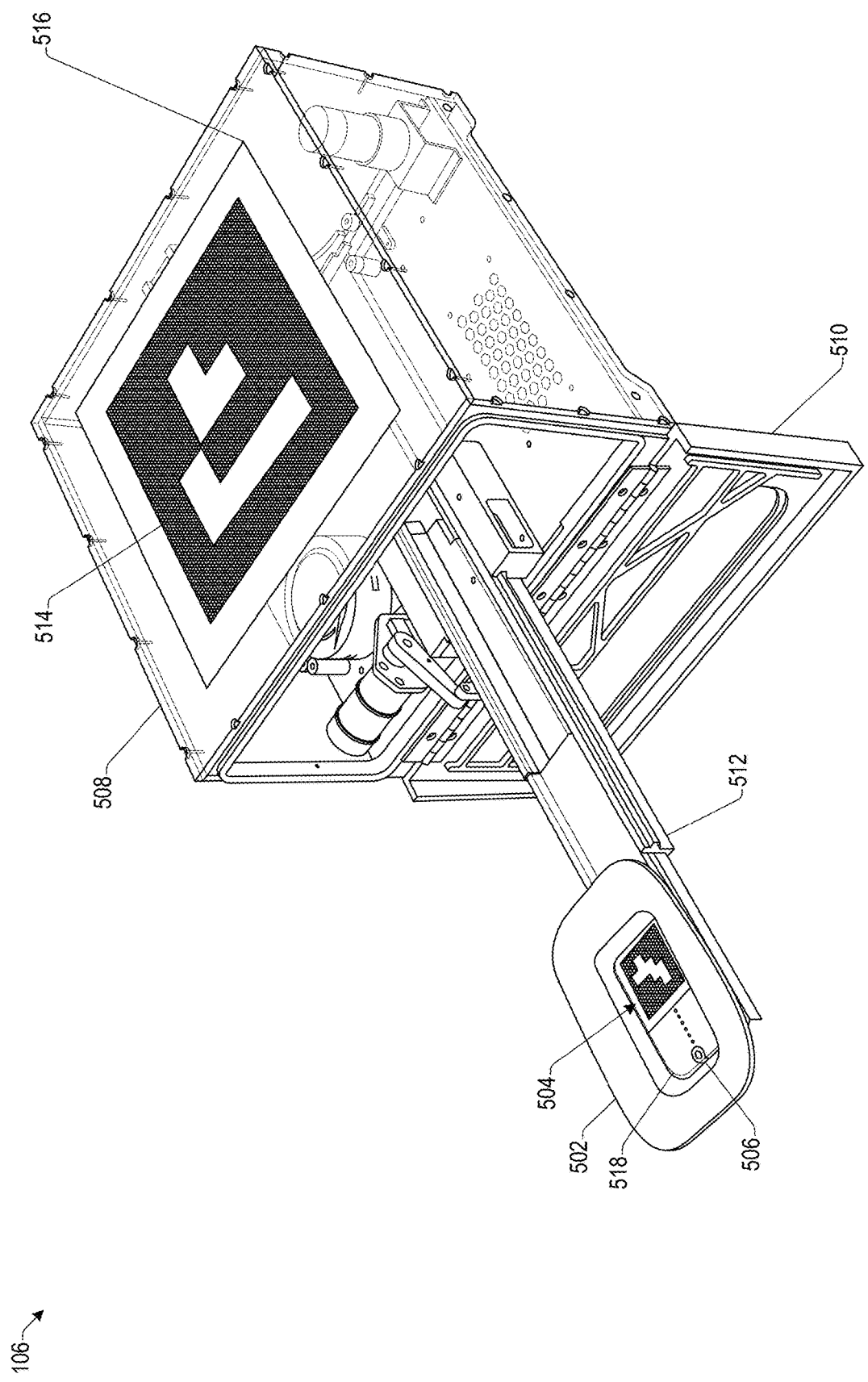
FIG. 5 illustrates an example of the docking station that may be used for enabling autonomous takeoff, landing, and charging of the UAV according to some implementations.

FIG. 5 illustrates an example of the docking station 106 that may be used for enabling autonomous takeoff, landing, and charging of the UAV 102 according to some implementations. The docking station 106 includes a UAV support 502 with a fiducial 504 and electrical charging contacts 506 for a battery charger. The docking station 106 includes a box 508 in the shape of a rectangular box with a door 510. The docking station 106 further includes a retractable arm 512 that supports the UAV support 502 and enables the UAV support 502 to be positioned outside the box 508 to enable takeoff and landing of the UAV 102, or inside the box 508, for storage and/or servicing of the UAV 102. The docking station 106 includes a second, auxiliary fiducial 514 on the outer top surface 516 of the box 508. The fiducial 504 and the auxiliary fiducial 514 may be detected by the UAV 102 (not shown in FIG. 5) and used for visual localization of the UAV 102 in relation to the docking station 106 to enable a precise landing on the UAV support 502.

The UAV support 502 has a funnel-shaped or other inwardly tapered geometry configured to receive the bottom surface 314 of the UAV 102 on a support surface 518 of the UAV support 502. The tapered sides of the UAV support 502 may help to mechanically guide the bottom surface 314 of the UAV 102 into a centered position over the support surface 518 for aligning the electrical contact 506 with the electrical contacts 312 on the UAV 102 during a landing. For example, the electrical contacts 506 may enable the UAV support 502 to charge the battery of the UAV 102 while the UAV is positioned on the UAV support 502. In particular, the docking station 106 may include a charger (not shown in FIG. 5) configured to charge the battery of the UAV 102 while the UAV 102 is on the UAV support 502.

The box 508 may be configured to enclose the UAV support 502 and the arm 512 in a first configuration (not shown), and expose the UAV support 502 and arm 512 in a second configuration. The docking station 106 may be configured to transition from the first configuration to the second configuration automatically by performing steps including opening the door 510 of the box 508 and extending the arm 512 to move the UAV support 502 from inside the box 508 to outside of the box 508.

When the arm 512 is extended, the UAV support 502 is positioned away from the box 508 of the docking station 106, which may reduce or prevent propeller wash from the propellers of the UAV 102 during a landing, thus simplifying the landing operation. The arm 512 may include aerodynamic cowling for redirecting propeller wash to further mitigate the problems of propeller wash during takeoff and landing. The docking station 106 may enable automated landing and recharging of the UAV 102.

For example, the fiducial 504 may be a root fiducial, and the auxiliary fiducial 514 may be larger than the root fiducial 504 to facilitate visual localization from farther distances as the UAV 102 approaches the docking station 106. For example, the auxiliary fiducial 322 may include an asymmetric pattern that enables detection and determination of a pose (i.e., a position and an orientation) of the auxiliary fiducial 514 relative to the UAV 102 based on an image of the auxiliary fiducial 514 captured with an image sensor of the UAV 102. For example, a processor (e.g., the processor(s) 402) of the UAV 102 may be configured to detect the auxiliary fiducial 514 in at least one image captured using an image sensor of the UAV 102. The processor(s) 402 may determine a pose of the auxiliary fiducial 514 based on the at least one image, and, based on the pose of the auxiliary fiducial, the propulsion mechanism may be caused fly the UAV 102 to a first location in a vicinity of the UAV support 502, where the UAV 102 may similarly detect the fiducial 504 for honing in on and landing on the UAV support 502.

The docking station 106 may enable automated landing and recharging of the UAV 102, which may in turn enable automated scanning, without user intervention, of large scan targets (e.g., a large construction site, bridge, buildings, etc.) that require more than one battery pack charge to scan. For example, after starting execution of the scan plan and before completing the scan plan, when the UAV 102 needs to return to the docking station 106 to recharge the battery or have the battery replaced, the UAV 102 may store a scan plan state that indicates a next pose of the sequence of poses of the scan plan that needs to be performed according to the scan plan. After storing the scan plan state, the UAV 102 controls the propulsion mechanism to cause the UAV 102 to fly to land on the UAV support 502 of the docking station 106. After landing, the UAV 102 may wait until the battery is indicated to be charged to at least a threshold amount.

Further, in some examples, during the charging, the UAV 102 may perform any incomplete image processing tasks, 3D model updating, and/or scan plan updating that may have not already been performed during flight. In addition, during charging, the UAV 102 may perform transfer of any images, the current 3D model and/or other data to the controller, the mobile device, or a server computing device. Following reaching of the charge threshold, the UAV 102 may control the propulsion mechanism to cause the UAV 102 to take off from the UAV support 502, access the scan plan state, and based on the scan plan state, controls the propulsion mechanism to cause the UAV 102 to fly to assume the next pose and continue execution of the scan plan. Additionally, in some examples, the UAV 102 may have updated the scan plan before or during charging and, in that case, the UAV 102 may assume a new or different pose according to the updated scan plan, rather than proceeding to the next pose stored as the scan plan state.

In some implementations, controlling the propulsion mechanism to cause the UAV 102 to land on the UAV support 502 includes: controlling the propulsion mechanism of the UAV 102 to cause the UAV 102 to fly to a first location in the vicinity of the docking station 106 that includes the UAV support 502 configured to hold the UAV, the UAV support 502 including the fiducial 504 on the UAV support 502, the docking station 106 including the second fiducial 514 on the docking station 106; accessing one or more images captured using an image sensor(s) of the UAV 102; detecting the second fiducial 514 in at least one of the one or more images; determining a pose of the second fiducial 514 based on the one or more images; controlling the propulsion mechanism of the UAV 102 to cause the UAV 102 to fly to a second location in the vicinity of the docking station 106; accessing one or more images captured using an image sensor(s) of the UAV 102; detecting the fiducial 504 in at least one of the one or more images; determining a pose of the fiducial 504 based on the one or more images; and controlling, based on the pose of the fiducial 504, the propulsion mechanism to cause the UAV 102 to land on the UAV support 502.

The above-described techniques for automated landing, recharging a battery of the UAV 102 using a charger included in the docking station 106 while the UAV 102 is on the UAV support 502, and then resuming the scan plan at a pose at which the UAV 102 left off, can significantly increase the size of a scan target that may be autonomously scanned without user intervention. Accordingly, the docking station 106 herein enables automated landing, recharging, takeoff, as well as automated mission planning and execution by the UAV 102. Some implementations enable the reliable operation of such a system and may include relevant application programming interface (API) designs that make the system accessible for a wide variety of consumer and commercial applications.

Figure 6:
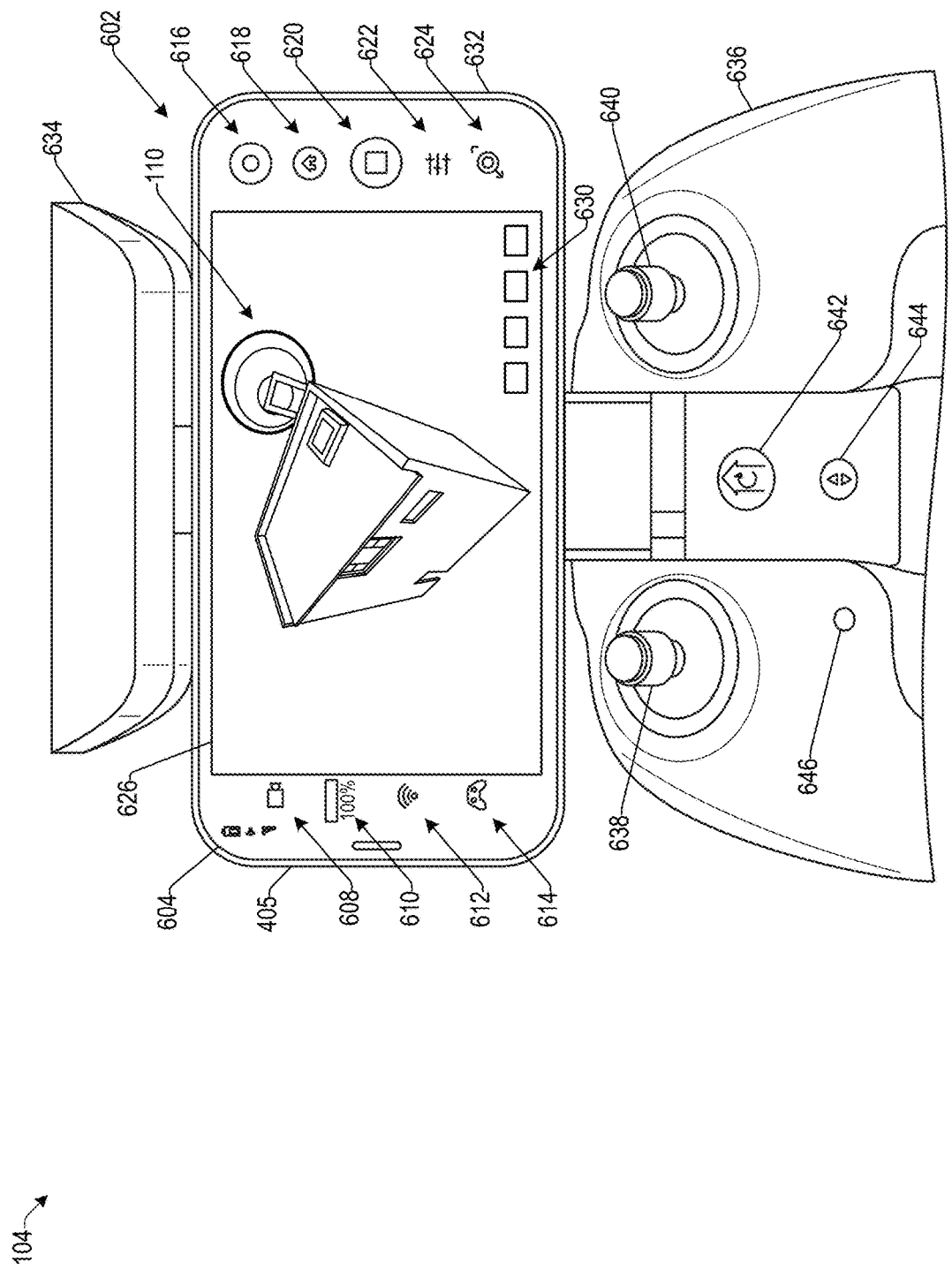
FIG. 6 illustrates an example of a controller for a UAV according to some implementations.

FIG. 6 illustrates an example of a controller 104 for a UAV according to some implementations. The controller 104 may provide a graphic user interface 602 for controlling the UAV 102 and reviewing data (e.g., images) received from the UAV 102. The controller 104 includes a touchscreen 604 that may provide virtual controls and status indicators for controlling and viewing a status of the UAV 102. For example, a camera setting virtual control 608 may enable the user to control the resolution and other settings of at least the high resolution image sensor 208 on the UAV 102. Furthermore, a battery charge level indicator 610 indicates a current condition of the battery on the UAV 102. A signal strength indicator 612 may indicate a current signal strength of communication with the UAV 102. A settings virtual control 614 may enable the user to control the settings of the controller 104. Furthermore, a map virtual control 616 may enable the user to view the location of the UAV 102 on a map. A home virtual control 618 may enable the user to return to a home screen of the user interface 602. A recording virtual control 620 may enable the user to manually start or stop recording of a scene currently in the field of view of the image sensor 208. A skills virtual control 622 may enable the user to control skill settings. A cable cam virtual control 624 may enable the user to set a specific course between two points for the UAV of travel.

In addition, the user interface may include an image 626 (e.g., a live video image) of a current field of view of the higher-resolution image sensor 208 presented on the touchscreen 604. In this example, suppose that the presented image includes the scan target 110 discussed above with respect to FIG. 1. A plurality of additional virtual controls 630 may be overlaid on the image 626, and may provide additional functions such as discussed additionally below with respect to FIG. 7.

In this example, the touchscreen 604 is part of a mobile device 632, such as a smartphone, tablet computing device, or other computing device that may be mounted on the controller 104 using a controller attachment 634. The controller 104 may further include a controller body 636 that includes a plurality of physical controls, such as a left joystick 638, a right joystick 640, a home button 642, a launch/land button 644, an LED status indicator 646 that indicates a status of the controller 104, as well as other physical controls not visible in this view. In some examples, a Wi-Fi antenna may be included in the controller attachment 634 so that the controller 104 may provide range extending communication capabilities for longer distance communications with the UAV 102 than may be possible with the mobile device 632 alone.

As one example, the mobile device 632 (or another computing device that is remote from the UAV 102) may execute an application on a processor of the mobile device 632. As one example, the application may include a browser that executes the web application 409 discussed above with respect to FIG. 4. The web application 409 may be served or otherwise provided by the UAV 102 to the mobile device 632. In some cases, the web application 409 or another application may provide the user interface 602 discussed above and may provide other functionalities described herein with respect to the mobile device 632, such as enabling communication with the UAV 102, enabling remote control of the UAV 102, and the like. Furthermore, in some cases, the mobile device 632 may be configured by the application to generate a lower-resolution 3D model of a scan target based on images and location information received from the UAV 102, and/or to generate a scan plan for a scan target. Furthermore, in some cases, the application may enable wireless connection of the mobile device 632 to the controller 104 such as via BLUETOOTH® radio or the like.

In some implementations, a portion of the processing that might otherwise be performed by the UAV 102 (e.g., image processing and control functions) in some examples herein may instead be may be performed by an application running on a processor of the controller 104 or another computing device that is remote from the UAV 102, such as the mobile device 632. Accordingly, in some cases the generation of the lower-resolution 3D model and/or the scan plan may be performed by the controller 104 or the mobile device 632 instead of being performed by the UAV 102. In such a case, the remote computing device 104 or 632 may provide interactive features using the image content provided by the UAV 102. For example, various steps of the processes of FIGS. 15-23 may be implemented using a processor of a remote computing device (e.g., the controller 104 or the mobile device 632) that is in communication with the UAV 102. Furthermore, in some examples, the processing workload may be divided between the processor(s) 402 on the UAV 102 and the processor(s) on the remote computing device(s) 104, 632, such as to achieve reduced processing times. Numerous other variations will be apparent to those of skill in the art having the benefit of the disclosure herein.

Figure 7:
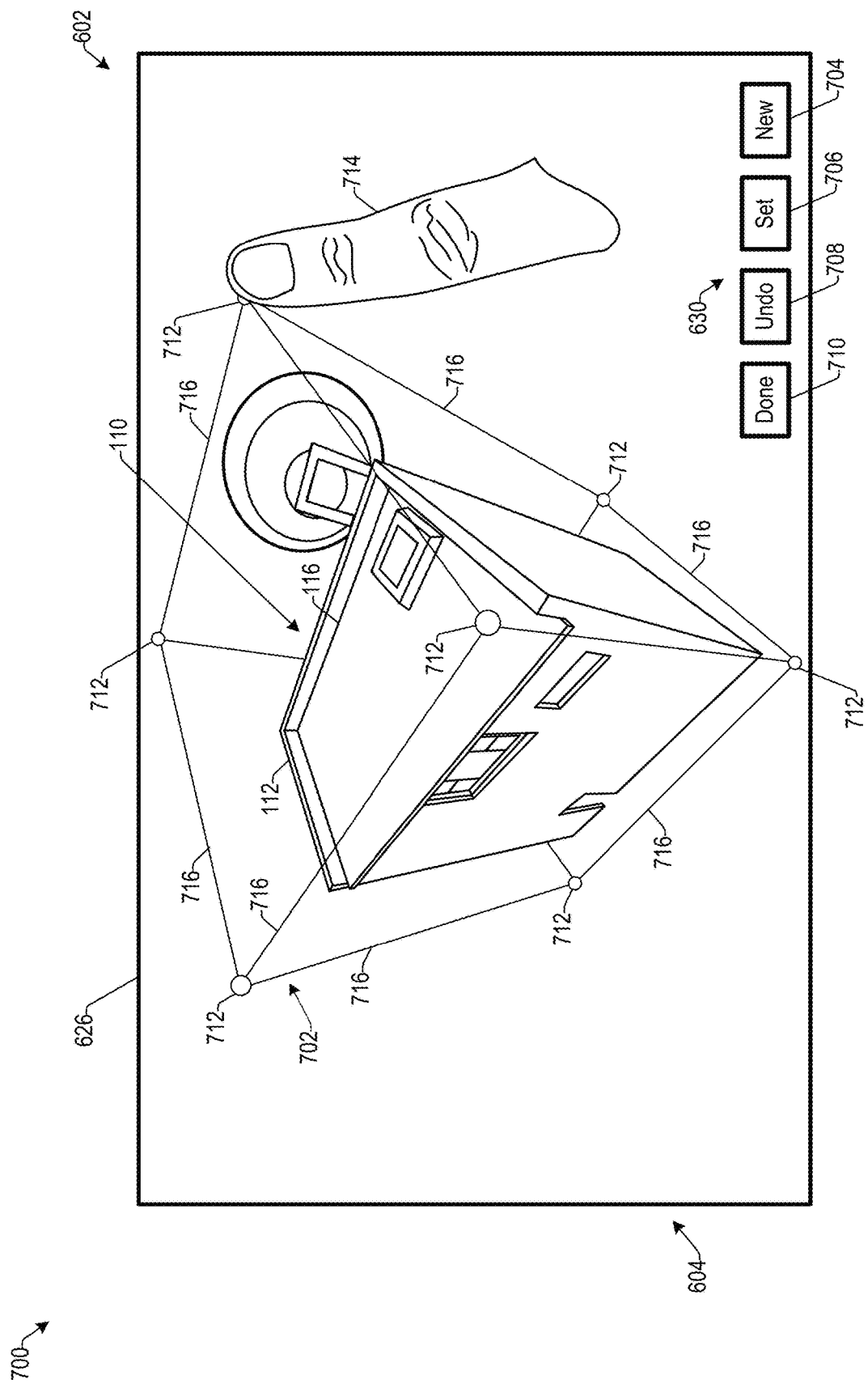
FIG. 7 illustrates an example of selecting a scan target to be scanned according to some implementations.

FIG. 7 illustrates an example 700 of selecting a scan target to be scanned according to some implementations. In this example, the image 626 may correspond to the image 626 discussed above with respect to FIG. 6 presented in the user interface 602 of the controller 104 that displays an image of the scan target 110 discussed above with respect to FIG. 1. In this example, suppose that the user desires to have the UAV 102 scan the building 112 discussed above with respect to FIG. 1. Accordingly, the user may select a captured image of the desired scan target 110 and may manipulate the user interface 602 to cause a new bounding volume 702 to be presented in the user interface 602 to enable the user to specify the scan target 110. For example, the virtual controls 630 may include virtual controls such as "new" 704, "set" 706, "undo" 708, and "done" 710 that may be used by the user for controlling the bounding volume 702 for specifying a volume that includes the scan target 110 to be scanned. For example, as discussed above, the UAV 102 may be configured to perform a fully autonomous scan of any structure within the bounding volume 702 specified by the user in the user interface 602.

In this example, the user interface 602 of the controller 104 may be used to specify a 3D volume using the bounding volume 702 for selecting the scan target 110. For instance, the bounding volume 702 may be a cuboid or other 3D shape having a plurality of handles 712 that are movable by the user such as by touching the touchscreen 604 with a finger 714 or the like. By moving the handles 712, the user may manipulate the location of the edges 716 of the bounding volume 702 for specifying the location of the 3D volume in the user interface 602.

Alternatively, in other examples, the user may select any of the sides of a cuboid bounding volume to move toward or away from a center point for defining the size and shape of the cuboid bounding volume. For instance, the user may tap on or otherwise select one or an opposed pair of sides of the cuboid to expand toward or away from the center of the cuboid. As still another example, the user may manually specify dimensions of the bounding volume, such as by specifying width, depth, height and rotation dimensions for the bounding volume. Further, while a cuboid is illustrated as the shape of the bounding volume for discussion purposes, implementations herein are not limited to any particular shape. Additionally, numerous other variations for adjusting the size and shape of the bounding volume will be apparent to those of skill in the art having the benefit of the disclosure herein.

When the user has positioned the bounding volume 702 to encompass the desired portion of the scan target 110, the user may select the "set" virtual control 706 for setting the position of the bounding volume 702 with respect to the scan target 110. In addition, the user may further use the user interface 602 to specify image capture resolution and other scanning parameters such as a specified distance from the scan target 110 for the scanning to be performed, amount of overlap of captured images, and so forth.

In some examples, the locations of the edges 716 and/or handles 712 (corners) on the bounding volume 702 may be correlated to global coordinates in a global coordinate system that may also be used by the UAV 102 for navigation in a world frame of reference. As one example, the world frame of reference may correspond to a locally-linearized GNSS coordinate frame, with an origin corresponding to a given set of GNSS coordinates (i.e., latitude, longitude, elevation). Accordingly, the UAV 102 may be able to correlate the location of the bounding volume 702 to real-world latitude, longitude, and elevation coordinates for determining the location of a real-world volume indicated by the bounding volume 702. Additionally, or alternatively, the UAV 102 may perform navigation and may determine its location in space, and thereby, the locations of the surfaces of the scan target 110, based on the takeoff point and further based on inputs from the IMU, the magnetometer, and the like.

Based on the selected bounding volume 702, the UAV 102 may first perform an initial low-resolution scan of the scan target 110 to generate a rough lower-resolution 3D model of the scan target 110. As discussed additionally below, the UAV 102 may then determine a scan plan based on the lower-resolution 3D model, and may proceed to scan the scan target 110 based on the poses determined for the scan plan to attempt to cover every surface of the scan target 110 within the bounding volume 702 using the specified image capture parameters. In some cases, the image capture parameters and poses for performing image captures may be adaptively determined to ensure high quality 3D reconstruction of the captured scan target 110. For instance, the user interface 602 may further be used to specify semantic segmentation for capturing different types of scan targets or different portions of scan targets at different resolutions, e.g., trees with low-resolution/far distance, concrete with maximum resolution/close distance, steel beams with medium resolution/medium distance, bolts or other fasteners with maximum resolution/close distance etc. In some examples, these different resolutions may be set in advance as default settings for certain types of scan targets, or the like. For instance, a machine learning model executable onboard the UAV 102 may be trained to recognize the above-mentioned different portions of scan targets, and automatically provide a recommended scan distance and image resolution for particular recognized target portions.

Additionally, in some examples, the captured images captured during the scan may be provided to a machine learning model such as a neural net or the like, which may execute on the UAV 102, the remote computing device (controller 104 or mobile device 632), or another computing device, such as a cloud server. For example, the machine learning model may be configured to detect damage, corrosion, or other issues in the scan target 110 in real time (e.g., during the scan) and may cause the unmanned aerial vehicle to perform a closer inspection such as at higher resolution or at a closer distance when an issue is detected. As the capture is being performed, the user interface 602 may be updated in real time so that the user is able to determine that the capture is being performed on the desired areas and according to the desired parameters, such as desired resolution, angle, and distance from the selected scan target.

Figure 8:
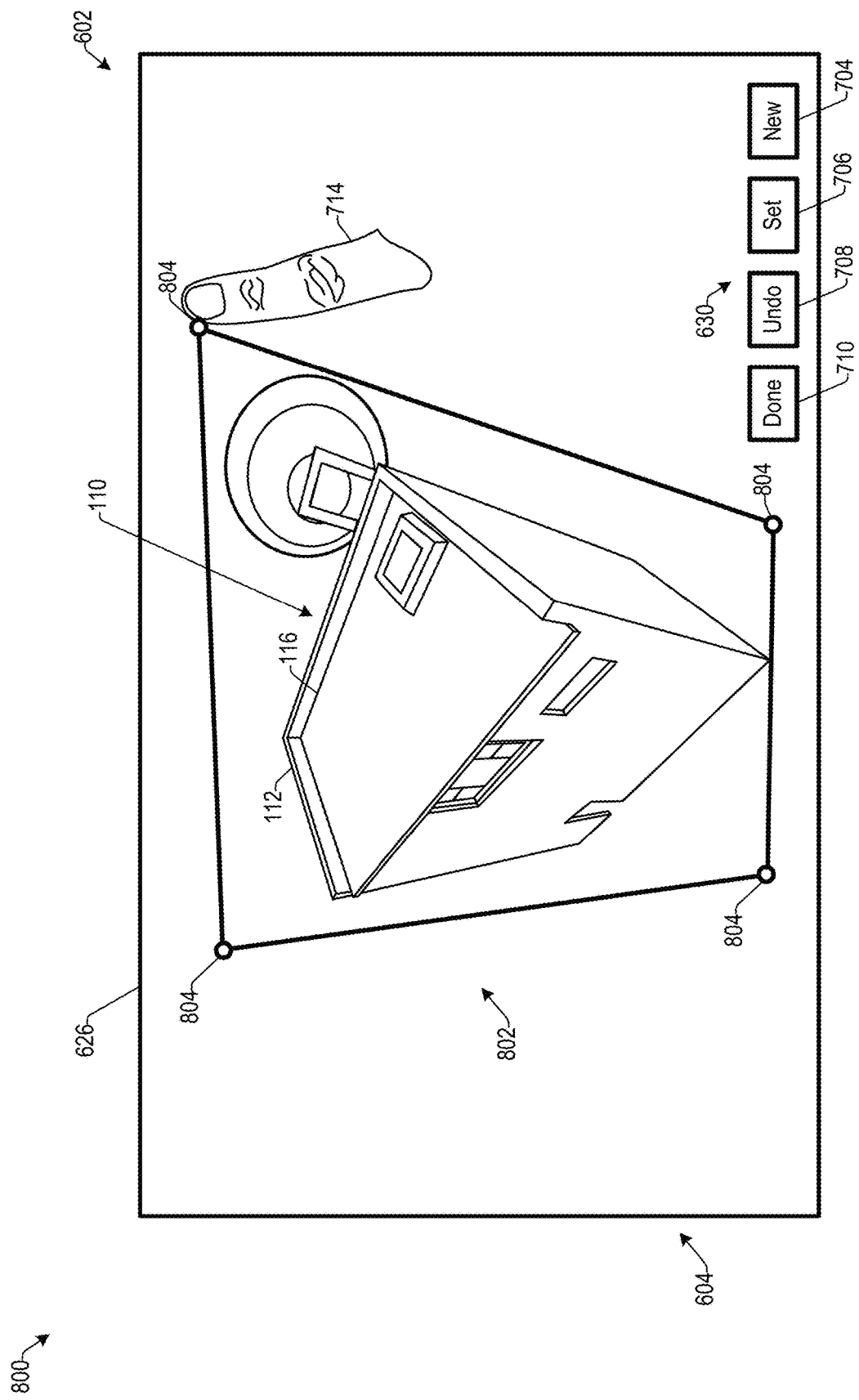
FIG. 8 illustrates an example of selecting a scan target to be scanned according to some implementations.

FIG. 8 illustrates an example 800 of selecting a scan target according to some implementations. In this example, similar to FIG. 7, the image 626 may correspond to the image 626 discussed above with respect to FIG. 6 presented in the user interface 602 of the controller 104 that displays an image of the scan target 110. In this example, suppose that the user desires to have the UAV 102 scan the building 112 discussed above with respect to FIG. 1. Accordingly, the user may select a captured image of the desired scan target 110 and may manipulate the user interface 602 to draw a polygon or other 2D shape 802 around the scan target or a portion of the scan target 110 for specifying the scan target 110 to the UAV 102.

In this example, the user may specify an area in the user interface 602 for indicating the scan target 110 to the UAV 102. For instance, the user may use at least three reference points or handles 804 to draw a polygonal perimeter (i.e., a boundary) around the scan target 110. The UAV 102 may be configured to explore the scan target 110 within the specified perimeter, and in some examples, may present a volume prism around the detected scan target corresponding to the specified perimeter. For example, the user may be able to adjust the distance to the surfaces and other scan parameters before the UAV starts the scan.

Additionally, while a polygon is shown in the example of FIG. 8, in other examples, any other technique may be used for creating a perimeter around or on a scan target. For example, the user may draw a circle, oval, irregular line, etc. on or around the scan target in the image 602, as will be apparent to those of skill in the art having the benefit of the disclosure herein.

Figure 9:
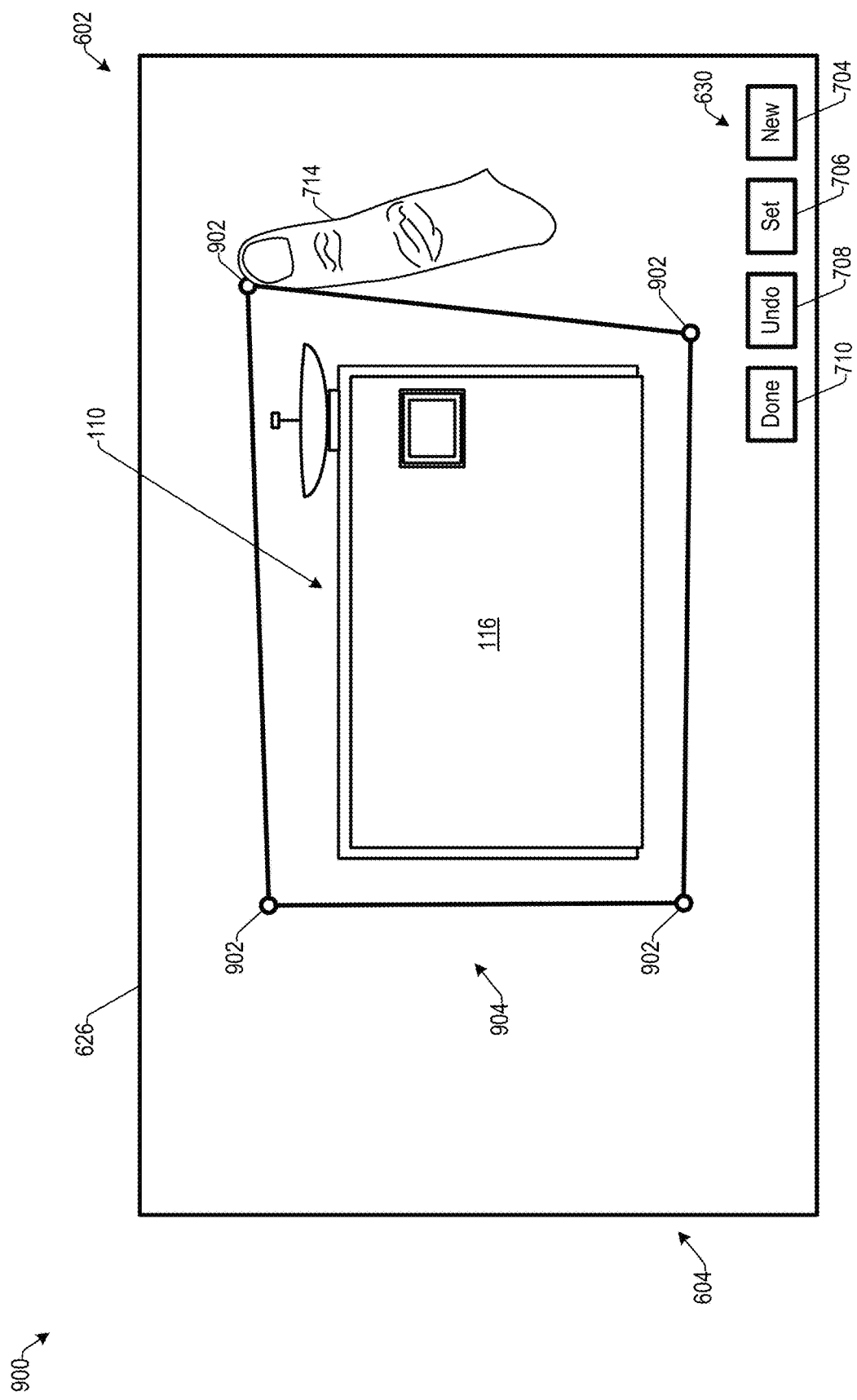
FIG. 9 illustrates an example of selecting a scan target to be scanned according to some implementations.

FIG. 9 illustrates an example 900 of selecting a scan target according to some implementations. In this example, the user may navigate the UAV 102 to a position over the scan target 110, such as to obtain an image of the scan target 110, which may be a generally plan-view image as illustrated in FIG. 9. As another example, the user may provide the UAV 102 with specified coordinates of the scan target 110, and the UAV 102 may navigate itself to the specified coordinates to obtain the image of the scan target 110. As another example, the user may use a satellite image or other previously acquired aerial image of the scan target that may be provided to the user interface 602 along with latitude and longitude information.

In this example, reference points 902 for drawing a perimeter 904 may correspond conceptually to pillars, which may indicate to the UAV 102 that the UAV 102 is to also scan vertical surfaces between a floor and a ceiling corresponding to a height of the pillars. For example, the ground adjacent to the base of the scan target 110 may be a default floor for the pillars that may be adjusted by the user either by manual entry or by adjusting a height of the ceiling using a sideview of the scan target 110. Thus, the user may adjust the floor upward if the user does not desire the scan to go all the way to the ground. In addition, the ceiling (i.e., an upper limit) for the scan may also be specified by the user. Accordingly, while the pillars may be used to define a volume within which the scan is to take place, a plan view or other view of the scan target may be sufficient for indicating the scan target and a bounding volume in some cases. Further, while the reference points 902 are shown being used with a plan view of the scan target 110 for discussion purposes, implementations herein are not limited to such, and pillars may be used with side views of scan targets, bottom side views, or the like.

Furthermore, the techniques in this example and in the example of FIG. 7 may also be used to specify no-fly zones that the UAV 102 is not permitted to enter. For example, in the case that the scan target is a bridge, the upper surface of the bridge may be specified as a no-fly zone to avoid possible contact of the UAV 102 with traffic on the bridge. For instance, the ceiling for the pillars discussed above, may establish a geofence that the UAV 102 is not permitted to cross. Similarly, one or more surfaces of the bounding volume of FIG. 7 may also be designated as a geofence. Accordingly, in addition to specifying to the UAV 102 a target to be scanned, the user interface 602 may also be used to specify regions of the scan target 110 or regions around the scan target 110 that the UAV 102 is not allowed to enter.

In addition, as an alternative to using moving reference points 902 using the user interface 602, the UAV 102 may be used to establish pillar locations or other reference point locations. For example, the user may navigate the UAV 102 to the location of each of the reference points 902, and when the UAV 102 is at a desired location for establishing a pillar, the user may select the set button 706 for setting a pillar at that location. The user may navigate the UAV 102 to each location at which a pillar is desired to be established and may thereby designate the polygon 904 for indicating the scan target.

The floor and ceiling for the pillars 902 may be similarly established by manually navigating the UAV 102 to a desired floor altitude and a desired ceiling altitude. Alternatively, a default floor and ceiling locations may be used in other examples. Furthermore combinations of the two techniques described for FIG. 9 may also be used. For example, the user may initially navigate the UAV to a plurality of locations for establishing locations of pillars 902, and the user may then adjust the pillar 902 locations and/or floor or ceiling locations using the user interface 602, such as by dragging one or more pillars 902 to a desired location or manually entering a floor or ceiling height. Numerous other variations will be apparent to those of skill in the art having the benefit of the disclosure herein.

Figure 10:
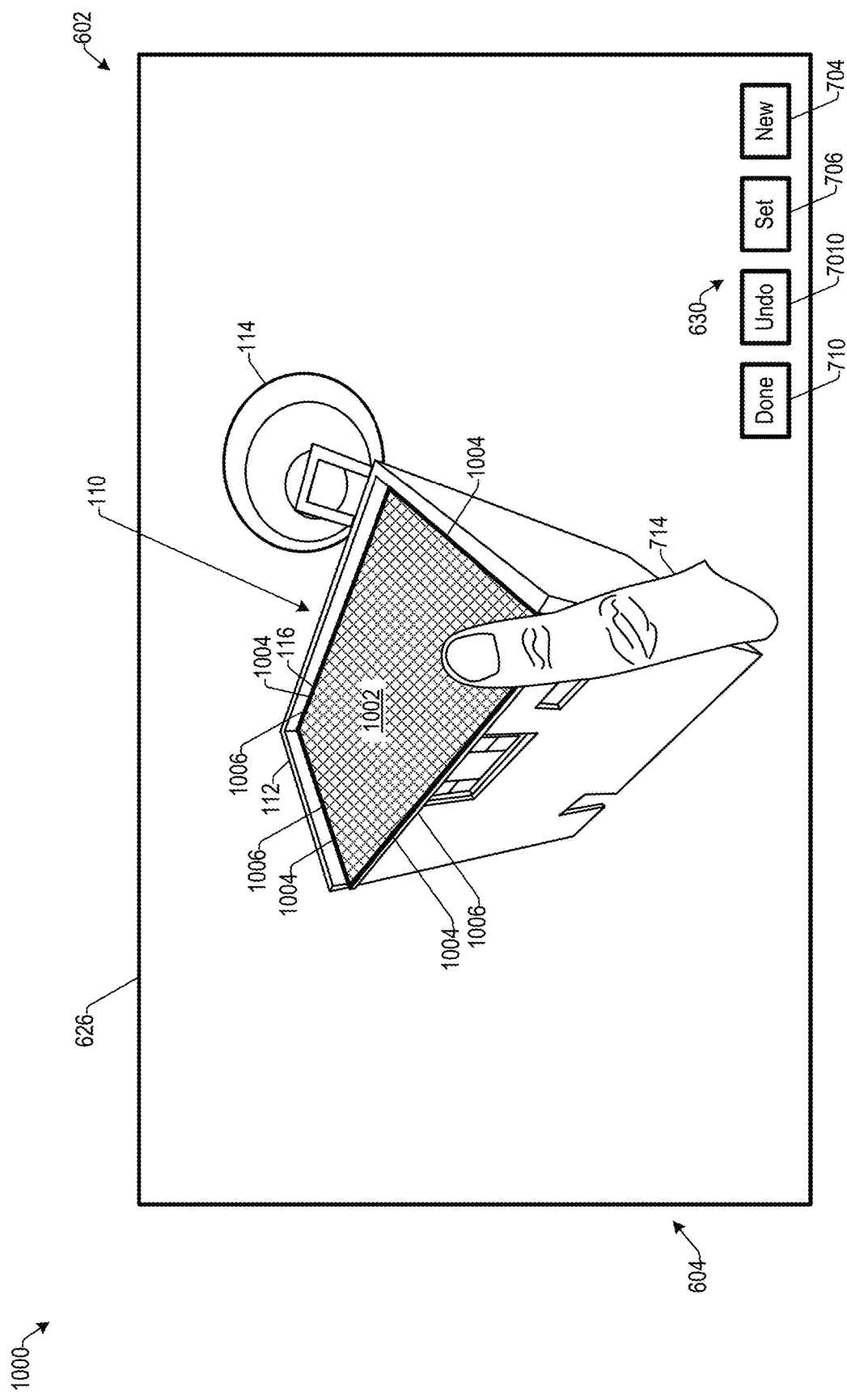
FIG. 10 illustrates an example of selecting a scan target to be scanned according to some implementations.

FIG. 10 illustrates an example 1000 of selecting a scan target according to some implementations. As one example, the user may manually navigate the UAV 102 to obtain an image of the scan target 110, which may be presented in the user interface 602. As another example, the user may provide the UAV with specified coordinates of the scan target 110, and the UAV 102 may navigate itself to the specified coordinates to obtain the image of the scan target 110. The user may tap on, or otherwise select, a visible surface of the scan target 110, such as the roof 116 in this example.

The application executing on the mobile device 632 that presents the user interface 602 may be configured to suggest a polygon or other 2D shape 1002 that corresponds to the surface on which the user tapped. For instance, the application executing on the mobile device 632 may use edge recognition or any of various other computer vision techniques for determining a 2D shape 1002, such as a polygon, corresponding to the surface (roof 116) on which the user tapped. Based on this, the user interface generates an image of the polygon or other 2D shape 1002 overlaid on the selected surface. If necessary, the user may adjust the edges 1004 of the 2D shape 1002, such as by touching and dragging, to align the edges 1004 with edges 1006 of the selected surface (roof 116) that the user desires to select.

In some examples, the user may select each surface of the scan target that the user desires to have scanned. Alternatively, as another example, the UAV 102 may be configured to scan an entire contiguous structure based on selection of one surface of the structure. For example, based on the selection of one surface of the structure, the UAV may explore the structure to determine all the surfaces of the structure. As another example, the mobile device 632 may employ a machine learning model or other logic that is able to recognize common or contiguous structures. Accordingly, in these examples, selecting a portion of the scan target 110 can result in selection of the entire scan target 110. Thus, implementations herein enable selection of just a portion of a target for scanning, or alternatively, may automate selection of an entire structure, or the like, based on selection of just a portion of the structure.

In some cases, based on the selection made by the user using the user interface 602, the portion of the structure desired to be captured as the scan target 110 for scanning may be visually distinguished to the user as being selected, such as by highlighting the selected scan target 1002 as indicated at 1008, painting the selected scan target 1002 a different color, outlining the selected scan target 1002, or the like. In some cases, an adaptive line/edge detection algorithm may use 3D depth data and/or 2D appearance data to develop an ID signature for the scan target. Further, augmented reality may be used to show everything that belongs to the selected scan target structure in the user interface 602 to enable the user to correct a mis-selection or misclassification of a scan target structure (or non-scan target structure).

Figure 11:
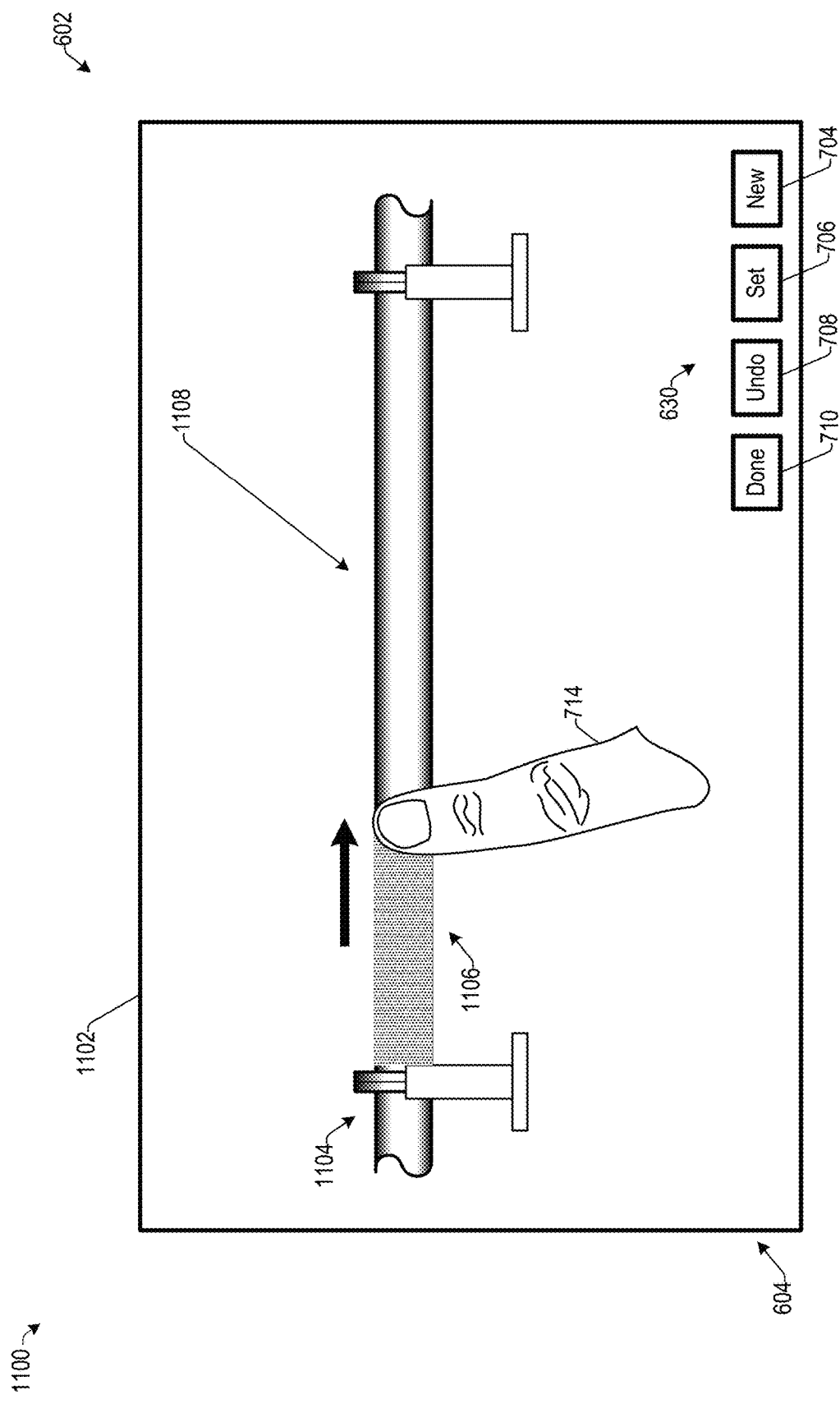
FIG. 11 illustrates an example of selecting a scan target according to some implementations.

FIG. 11 illustrates an example 1100 of selecting a scan target according to some implementations. In this example, the user may use a still image 1102 of a structure or other feature 1104 to paint an area 1106 of a scan target 1108 for selecting the scan target 1108 for scanning by the UAV 102. For instance, the image 1102 may be presented in the user interface 602 of the mobile device, and the user may drag a finger 714 on the touchscreen 604 (or a mouse/cursor on a non-touch display) across the desired area of the structure 1104 for scanning, as indicated at 1106.

In some examples, the user may use a scrubbing motion for filling in a desired area of the image. Appearance of the structure 1104 and/or 3D geometry may also be used to augment and/or assist the painting, such as for auto selection of an area based on edge recognition or the like. Furthermore, different areas of the structure 1104 may be painted or otherwise highlighted with different colors or other visual indicators, and each different color may have its own scanning parameters that are different from those of the other colored areas. Examples of the different scanning parameters may include different distances from the structure surface, different viewing angles, different captured image overlaps, different camera resolution settings, or the like.

In addition, as another example for specifying scanning of a linear structure, the user may draw a circle (not shown in FIG. 11) in a portion of an image presented in the user interface 602, and determine a current median range of the UAV 102. This may allow the user to lock the scanning distance (ground sampling distance) of the UAV 102 but still fly laterally either under autonomous control or, alternatively, under user control. As long as the UAV 102 is centered, whether planar or linear, the UAV 102 may be configured to stay within a desired distance from the specified feature while traveling along the center, such as within the threshold range (e.g., several miles), or within a threshold flight time. For instance, inspection of powerlines, pipes or other linear 3D structures may be performed with just specifying the scanning distance of the UAV 102 from the selected scan target and a specified maximum threshold range of travel of the UAV 102 along the linear structure to ensure that the UAV 102 is able to return before the battery is depleted.

Figure 12:
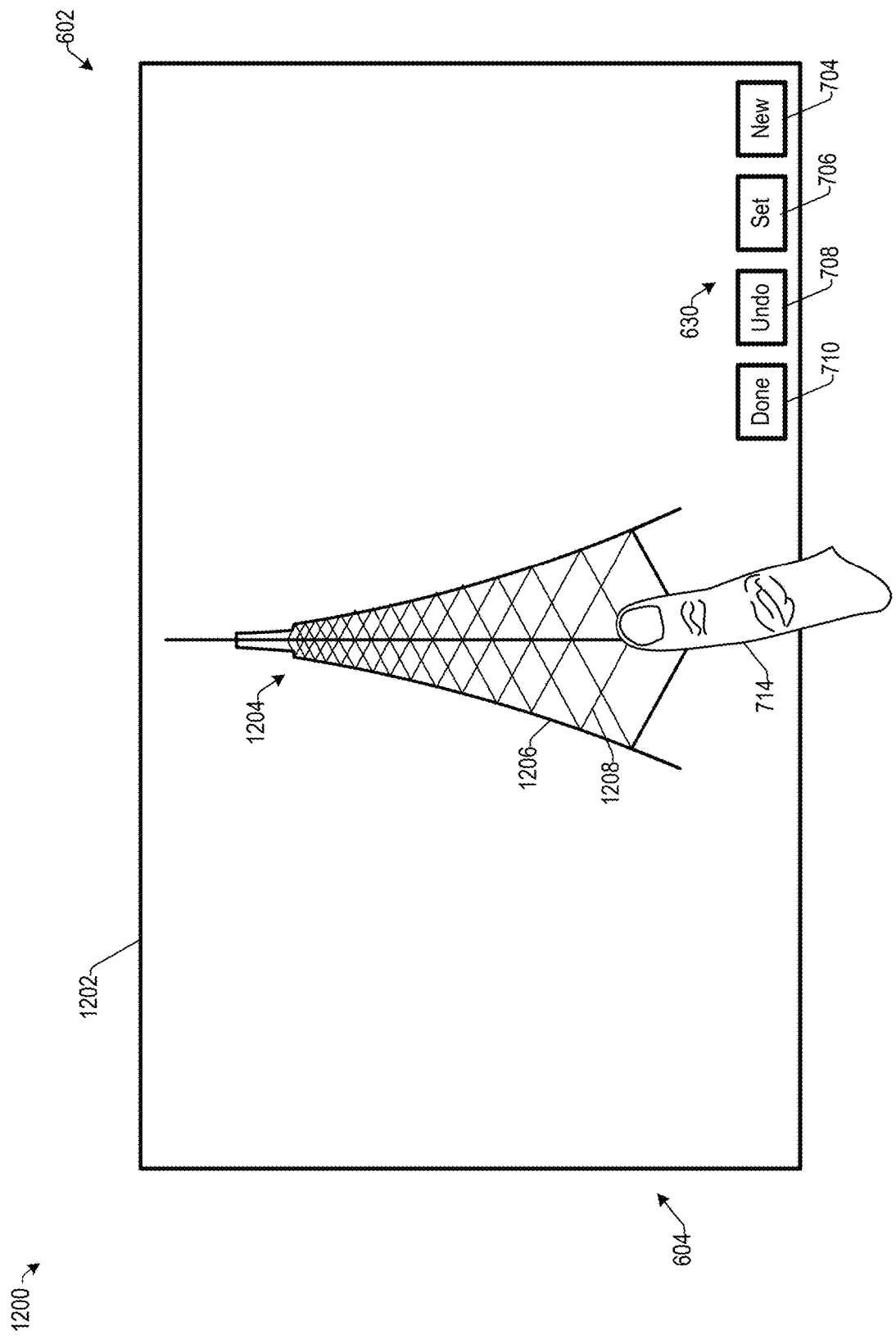
FIG. 12 illustrates an example of selecting a scan target according to some implementations.

FIG. 12 illustrates an example 1200 of selecting a scan target according to some implementations. In this example, the UAV 102 may be preconfigured to perform autonomous capture of specific structures that have a high degree of regularity but some variation in size, height, color, or other minor features. Examples of such structures may include transmission towers, jetliners, cell towers, and so forth. Accordingly, an image 1202 of a structure 1204 presented in the user interface 602 of the mobile device or other computing device may be the actual structure, a similar structure, or a 3D model of a previous scan of a similar structure. The user may tap on or otherwise select one or more portions of the structure 1204 in the image 1202 that the user desires to capture. The user may further have already specified or may subsequently specify the scanning parameters for the scan.

Based on the selection, the user may be presented in the user interface 602 with a visual indication of the portions of the structure 1204 that will be captured, e.g., by highlighting, outlining, painting, or the like. Further, in some cases, the user may be able to adjust the selected portions, such as by tapping additional portions or tapping on selected portions to unselect certain portions. Additionally, different areas of the structure 1204 may be painted or otherwise highlighted with different colors or other visual indicators, and each different color may have its own scanning parameters that are different from those of the other colored areas. Examples of the different scanning parameters may include scanning at different distances from the structure surface, different viewing angles, different captured image overlaps, different camera resolution settings, or the like. For instance, the main supports 1206 of the structure 1204 may be highlighted with a first color to indicate a first set of scanning parameters, and the trusses 1208 of the structure 1204 may be highlighted with a second, different color to indicate a second, different set of scanning parameters.

In some examples, a machine learning model, or the like, may be used by the user interface 602 and/or the UAV 102 for performing recognition of various structures and structure parts that may be selected as scan targets. For instance, the machine learning model may have been trained based on selections and adjustments made by a plurality of users during selection of portions of the structure. During the flight by the UAV 102 for performing the scan, the UAV 102 may use the machine learning model to recognize the same parts of the structure 1204 and to scan these parts in the manner specified by the user. Furthermore, while several example user interfaces and techniques for interacting with the user interfaces are described herein for selecting a scan target for scanning, implementations herein are not limited to the examples provided, and various other techniques may be used for specifying the scan target for scanning as will be apparent to those of skill in the art having the benefit of the disclosure herein.

Figure 13:
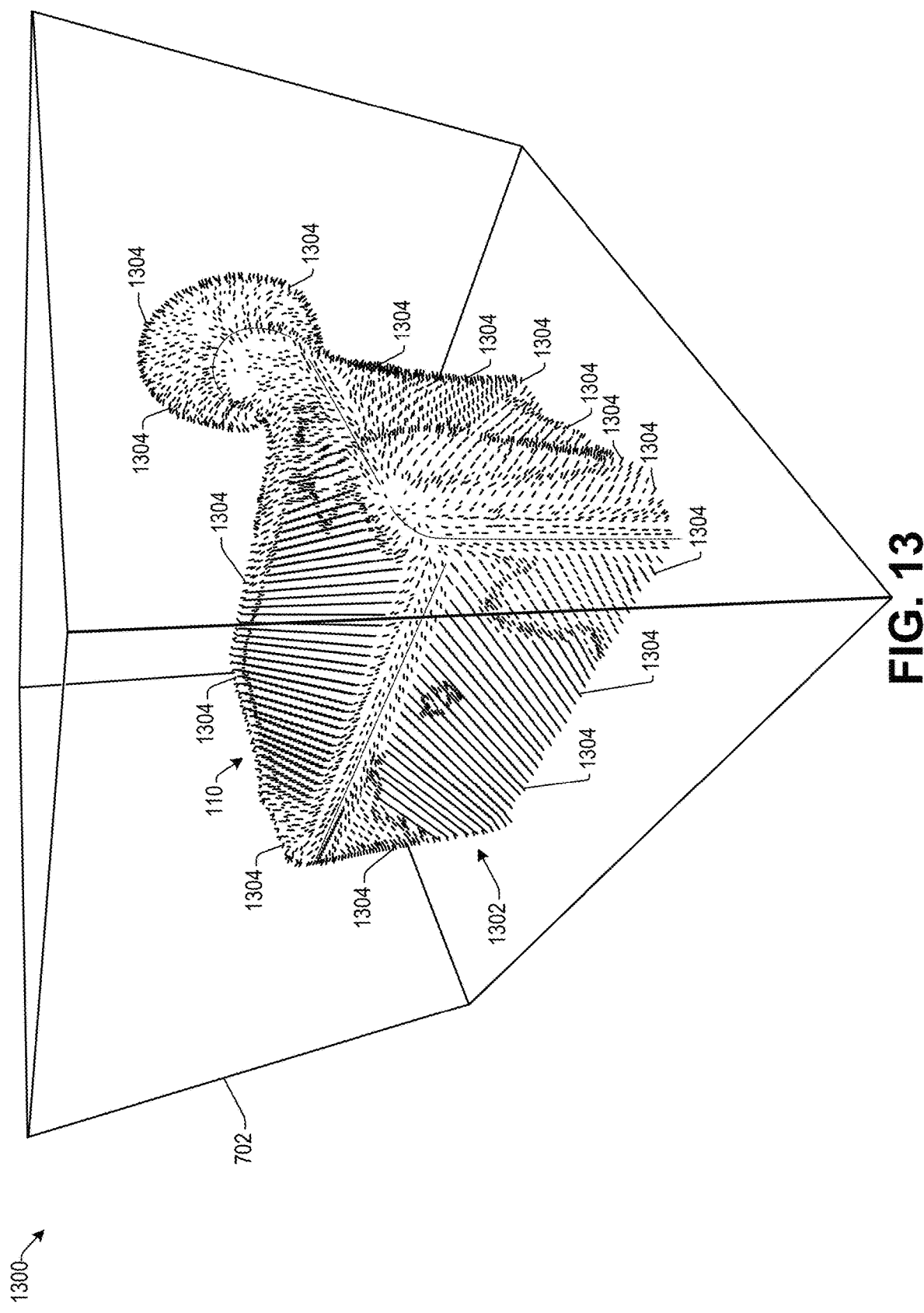
FIG. 13 illustrates an example of a lower-resolution 3D model that may be generated according to some implementations.

FIG. 13 illustrates an example of a lower-resolution 3D model 1300 that may be generated according to some implementations. For example, as discussed above with respect to FIGS. 7-12, a user may employ any of various techniques for specifying a scan target, such as the scan target 110. For instance, the bounding volume 702 may have been used to specify the scan target 110 as discussed above with respect to FIG. 7. Following selection of the scan target 110, the UAV 102 may perform an initial low-resolution scan of the selected scan target 110 and may build a coarse or otherwise lower-resolution 3D model 1300 of the scan target 110. The lower-resolution 3D model may be presented in the user interface 602 of the mobile device 632.

As one example, based on the received input that specifies the scan target 110, one or more initial poses may be generated such as by the UAV 102, the mobile device 632, or the controller 104 to enable the UAV 102 to assume several poses to capture distance (range) information for one or more surfaces of the scan target 110 to generate the lower-resolution 3D model 1300. For instance, based on the bounding volume 702 or other indication of the scan target 110, the UAV 102 may autonomously perform an initial coarse scan of the scan target 110, e.g., by performing the initial scan with one or more of the image sensors 212-216 and 302-306 discussed above and used as one or more range sensors such as by being configured for stereoscopic computer vision to detect a distance from the UAV 102 to surfaces of the scan target 110.

Based on the captured images, the UAV 102 or another computing device (e.g., the controller 104 or mobile device 632) may generate the lower-resolution 3D model 1300 of the scan target 110, e.g., at a first resolution. As one example, during the initial scan, the UAV 102 may autonomously capture images of the surfaces of the scan target 110 and may dynamically build the lower-resolution 3D model using 3D reconstruction techniques in real time while flying proximate to the scan target 110 for performing the initial scan. For instance, the lower-resolution 3D model 1300 may include a set of a plurality of points 1302 in 3D space corresponding to surfaces of the scan target 110. Further, the lower-resolution 3D model 1300 may include respective normals 1304 to some or all of the points 1302 in the set of points 1302. As one example, each normal 1304 may be a virtual line extending outward from the surface on which a respective point 1302 is located at an approximately normal (perpendicular) angle relative to the surface of the scan target 110 on which the respective point 1302 is located. For instance, the normal 1304 may extend outward from the respective surface point 1302 approximately perpendicular to a plane corresponding to the surface of the scan target 110 in an area surrounding the point 1302.

As one example, the UAV 102 may be configured to determine the initial lower-resolution 3D model 1300 of the scan target 110 based on a several images captured at locations above or otherwise around the scan target 110 and that are spaced apart to facilitate multi-view stereo analysis. For example, the processor(s) 402 of the UAV 102 may be configured to control the propulsion mechanism 202 to cause the UAV 102 to fly to assume a plurality of positions (poses) around the scan target 110. The UAV 102 may capture, using the one or more image sensors (e.g., the lower-resolution image sensors 212-216 and/or 302-306), the plurality of images of the scan target 110 from different respective positions around the scan target 110. As one example, the respective positions for the plurality of images may be selected by adjusting spacing between two or more positions to achieve a parallax disparity between two or more images of the scan target 110 within a predetermined range.

The UAV 102 may determine the lower-resolution 3D model 1300 of the scan target 110 based on fusing range images into a TSDF or using other techniques for determining the location of the surface of the scan target in 3D space. In some implementations, the plurality of positions above or otherwise around the scan target 110, from which the plurality of images of the scan target 110 are captured, may be located along a straight line. In some implementations, the plurality of positions around the scan target 110, from which the plurality of images of the scan target are captured, are located on a circle around the scan target 110. In addition, a 3D model building function of the UAV 102 may include some domain specific heuristics. For example, in the case that the scan target 110 is a bridge, the UAV 102 may be configured to not fly on top of the bridge (e.g., to avoid collisions with traffic).

In the case that the lower-resolution 3D model 1300 is built by a computing device other than the UAV 102, but the UAV 102 is configured to determine the scan plan, the UAV 102 may receive the lower-resolution 3D model 1300 via the one or more communication interfaces discussed above. Alternatively, in some examples, both the lower-resolution 3D model 1300 and the scan plan may be determined by a computing device other than the UAV 102 such as the controller 104 or mobile device 632.

In some examples, the lower-resolution 3D model 1300 may encode a set of points 1302, with respective normals 1304, in 3D space on surfaces of the scan target 110. In some implementations, the set of points may be sparse. For example, the scan target may be an area or a volume of space that contains one or more objects. For instance, the scan target may be a crime scene, a car, a truck, a bridge, a construction site, or any other object. In some cases, the lower-resolution 3D model may include a voxel occupancy map or a signed distance map. For example, the lower-resolution 3D model may be generated based on sensor data collected with one or more distance sensors (e.g., an array of image sensors configured for stereoscopic computer vision, a radar sensor, a lidar sensor, etc.).

In some implementations, the UAV 102 that is accessing the lower-resolution 3D model may have recently generated the lower-resolution 3D model itself by performing the relatively low-resolution scan using a distance sensor (e.g., the image sensors), while operating at a safe distance from the scan target. In some examples, the scan target may be scanned to generate the lower-resolution 3D model from a distance greater than the consistent distance used for scan imaging. The lower-resolution 3D model may be accessed in a variety of ways. For example, the lower-resolution 3D model may be accessed by reading directly from a distance sensor via a sensor interface or from a memory onboard the UAV 102. Further, as discussed below, the lower-resolution 3D model may be iteratively refined during execution of the scan plan to provide a higher-resolution 3D model.

Figure 14:
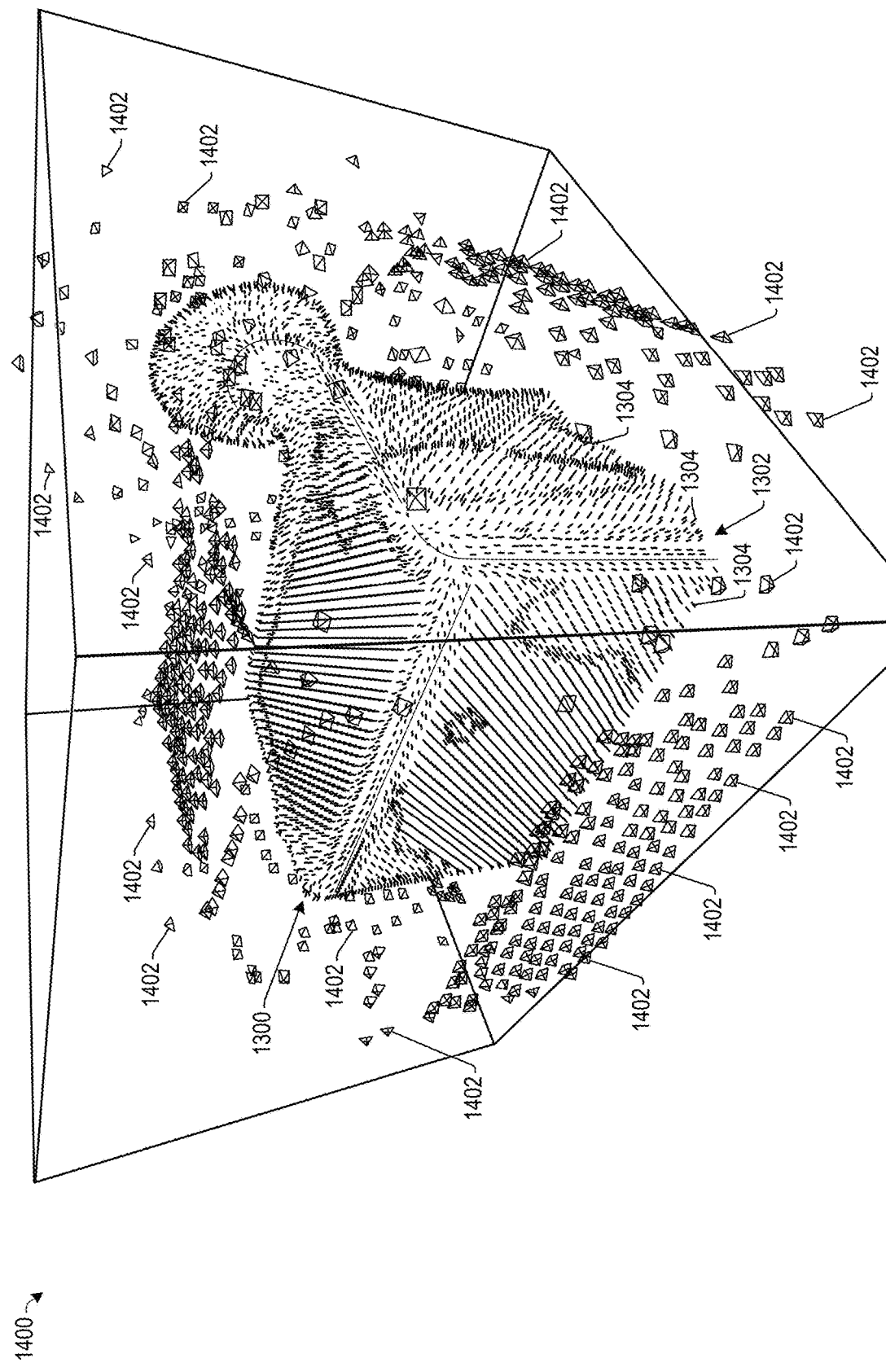
FIG. 14 illustrates an example of generating a scan plan for a 3D model according to some implementations.

FIG. 14 illustrates an example 1400 of generating a scan plan according to some implementations. Following generating or receiving the lower-resolution 3D model, the UAV 102 (or other computing device) may generate an initial scan plan for scanning the scan target 110 from which the lower-resolution 3D model was generated. In the case that the lower-resolution 3D model 1300 is built by a computing device other than the UAV 102, but the UAV 102 is configured to determine the scan plan, the UAV 102 may receive the lower-resolution 3D model 1300 via the one or more communication interfaces 426 discussed above.

Alternatively, in some examples, both the lower-resolution 3D model 1300 and the scan plan may be determined by a computing device other than the UAV 102 such as the controller 104 or mobile device 632. As still another example, rather than the UAV 102 determining the scan plan, various different types of patterns for scanning may be specified by the user or by default such as a lawnmower pattern, a spiral pattern, or the like. In some examples, the user interface 602 may present the mapping of the pattern to the user in a user interface prior to the UAV 102 beginning the scan of the specified surface, such as in a 2D or 3D augmented reality view, frozen view, or the like. In some cases, the user may view and approve the scan plan prior to the UAV 102 starting to autonomously perform the capture of images of the specified scan target 110 at the specified distance from the surface of the scan target 110. In other examples, the UAV 102 may proceed entirely autonomously without any additional input from the user, other than specifying the scan target 1002.

As mentioned above, the scan plan may include a series of poses 1402 for the UAV 102 to assume to capture a series of images of the scan target 110, such as using the higher-resolution image sensor 208. For instance, a pose 1402 of the scan plan may be determined based on one or more selected points 1302 from the set of points 1302 in the lower-resolution 3D model 1300 and a respective normal 1304 for the selected point 1302. When executing the scan plan, for each pose 1402, the processor(s) 402 may control the propulsion mechanism 202 to cause the UAV 102 to fly to assume an orientation corresponding to the specified pose 1402 of the sequence of poses 1402 of the scan plan.

The UAV 102 may use the one or more image sensors 208, 212-216 and 302-306 to capture one or more images of the scan target 110 from each pose 1402 in the scan plan. As one example, a position of the pose may be determined to be along the respective normal 1304 for the selected point 1302, and at a specified distance from the selected point corresponding to the scanning distance parameter of the scan plan. However, implementations herein are not limited to capturing images along the normals 1304, but rather, in some examples, image capture may be performed at an angle with respect to the normal 1304 for a selected point 1302. Further, there is not necessarily a one-to-one correspondence between points and poses. To the contrary, the points on the lower-resolution 3D model provide points of reference for determining optimal poses for covering the entire selected area of the scan target 110 with optimal efficiency for a desired resolution of the images, desired amount of overlap between images, and the desired scanning distance from the surface of the scan target 110.

The UAV 102 may be configured to systematically cover the points of the lower-resolution 3D model 1300 of the scan target 110 with the fields of view (FOVs) of the poses 1402 included in the scan plan. For example, the processor(s) 402 of the UAV 102 may be configured to partition the set of points 1302 of the lower-resolution 3D model 1300 into a subset of covered points and a subset of uncovered points. The covered points may be points 1302 on the lower-resolution 3D model 1300 for which one or more poses 1402 have already been specified, while the uncovered points may be those points 1302 for which poses 1402 have not yet been specified.

The scan plan may include a sequence of poses for the UAV 102 to assume to capture images of the scan target using one or more of the image sensors. A pose of the scan plan is determined based on a selected point from the set of points 1302 of the lower-resolution 3D model, and a respective normal 1304 for the selected point 1302. In some implementations, a position of the pose may be determined to be along the respective normal for the selected point at a distance from the selected point corresponding to a scanning distance parameter (e.g., a ground sampling distance (GSD)) of the scan plan. For example, poses 1402 may be iteratively added to the scan plan until all points 1302 of the lower-resolution 3D model 1300 of the scan target 110 have been covered by a field of view of at least one pose 1402 of the scan plan (e.g., depicted within a field of view at an acceptable distance and angle). In some implementations, uncovered points from the lower-resolution 3D model may be randomly selected to serve as the center point for the field of view of a new pose 1402 that determines the position and orientation of the pose 1402. In some implementations, uncovered points from the lower-resolution 3D model 1300 may be selected to maximize a number of uncovered points that will be covered by the new pose, subject to one or more constraints, such as an overlap parameter for images to be captured by the scan plan.

During development of the scan plan, for iteratively determining a next pose 1402, the processor(s) of the UAV 102 may select a next center point for a pose 1402 from the subset of uncovered points, and may determine the new pose 1402 based on the selected next center point and a respective normal 1304 for the selected next center point. For example, determining the next center point may be performed as a function of the designated distance of the image sensor from the surface of the scan target 110, the amount of area the FOV of the image sensor will cover at the designated distance, the desired amount of overlap between consecutive images, and the distance between the next center point and one or more adjacent covered center points.

The processor(s) 402 may be configured to update the partition of the set of covered and uncovered points as new poses 1402 are added to the scan plan. In some implementations, the processor(s) 402 may be configured to check a distance of a pose 1402 from a point 1302 under assessment and check an angle between a normal 1304 of the point 1302 under assessment and a normal 1302 of a selected center point of the pose 1402. Further, the processor(s) 402 may check for occlusion of a point under assessment from a pose 1402 using a ray test and may identify the point under assessment as covered or uncovered by the pose 1402 based on the distance, based on the angle, and/or based on the ray test.

The processor(s) 402 may be configured to determine an ordering for the poses 1402 to be traversed by the UAV 102 using any of various traversal techniques. For instance, the order of traversing the poses 1402 may be determined using a traveling salesman algorithm. As one example, the traveling salesman algorithm employed may be the Christofides algorithm, although implementations herein are not limited to any particular algorithm or traversal technique.

In some implementations, the processor(s) 402 may generate the scan plan to cover all points 1302 based on balancing various considerations such as obtaining full coverage of all accessible surfaces of the scan target 110, having a regular and predictable pattern for the poses 1402, and enabling efficient navigation of the UAV 102 during execution of the scan plan, such as for minimizing traversal time. In some cases, the processor(s) 402 may determine the entirety of the scan plan in advance before beginning scanning of the scan target 110 according to the scan plan. In other examples, the processor(s) 402 may determine a first portion of the scan plan, and then may determine remaining portions of the scan plan while executing the first portion of the scan plan.

In addition, the processor(s) 402 may be configured to update the 3D model and the scan plan iteratively and dynamically during execution of the scan plan based on new sensor data received during execution of the scan plan. As one example, if an obstacle is encountered during execution of the scan plan, the processor(s) 402 may update the scan plan based on the location of the obstacle, such as to avoid collision with the obstacle. Thus, the processor(s) 402 may be configured to dynamically adapt the scan plan to obstructions encountered along the way. For example, the processor(s) 402 may access a scan plan, check a next pose of the scan plan for obstructions, and responsive to detection of an obstruction, may determine a backup pose located at a position along a normal of a surface of the scan target at a center of a field of view of the next pose. The processor(s) 402 may check the backup pose for obstructions, and responsive to the backup pose being free of obstructions, may control the propulsion mechanism to cause the UAV 102 to fly to assume the backup pose. At the backup pose, the UAV 102 may capture, using the one or more image sensors (e.g., the image sensor 208), one or more images of the scan target from the backup pose.

Furthermore, as scanning of the scan target 110 is performed, additional distance information is determined and may be used to refine the 3D model. For instance, the UAV 102 may use 3D reconstruction techniques to generate a higher-resolution version of the 3D model of the scan target 110 in real time, such as based at least in part on the newly scanned images and/or newly detected distances to surface points. For example, the UAV may build a higher-resolution 3D point cloud model and/or may generate a 3D mesh model, such as based on the point-cloud model.

In some examples, the scanning and 3D reconstruction may be performed iteratively such as by adding points or other information to the 3D model 1300 during scanning of the scan target according to the initial scan plan, and dynamically updating the initial scan plan based on the information added to the 3D model. As mentioned above, the UAV 102 may use an initial course scan to generate the initial lower-resolution 3D model 1300, such as based on the TSDF. The UAV 102 may determine an initial scan plan to ensure surface coverage on the surface(s) corresponding to the lower-resolution 3D model defined by the TSDF. The UAV 102 may fly some or all of the initial scan plan while continuing to update the 3D model 1300 by fusing additional range images as the UAV 102 navigates the scan plan. Accordingly, the quality of the surface information for the 3D model may be improved as the UAV navigates the scan plan. Furthermore, as the 3D model is iteratively improved in accuracy, coverage, etc., the scan plan may be dynamically updated such as to cover new points that were previously not included or to avoid obstructions, or the like.

The UAV 102 may also be configured to dynamically adapt camera parameters of the one or more image sensors (e.g., the image sensor 208) to conditions encountered during execution of the scan plan. For example, the processor(s) 402 may be configured to update an exposure time, a white balance parameter, and/or sensor gain (e.g., an ISO value) based on data regarding current lighting conditions (e.g., based on an autoexposure parameter returned by an autoexposure module of an image sensor). Additionally, in some examples, the results of the scan may be examined in real time, such as by a machine learning model for recognizing areas of interest, such as damaged areas, corroded areas, areas in need of maintenance, and so forth. In some cases, the machine learning model may be executed onboard the UAV 102, and may provide an output that may cause the scanning program 408 to increase the resolution of the image sensor and/or decrease the specified scanning distance when capturing images of recognized areas of interest.

During execution of the scan plan, the propulsion mechanism of the UAV 102 may be controlled to cause the UAV 102 to fly to assume a pose 1402 corresponding to one of the sequence of poses of the scan plan. The UAV 102 may capture, using the one or more image sensors, one or more images of the scan target from each pose 1402. For example, images may be captured for each of the poses 1402 of the scan plan until images covering all of the set of points of the 3D model of the scan target have been captured, including any newly added points. In some implementations, the processor(s) 402 may be configured to stitch the captured images together to obtain a composite image of one or more surfaces of the scan target 110.

During the scanning, the UAV 102 may fly the computed path while taking images of the scan target 110. In addition to avoiding obstacles, the UAV 102 may update the path dynamically for things like obstacle avoidance or improved image alignment. For example, the UAV 102 may dynamically adapt a scan plan to account for obstructions encountered along the way. For example, the process 2300 of FIG. 23 may be implemented to dynamically adapt a scan plan to obstructions encountered during execution of the scan plan, while the processes of FIGS. 15-17 and 22 may be implemented for iteratively and dynamically updating the scan plan and the 3D model.

When the UAV 102 has either completed the scan, or must abort the scan (e.g., due to low battery, or a vehicle fault), the UAV 102 may automatically return to its take-off point and land. To the extent the UAV 102 must land before completion of the scan plan, the UAV 102 may save a state of progress for the scan plan so that the UAV 102 or a different UAV can start scanning where the UAV 102 left off after whatever condition that caused it to land is resolved. For example, after starting and before completing the scan plan, the UAV 102 may store a scan plan state indicating a next pose of the sequence of poses of the scan plan. After storing the scan plan state, the UAV 102 may control the propulsion mechanism to cause the UAV 102 to fly to land. After landing, the UAV 102 may control the propulsion mechanism to cause the UAV 102 to fly to take off again. The UAV 102 may access the scan plan state and based on the scan plan state, control the propulsion mechanism to cause the UAV 102 to fly to assume the next pose and continue execution of the scan plan.

The scan plan may include at least a sequence of poses of the UAV 102 and may include more information. The poses may be encoded in various coordinate systems (e.g., a global coordinate system or a coordinate system with respect to the docking station 106 for the UAV 102, or other takeoff location, or a coordinate system with respect to the scan target being scanned. The scan plan state, in combination with a visual inertial odometry (VIO) system, may be used to assume a next pose in the scan plan after recharging. For example, the UAV 102 may automatically land on the docking station 106, and, after automatically charging its battery, may take off from the docking station 106 to resume the scan at the next pose based on the saved state information.

When execution of the scan plan is complete, the collected data (e.g., high resolution images of the surfaces of the scan target and associated metadata) may be transmitted to another computing device (e.g., the controller 104, mobile device 632, or a cloud server) for viewing or offline analysis. The higher-resolution 3D model may also be transmitted to the user's computing device, if it has not already been sent. In some implementations, a status report summarizing the progress or effectiveness of execution of the scan plan may be presented. Additionally, or alternatively, the user interface on the mobile device 632 may present a 3D model of the scan target, such as by acquiring the 3D model from the UAV 102. As successive poses are traversed, the mobile device 632 may paint, highlight, or otherwise visually distinguish the portions of the 3D model for which images have been captured. Accordingly, the user may view the progress of the UAV 102 in scanning the scan target, such as for detecting any missed areas, or the like. In addition, the data received from the UAV 102 may include stitched composite images of the scan target, the captured photos, as well as metadata including the camera poses, and flight summary data (e.g., photos captured, percentage of flight completed, flight time, etc.).

During or following execution of the scan plan, the processor(s) 402 may generate the higher-resolution 3D model of the scan target 110. In some examples, the higher-resolution 3D model may include a 3D point cloud, and the images taken during the scanning may be correlated to points on the 3D point cloud. In addition, in some examples, a mesh model may be generated based on the 3D point cloud using known 3D modeling techniques. Furthermore, the 3D model may be made immediately available for viewing by the user 108, such as by using the controller 104, the mobile device 632, or through other computing devices able to communicate with the UAV 102. As one example, the user may view the higher-resolution 3D model and associated coverage to ensure that all desired portions of the scan target 110 have been captured during the scanning and/or to specify rescanning any areas that have missing images or other missing information, or areas interest that are believed to be of sufficient interest to warrant rescanning at higher resolution, closer distance, or the like.

FIGS. 15-23 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

Figure 15:
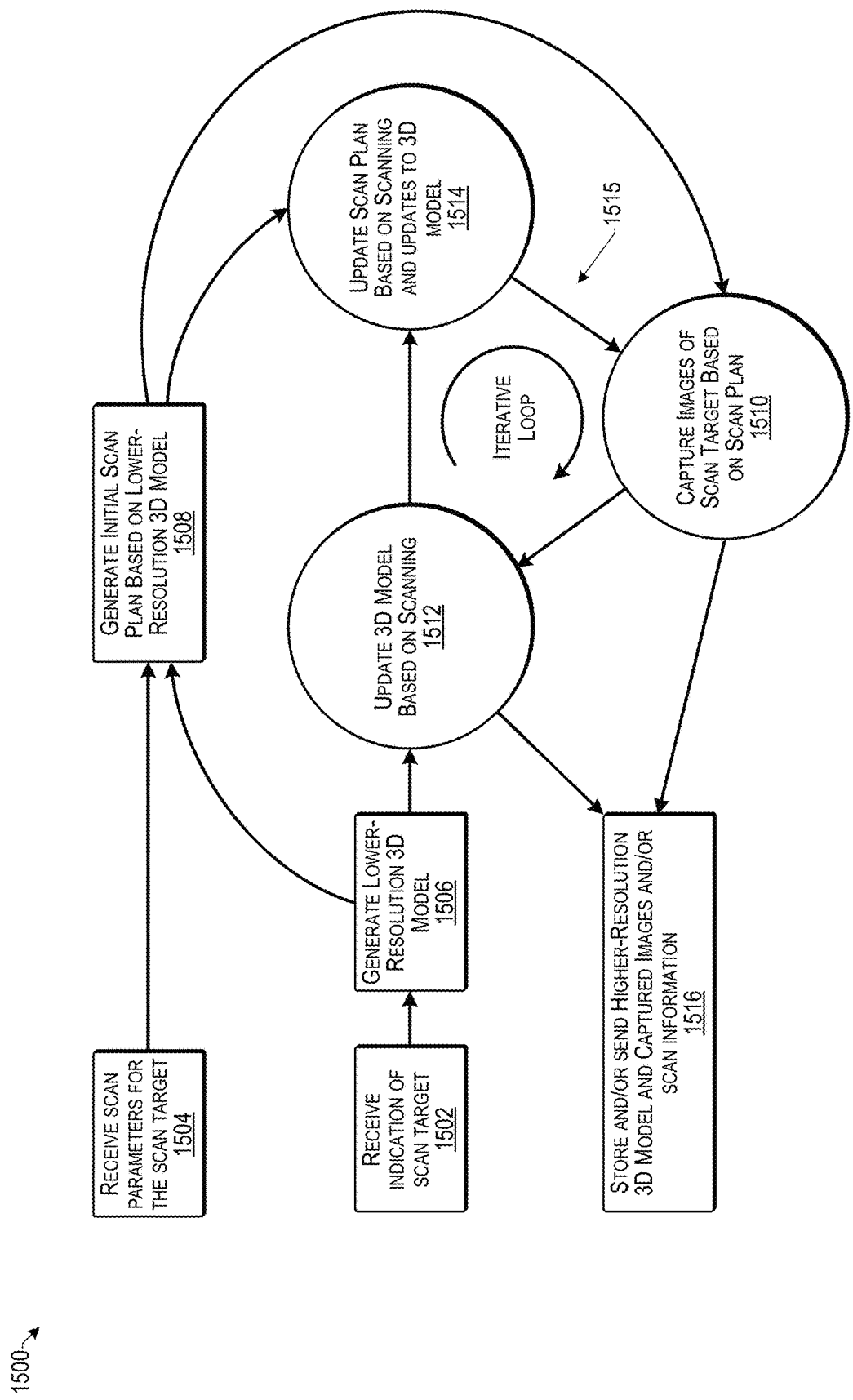
FIG. 15 illustrates an example process of iterative updating of the 3D model and/or the scan plan according to some implementations.

FIG. 15 illustrates an example process 1500 of iterative updating of the 3D model and/or the scan plan according to some implementations. In some examples, the process 1500 may be executed by the UAV 102 at least in part by executing the scanning program 408 on one or more processors 402 of the UAV 102.

For instance, as mentioned above, in some examples that 3D model and the scan plan may be iteratively refined or otherwise updated during the scanning of the scan target. As the scanning is performed according to the initial scan plan, 3D reconstruction may be used to add new points or other information to the 3D model. Based on the updates to the 3D model, the initial scan plan may be dynamically updated, such as by adding new poses or modifying existing poses. As mentioned above, the UAV 102 may use an initial course scan to generate an initial lower-resolution 3D model, such as based on the TSDF. The UAV may determine an initial scan plan to ensure surface coverage on the surface(s) corresponding to the lower-resolution 3D model defined by the TSDF. The UAV 102 may fly some or all of the initial scan plan while continuing to update the 3D model by fusing additional range images as the UAV navigates the scan plan. Accordingly, the quality of the surface information for the 3D model may continue to be improved as the UAV 102 navigates the scan plan. In some cases, as the 3D model is iteratively improved in accuracy, coverage, etc., the scan plan may be dynamically updated also, such as to cover new points that were previously not included in the scan plan and/or to avoid obstructions encountered during execution of the initial scan plan.

At 1502, the UAV 102 may receive an indication of a scan target. For example, the UAV 102 may receive the indication of the scan target through any of the various techniques discussed above, such as with respect to FIGS. 6-12.

At 1504, the UAV 102 may receive scan parameters for the indicated scan target. In some examples, some of the scan parameters may be set in advance as default parameters for a particular type of scan and or structure, scene, or the like. For example, a scan to be performed on a bridge may have a first default set of parameters, while a scan to be performed on an accident scene may have a second, different default set of parameters. The user may adjust parameters manually to accommodate various situations. Examples of scan parameters may include distance of the scan from the target surface (ground sampling distance), overlap of the captured images, camera settings for the captured images, such as resolution, amount of zoom, exposure time, and so forth, as also discussed elsewhere herein.

At 1506, in response to receiving the indication of the scan target, the UAV 102 may generate a lower-resolution model based on an initial rough scan of the specified scan target. For example, depending on the type of indication received, the UAV may navigate proximate to the scan target to capture one or more range images using the onboard image sensors. For instance, the UAV may fuse range images from stereo pair navigation image sensors and/or wide baseline MultiView Stereo (MVS) image sensor pairs into a volumetric TSDF, which is used to generate a surface mesh estimate including a plurality of points and respective normals for each of the points. The initial TSDF-generated 3D model may typically be a lower-resolution 3D model and may have lower accuracy because the scan target has not yet been imaged or otherwise scanned from sufficiently diverse points of view or at a sufficiently close distance for generating a higher accuracy and thereby higher-resolution 3D model. For example, the more images that the UAV 102 captures of the target surface, and the closer the UAV 102 flies to a surface, the more accurate the estimate of the surface location and shape becomes in the TSDF as the UAV 102 continues to fuse stereo pair range images into the 3D model.

At 1508, the UAV 102 may generate an initial scan plan based on the lower-resolution 3D model. As one example, as mentioned above, the determination of the scan plan may include starting with a first point of the lower-resolution 3D model as a center point of a first pose and progressing successively outward from that point until all points in the lower-resolution 3D model are covered by the field of view of at least one pose.

At 1510, the UAV 102 may capture images at the poses specified in the scan plan during the traversal of the poses in the scan plan. In some examples, the UAV 102 may provide at least some of the captured images and/or pose information of captured poses and captured points on the 3D model to the mobile computing device 632 or controller 104, e.g., as the images are captured.

At 1512, the UAV 102 may update the 3D model based on the images captured during execution of the scan plan. For example, while the UAV 102 is using the image sensor 208 for capturing high-resolution images of the scan target surface, the UAV 102 may also employ the additional image sensors 212, 214, 216, 302, 304, and 306 for gathering additional range measurements of the distance from the known location of the UAV 102 to the surfaces of the scan target. The UAV 102 may employ 3D reconstruction techniques, such as fusing the additional range images from the image sensors 212, 214, 216, 302, 304, and 306 into the volumetric TSDF, to generate additional points respective normals for the 3D model. Accordingly, as the UAV 102 executes the scan plan, the 3D model may be transformed from the lower-resolution 3D model to a higher-resolution 3D model.

At 1514, based on the updates to the 3D model, the UAV 102 may update the scan plane for the scan target. For example, if new uncovered points are added to the 3D model, the UAV 102 may dynamically update the scan plan to determine additional poses to cover the additional uncovered points in the 3D model. Further, if the UAV encounters an obstruction that prevents capture of one or more points at one or more poses, the UAV may determine an alternative pose for capturing these points. Following updating of the scan plan, the process may return to 1510 to continue to capture images based on the scan plan. Accordingly, as indicated at 1515, the UAV 102 may execute an iterative loop in which the 3D model is continually updated during the scanning, and the scan plan may be dynamically updated to cover any additional parts of the model that are not yet included in the scan plan. This iterative process enables generation of a higher-resolution 3D model that, in some cases, may be substantially more accurate than the initial lower-resolution 3D model generated at 1506. In some examples, when there are no more updates to the scan plan, and execution of the scan plan is complete, the process may go to 1516. In other examples, 1516 or portions thereof may be executed during execution of the iterative loop 1515, e.g., as the captured images, updated 3D model information, and/or scan information become available.

At 1516, the UAV 102 may store the higher-resolution 3D model and the images captured during the scan in memory onboard the UAV 102 and/or may export the higher-resolution 3D model, captured images and/or scan information, such as pose location information (e.g., GNSS location information or other location information for each pose) from the UAV 102 to one or more computing devices, such as the controller 104, the mobile device 632, and/or a server located over a network. The UAV 102 may export at least a portion of this information while performing the scan or, alternatively, after the UAV 102 has completed the scan of the scan target.

In some examples, the 3D model information, the captured images, and/or the scan progress and scan pose location information may be sent wirelessly to the controller 104, mobile device 632, or another computing device as the scan of the scan target is taking place. In other examples, the images may be stored in a removable memory card onboard the UAV 102 and removed after flight is completed. In addition, by receiving the scan progress and scan pose location information during the scan, the user may be able to track coverage of the scan using a user interface presented on the mobile device that updates points on the 3D model for which images have been captured, such as by highlighting, painting, or otherwise visually distinguishing areas corresponding to captured points. In some cases, the images may be correlated with the points on the higher-resolution 3D model for enabling creation of a textured 3D model of the scan target, such as for viewing the scan target, performing high-resolution inspection of the scan target, or any of various other observation, computer graphic, or computer modeling operations that may be performed with such a high-resolution 3D model and high-resolution images. For example, additional model building and rendering may be performed on one or more other computing devices using the high-resolution 3D model, the scanned images, and other scan data and metadata received from the UAV 102.

Figure 16:
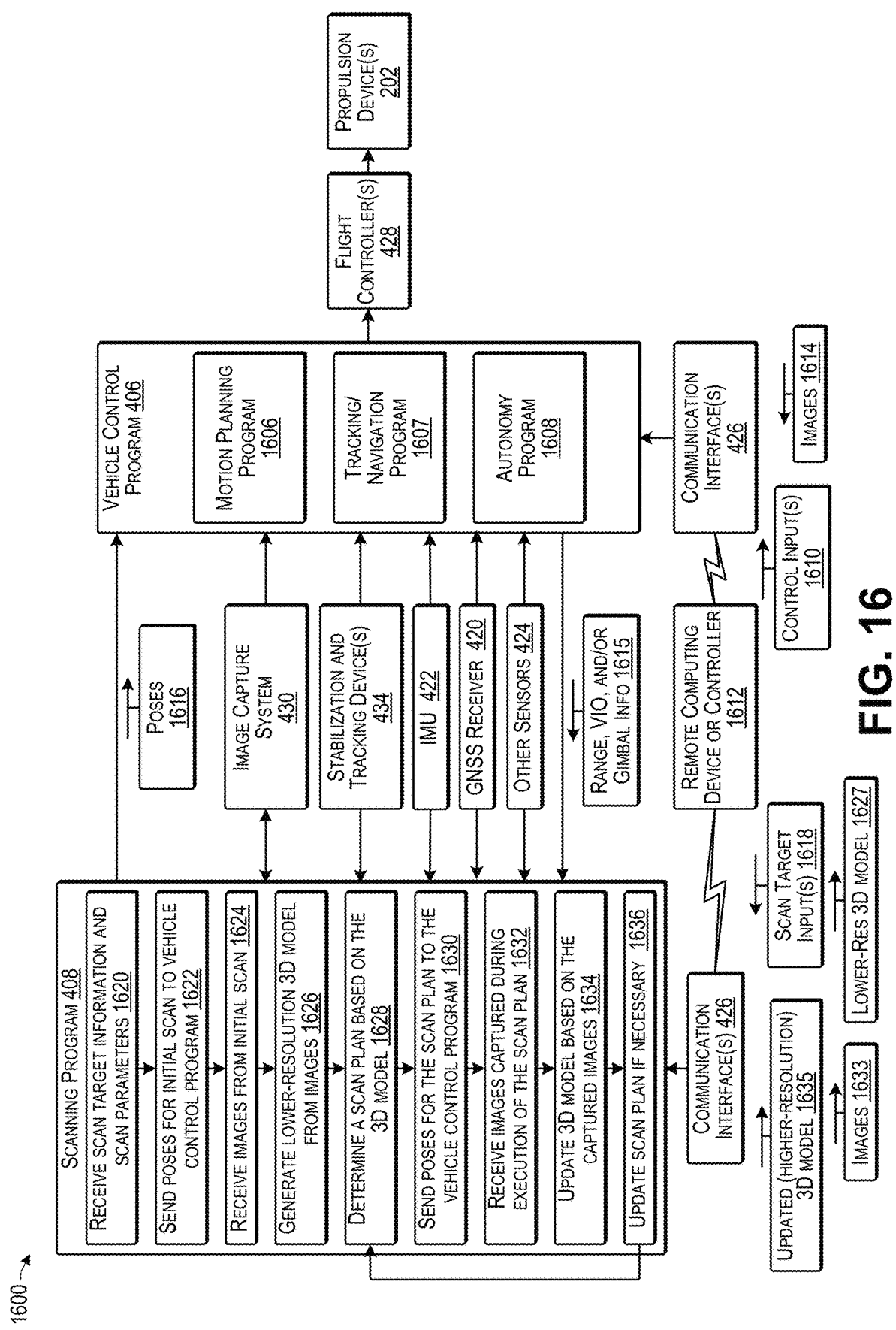
FIG. 16 illustrates an example logical configuration of the UAV according to some implementations.

FIG. 16 illustrates an example logical configuration 1600 of the UAV 102 according to some implementations. As mentioned above, in some examples, the scanning program 408 and the vehicle control program 406 may be executed by the one or more processors 402 of the UAV 102 for receiving inputs from any number of systems, sensors, and the like, for controlling the UAV 102 for scanning a scan target. For example, the scanning program 408 and the vehicle control program 406 may be implemented as instructions stored in memory or other computer readable media 404 and executable by the one or more processors 402. Alternatively, in some examples, at least a portion of the scanning program 408 may be executed on a different computing device, such as the controller 104 or mobile device 632.

As illustrated in FIG. 16, the vehicle control program 406 may include a motion planning program 1606, a tracking and/or navigation program 1607, and an autonomy program 1608; although more or fewer programs and modules may be included in the vehicle control program 406 in other examples. The motion planning program 1606 may be executed to configure the UAV 102 for autonomously maneuvering the UAV 102 through a physical environment. Furthermore, the tracking and/or navigation program 1607 may determine one or more objectives of the UAV 102 during flight, such as for determining a destination of the UAV and/or for performing various other objectives determined for the UAV 102. Additionally, the autonomy program may perform processing for enabling autonomous flight, such as determining distances to objects, relative image sensor positions, and the like. In some examples, the tracking/navigation program 1607 may include image processing capabilities, object detection and tracking algorithms, identity recognition algorithms, and so forth (not shown). Furthermore, in some implementations, one or more of the motion planning program 1606, the tracking/navigation program 1607, and/or the autonomy program 1608 may be separate programs, rather than combined into the vehicle control program 406.

In some implementations, the motion planning program 1606 may be executed to generate a planned trajectory through a 3D space of a physical environment. For instance, the planned motion of the UAV 102 may be based in part on images received from the image capture system 430, which may include the image sensors 208, 212-216, and 302-306. In addition, in some implementations, the motion planning program 1606 may rely on information received from the autonomy program 1608 and other sensors and devices such as IMU 422, GNSS receiver 420, and/or other sensors 424, such as a barometer, proximity sensors, magnetometer, radar, lidar, and so forth.

Furthermore, in some examples, the vehicle control program 406 may receive one or more control inputs 1610 from external sources such as from a remote computing device or controller 1612, e.g., the controller 104, mobile device 632, or other computing device, through the one or more communication interfaces 426. For example, the control inputs 1610 may set forth one or more specified navigation objectives. For instance, the control input(s) 1610 may include calls via an API associated with the vehicle control program 406. For example, the API calls may be made by an application executing on a remote computing device or controller 1612 for setting one or more navigation objectives as part of the motion planning process. Navigation objectives may include, for example, avoiding collision with other objects, maneuvering to follow a particular object, maneuvering to a specified location, traversing a specified area or the like. In some implementations, the generated planned trajectory may be continuously or continually (i.e., at regular or irregular intervals) updated based on new inputs (e.g., new sensor data and/or new control inputs 1610 received via the communication interfaces 426 as the UAV 102 autonomously navigates the physical environment.

In some implementations, the vehicle control program 406 may generate control commands configured to cause the UAV 102 to maneuver along the planned trajectory generated by the motion planning program 1606. For example, the control commands may be provided to one or more flight controllers 428 for controlling the one or more propulsion devices 202 discussed above, e.g., with respect to FIGS. 2 and 3.

The tracking/navigation program 1607, operating separately or in conjunction with the motion planning program 1606, may be configured to determine navigation functions such as for navigating in the physical environment, for example, based on received images or other received sensor information, and/or based on one or more control inputs 1610 from the remote computing device or controller 1612, and/or based on one or more specified navigation objectives. In particular, the motion plan The tracking/navigation program 1607 may communicate with the motion planning program 1606 and the autonomy program 1608, for example, to maneuver the UAV 102 based on measured, estimated, and/or predicted positions, orientations, and/or trajectories of objects, structures, and landmarks in the physical environment. For example, the tracking/navigation program 1607 may communicate a navigation objective to the motion planning program 1606 to cause the motion planning program 1606 to determine a suitable flight path for achieving the navigation objective. In addition, the tracking/navigation program 1607 may continually send images 1614, such as real-time video to the remote computing device or controller 1612 for presentation on an associated display, such as the touchscreen 604 discussed above.

Further, the autonomy program 1608 may execute, invoke, or otherwise interact with the motion planning program 1606 and the tracking/navigation program 1607 for enabling autonomous flight and to provide information to the scanning program 408, such as range information, visual inertial odometry (VIO) information, and/or gimbal positioning information 1615. For example, the motion planning program 1606 may receive images from the image capture system, such as from the navigation image sensors, e.g., image sensors 212, 214, 216, 302, 304, 306, and may use stereo image analysis for range determination for determining distances to various points on the scan target. Accordingly, this range information and other information determined by the motion planning program 1606 and/or the tracking/navigation program 1607 may be provided by the autonomy program 1608 to the scanning program 408 rather than having the scanning program 408 repeat these image processing steps. For instance, the information 1615 may be used for generating or updating the 3D model as discussed above.

The scanning program 408 may send poses 1616 to the vehicle control program 406 to cause the vehicle control program 406 to navigate the UAV 102 to desired locations for capturing images of a scan target. For instance, the poses 1616 may be poses for executing a scan plan and/or for performing an initial rough scan of a scan target for generating a lower-resolution 3D model to use for generating the scan plan. For example, the poses 1616 may be received by the vehicle control program 406 and provided to at least one of the motion planning program 1606, the tracking/navigation program 1607, or the autonomy program 1608, which may determine how to navigate the UAV 102 to individual poses.

The scanning program 408 may initially receive one or more scan target inputs 1618 from the remote computing device or controller 1612. For example, the scan target input(s) 1618 may indicate a scan target to be scanned, which may include any of the techniques discussed above with respect to FIGS. 7-12, or through any of various other techniques. For instance, as another example, the scan target input(s) 1618 may include a previously constructed lower-resolution 3D model of a scan target in the vicinity of the UAV 102. The scan target inputs 1618 may further include various scan parameters, such as a specified distance from the target surface for the scan to be performed, an amount of image overlap, scan camera settings, such as resolution, zoom, exposure, and so forth.

Based on receiving the scan target input(s) 1618, the scanning program 408 may be executed by the processor(s) 402 to perform a plurality of operations 1620-1636. For instance, in some cases, the process of FIG. 16 may include some or all of the process of FIG. 15 discussed above and the process of FIG. 17 discussed below, and provides one example of interaction between the components of the UAV 102 during execution of the processes of FIGS. 15 and 17.

At 1620, the processor(s) 402 may receive scan target information and scan parameters, such as the scan target inputs 1618 discussed above to initiate a scan of a scan target.

At 1622, the processor(s) 402 may send poses 1616 for an initial scan to the vehicle control program 406 based on the received scan target inputs 1618. For example, the scanning program 408 may send a plurality of poses 1616 to the vehicle control program 406 for performing an initial low-resolution scan of the scan target. As one example, in the case that the scan target inputs 1618 include a bounding volume, the poses 1616 for the initial scan may be based on the bounding volume information. For example, the poses 1616 may include navigation to at least two of the upper corners or edges of the bounding volume that are diagonally opposed to one another and directing the field of view of the image sensor(s) toward the center of the bounding volume for capturing and recognizing any scan target surfaces within the 3D volume of the bounding volume. Alternatively, such as in the case that a single polygon or other 2D shape is used to specify the scan target, the UAV may navigate to a view over the polygon to obtain at least one image that generally encompasses the area indicated by the polygon. In some examples, as few as one or two poses 1616 may be employed for performing the rough scan of the indicated scan target, while in other examples, a larger number of poses 1616 may be employed for capturing sufficient information about the scan target for generating a lower-resolution 3D model of the scan target.

At 1624, the processor(s) 402 may receive images from the initial scan of the scan target. For example, the images may be received from the image capture system 430. In some examples, the images may be from two or more different image sensors and taken contemporaneously to enable an easier determination of the distance (range) from the UAV 102 to the surface of the scan target, such as based on determining a parallax between at least a pair of associated images of the same point(s) on the scan target. Alternatively, in other examples, as discussed above, to avoid repetitive processing, range information and UAV position information may be received from the autonomy program 1608 and may be used by the scanning program 408 for generating or updating a 3D model as discussed below.

At 1626, the processor(s) 402 may generate a lower-resolution 3D model based on range information determined from the images received during the initial scan. For example, based on the determined distances to the surfaces of the scan target determined from the captured images, the processors 402 may generate a rough or otherwise lower-resolution 3D model of the scan target that may include a plurality of points in 3D space determined based ranges determined from the captured images. In addition, the processor(s) 102 may determine respective normals for some or all of the points in the lower-resolution 3D model. As one example, as discussed additionally below with respect to FIG. 17, the lower-resolution 3D model (as well as subsequent 3D model updates) may be generated using a truncated signal distance function (TSDF) or through other suitable techniques familiar to those of skill in the art. In some examples, the lower-resolution 3D model 1627 may be sent to the remote computing device or controller 1612 for presentation in a user interface to enable the user to view the lower-resolution 3D model.

At 1628, the processor(s) 402 may determine a scan plan based on the lower-resolution 3D model. As one example, as mentioned above, the determination of the scan plan may include starting with a first point of the lower-resolution 3D model as a center point of a first pose and progressing iteratively outward from that point until all points in the lower-resolution 3D model are covered by the field of view of at least one pose in the scan plan.

At 1630, the processor(s) 402 may send poses 1616 for the scan plan to the vehicle control program 406. For example, in response to receiving the poses 1616 of the scan plan, the vehicle control program 406 may cause the UAV 102 to traverse the poses 1616 in the scan plan for capturing images of the scan target. The vehicle control program 406 (or the scanning program 408) may use any of a plurality of techniques for determining an efficient traversal of the poses in the scan plan such as by using a traveling salesman algorithm, a lawnmower pattern, a spiral pattern, or any other suitable algorithm. In some implementations, the tracking/navigation program 1607 may be further configured to generate control commands that cause one or more stabilization/tracking devices 812 (e.g., the gimbal 210) to adjust an orientation and/or position of the image sensor 208 relative to the body of the UAV 102 based on the motion and orientation of the UAV 102 with respect to a current pose of the scan plan, or the like. For example, while scanning the scan target, the gimbal 210 may be continually adjusted to enable the image sensor 208 to capture images of points on the scan target at a respective pose according to the scan plan while taking into account the current body orientation of the UAV 102 with respect to the surface of the scan target being scanned.

At 1632, the processor(s) 402 may receive images captured during the traversal of the poses in the scan plan. For example, the image capture system 430 may provide at least some of the captured images to the scanning program 408 and/or the autonomy program 1608. In addition, in some examples, the scanning program 408 may provide at least some images 1633 to the remote computing device or controller 1612 as the images 1633 are received from the image capture system 430. In some examples, the images 1633 may be provided directly from the image capture system 430 to the remote computing device or controller 1612 during execution of the scan plan or after execution of the scan plan.

At 1634, the processor(s) 402 may update the 3D model to generate a higher-resolution 3D model based on the captured images received during execution of at least a portion of the scan plan. As one example, similar to the lower-resolution 3D model, the updated higher-resolution 3D model may include a 3D point cloud or 3D mesh, such as determined based on TSDF fusion of images from multiple ones of the image sensors 212, 214, 216, 302, 304, 306, captured during execution of the scan plan, and that is of higher accuracy with regard to the actual locations of the points representative of the surfaces of the scan target. In some cases, at least a portion of the range or other distance information for determining the updated 3D model may be received from the autonomy program 1608, such as based on range and location information generated by the motion planning program 1606. The updated higher-resolution 3D model is of higher resolution as compared to the lower-resolution 3D model determined from the initial scan. Furthermore, in some examples, the updated higher-resolution 3D model 1635 may be sent to the remote computing device or controller 1612 during or following execution of the scan plan. For instance, the 3D model may be updated in real time as the UAV 102 is in flight and traversing the scan plan.

At 1636, the processor(s) 402 may determine whether to update the scan plan, such as based on one or more updates to the 3D model and/or based on encountering an obstruction during execution of the scan plan. If so, the process goes back to 1328 to determine an updated scan plan. For example, if there are new or otherwise uncovered points in the updated 3D model, then the scan plan may be updated to cover and scan those points. An example process for adapting the scan plan to new points is discussed additionally below with respect to FIG. 22. Further, if an obstruction is encountered that prevents capturing one or more poses from the scan plan, the scan plan may be updated to determine one or more new poses for the points that remain uncovered due to the obstruction. An example process for adapting to an obstruction is discussed additionally below with respect to FIG. 23.

Figure 17:
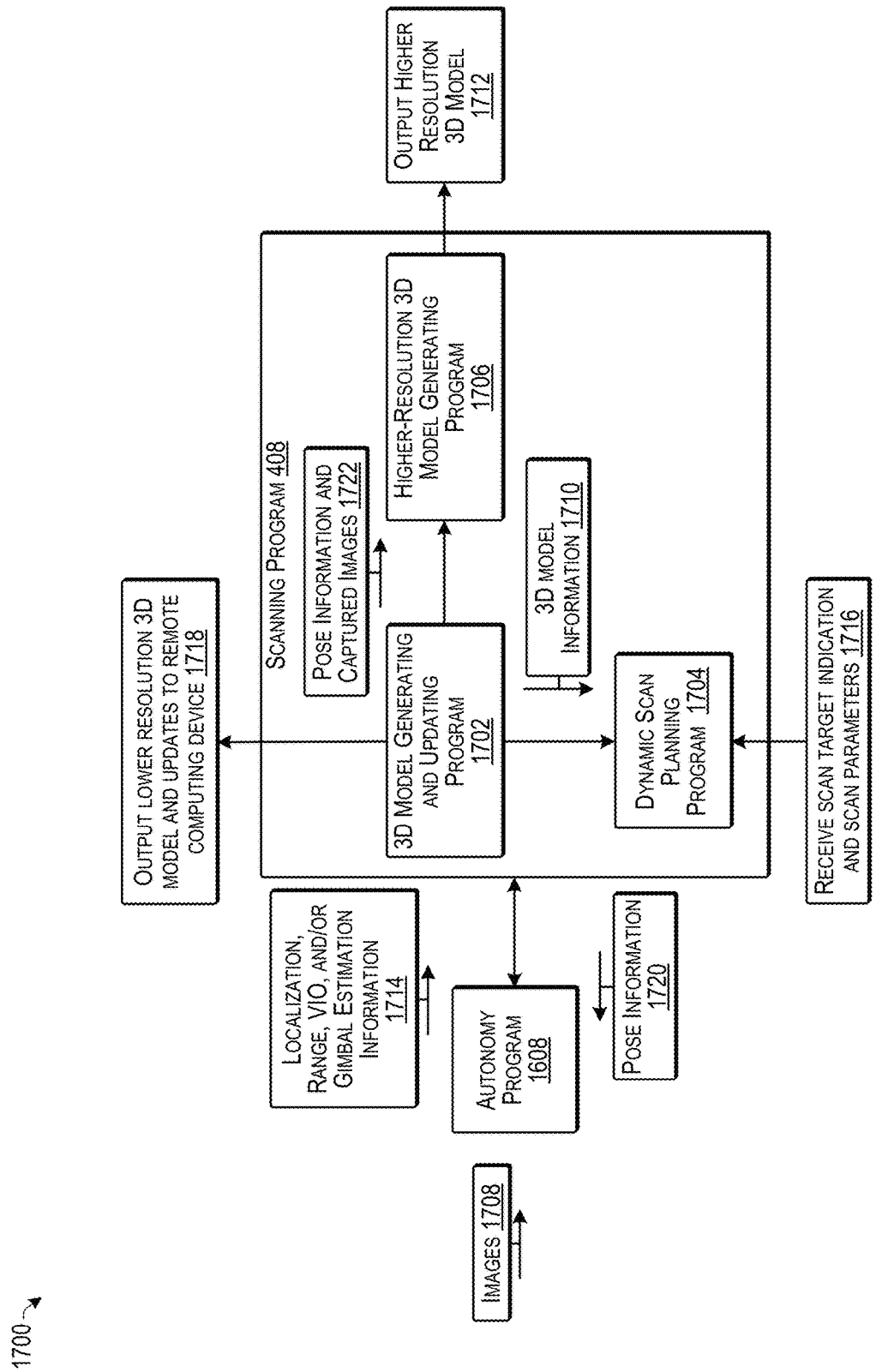
FIG. 17 illustrates an example logical configuration and process for generating 3D models based on the scanning according to some implementations.

FIG. 17 illustrates an example logical configuration and process 1700 for generating 3D models and updated scan plans according to some implementations. In this example, the scanning program 408 may include a 3D model generating and updating program 1702, a dynamic scan planning program 1704, and a higher-resolution 3D model generating program 1706. For example, the 3D model generating and updating program 1702 may perform real-time 3D reconstruction onboard the UAV 102 while the UAV 102 is in flight to generate and update a 3D model based on images 1708 of the scan target captured by the image sensors 208, 212, 214, 216, 302, 304, and 306 (not shown in FIG. 17).

Further, the dynamic scan planning program 1704 may generate or update a scan plan based on 3D model information 1710 received from the 3D model generating and updating program 1702. For instance, the 3D model information 1710 may initially include lower-resolution 3D model information for generating an initial scan plan, and may subsequently include updated 3D model information for generating an updated scan plan based on the updated 3D model information. In addition, a higher-resolution 3D model generating program 1706 may be executed to perform additional 3D reconstruction onboard the UAV 102, e.g., at a photo-grade level to output a higher-resolution 3D model, as indicated at 1712. In some cases, the processes discussed with respect to FIG. 17 may be executed as part of the processes discussed above with respect to FIGS. 15 and 16.

As one example, the autonomy program 1608 may provide robust and high-rate localization and depth/distance range estimation that is used for enabling autonomous navigation for the UAV 102 and that may also be used during 3D reconstruction to generate or update the 3D models herein. Thus, as indicated at 1714, the autonomy program 1608 may provide localization information, range information, visual inertial odometry (VIO) information, and/or gimbal estimation information to the scanning program 408. The 3D model generating and updating program 1702 may employ the localization and range information received from the autonomy program 1608 for use in performing the 3D reconstruction to build a metrically consistent geometric 3D model of the scan target with essentially drift-free localization. The 3D model generated by the 3D model generating and updating program 1702 may be further refined for improved accuracy and detail by the higher-resolution 3D model generating program 1706. In some examples, the higher-resolution 3D model generating program 1706 may be executed following completion of at least a portion of the scan plan, while in other examples, the higher-resolution 3D model generating program 1706 may also be executed in real time while the UAV 102 is scanning the scan target or otherwise still in flight after completing at least a portion of the scan plan, the timing of which may depend in part on the onboard processing capabilities of the UAV 102. Further in other examples, the UAV 102 may execute at least a portion of the higher-resolution 3D model generating program 1706 after landing. As yet another alternative, at last a portion of the operations of the higher-resolution 3D model generating program 1706 may be executed on a remote computing device, such as the controller 104, the mobile device 632, or another remote computing device (all not shown in FIG. 17) able to communicate with the UAV 102 and/or receive data from the UAV 102.

The received VIO information may include an in-flight estimation of vehicle motion, image sensor information, and IMU biases. For instance, some examples may include feature tracking that may be used to track points between two image frames. In some cases, the VIO information may be correlated with IMU-based position information and/or GNSS-based position information. In some examples, the autonomy program 1608 may include the motion planning program 1606 and/or the tracking/navigation program 1607, while in other cases, the autonomy program may receive data from the motion planning program 1606 and/or the tracking/navigation program 1607.

In addition, the gimbal estimation information may indicate the rotation or other position of the gimbaled image sensor (e.g., image sensor 208 in the example UAV 102 discussed with respect to FIGS. 2 and 3). For instance, the rotation of the gimbaled image sensor 208 may be estimated with respect to the UAV body by correlating pixels of images from the image sensor 208 with pixels of images from one or more of the other image sensors 212, 214, 216, 302, 304, and 306. Further, initial estimations for pitch and roll may be determined based on an IMU gravity vector. Additionally, yaw may be determined based on input from a gyroscope that may be included in the IMU or that may be separate from the IMU.

In some examples, the autonomy program 1608 may determine ranges from the UAV 102 to surfaces of the scan target. For example, the autonomy program 1608 may dynamically select stereo pairs of the image sensors 212, 214, 216, 302, 304, and 306 to use images obtained from the selected image sensors 212, 214, 216, 302, 304, and 306 to predict the range (distance) from the UAV 102 to one or more points on the surface of the scan target for determining the location of those points in 3D space relative to a known location of the UAV 102. In some cases, the autonomy program 1608 may employ an optical flow technique for determining the ranges of points of the surface of the scan target with respect to the location of the UAV 102, which may include feature matching in some examples. For instance, accurate localization of the UAV 102 for avoiding drift may help to achieve an accurate 3D model that is consistent regarding the determined locations of the identified points of the surface of the 3D model in 3D space.

In addition, the autonomy program 1608 may invoke or otherwise interact with the motion planning program 1606 discussed above with respect to FIG. 16 to determine an optimized motion plan for the UAV 102, such as for moving between poses in the scan plan. For example, the motion planning program 1606 may perform event-driven predictive control to determine a flight path for the UAV 102 that balances vehicle dynamics, obstacle avoidance, and smoothness to produce a flight trajectory for the UAV 102 based on information received from the sensors and pose destinations determined based on the scan plan poses.

As one example, the scanning program 408 may receive scan target information which may include receiving a scan target indication and scan parameters, as indicated at 1716. Based on the received scan target information, the dynamic scan planning program 1704 may use the techniques described above to determine one or more initial poses for conducting an initial rough scan of the indicated scan target. The dynamic scan planning program 1704 may provide the one or more poses as pose information 1720 to the autonomy program 1608 to cause, at least in part, the UAV 102 to navigate to the one or more pose locations for capturing images for determining ranges from the UAV 102 to points on the surface of the scan target. The determined localization information and range determinations may be provided to the 3D model generating and updating program 1702, as indicated at 1714.

The 3D model generating and updating program 1702 may be executed to configure the processor(s) 402 to aggregate range determinations (e.g., also referred to as "depth maps") received from the autonomy program 1608 at 1714 into a volumetric grid that represents implicit surfaces based on the TSDF. As one example, depth maps from stereo paired images (or in other cases, consecutive mono images) may be fused into the 3D model using a volumetric TSDF. For instance, a fusion of depth maps may be performed using a weighted average of individual TSDFs computed for each set of range measurements to determine a 3D point cloud having a known location in 3D space. As discussed above, e.g., with respect to FIGS. 15 and 16, the 3D model may be iteratively updated as the scan plan is executed, and the scan plan may be iteratively updated as the 3D model is updated. Additional specifics of performing TSDF fusion are known in the art and are not described in detail herein. As indicated at 1718, the 3D model generating and updating program 1702 may output the lower-resolution 3D model and subsequent updates to a remote computing device 1718. For example, the controller and/or the mobile device 632 may present an image of the 3D model in a user interface on a display.

The 3D model generating and updating program 1702 may further be executed to determine a difference or similarity between matching features captured in a pair of stereo images for determining where matching pixels in the first image should be relative to the second image. Based on this determination, the 3D model generating and updating program 1702 may adjust a location estimate of where the matching pixels or corresponding features in the two images are relative to each other and relative to the 3D model to improve the depth estimation of the features in the images for inclusion in the 3D model and for making the 3D model more globally consistent. By adjusting the location information for points on the 3D model based on comparing the images, the 3D model generating and updating program 1702 enables real-time drift-free localization.

The 3D model generating and updating program 1702 may be further executed to mathematically optimize the 3D coordinates of points determined for the scan target based on comparing a plurality of the matching images together to successively optimize locations of a plurality of features on the 3D model to generate an assembly from a mathematical expression of the scan target structure to achieve improved accuracy. Thus, the locations of points in the 3D model corresponding to features in the plurality of images may be adjusted relative to each other based on the differences between the plurality of images to improve the global consistency of the 3D model. Accordingly, the 3D model generating and updating program 1702 may compute drift-free poses and a consistent global map that combines the TSDF and comparison and optimization results for refining the locations of points of the 3D model to adjust for possible drift or other inconsistencies.

During the flight, the 3D model generating and updating program 1702 may construct the TSDF 3D model of the scan target. The TSDF extent and resolution may be fixed at the start of execution of the 3D model generating and updating program 1702, and as the UAV 102 performs additional scanning of the scan target, the TSDF may be updated using range data received from the autonomy program 1608, such as by using the best optimized pose at the time.

The 3D model generating and updating program 1702 may perform additional iterations to refine the poses used by the UAV according to the scan plan based on the real-time 3D reconstruction and pose adjustment analysis discussed above. For example, the 3D model generating and updating program 1702 may determine pose refinements for performing additional TSDF fusion based on newly captured images processed by the autonomy program 1608.

The dynamic scan planning program 1704 may be executed to configure the processor(s) 402 to use the 3D model created by the 3D model generating and updating program 1702 to create or update a scan plan including a plurality of poses for capturing images of the surfaces of the specified scan target corresponding to the 3D model for specified parameters, such as capture resolution, distance, angle, overlap, etc. The dynamic scan planning program 1704 may receive an updated 3D model (or at least 3D model update information) as 3D model information 1710 from the 3D model generating and updating program 1702 and may iteratively refine the scan plan as the 3D model is improved in accuracy or otherwise updated during comprehensive scanning of the scan target.

Based on the iteratively updated scan plan, the UAV 102 may achieve coverage of the scan target beyond the typical reliability of a human pilot. The scan plan (e.g., at least the pose information 1720 for the scan plan or updated scan plan) may be provided to the autonomy program 1608 and/or other programs of the vehicle control program 406 to enable motion planning and control of the UAV 102 for assuming the specified poses based on the pose information 1720 corresponding to the current scan plan.

In some examples, based on the differences determined from the image comparisons, a pose transform may be generated that represents a difference between a navigation coordinate frame (e.g., the frame that VIO is in), and the current best estimate of the true navigation frame. This technique may account for drift in the VIO measurement and allows the UAV 102 to correct VIO poses based on the pose transform. Accordingly, by using these techniques, the 3D model generating and updating program 1702 is able to minimize the effects of any drift that may occur in the UAV localization, and thereby increases the accuracy of the locations of the points of the 3D model in 3D space. Further, because the 3D model generating and updating program 1702 continually updates the 3D model as new images are received, and the scan plan is also updated according to the updates to the 3D model, the UAV 102 may autonomously scan an entire scan target (e.g., all exposed sides) even though only one side of the scan target may have been indicated in the received scan target indication information.

In addition, for re-localization between multiple flights of the same UAV, or between flights of two different UAVs scanning different portions of the same scan target, the scanning program 408 may match features for relative pose estimation between image pairs. For instance, the scanning program 408 may match features on two or more separate images to enable the UAV 102 to determine its current location relative to the scan target and the 3D model. As one example, suppose that the UAV 102 returns to the docking station 106 discussed above with respect to FIG. 5 to recharge its battery. Upon completing recharge, the UAV 102 (or another UAV 102) may takeoff and attempt to return to a pose at which the UAV 102 left off. The UAV 102 may compare one or more current images taken prior to restarting the scan plan with one or more previous images taken at the pose at which the UAV 102 was prior to pausing the scan plan to return to the docking station. Based on comparing the current image(s) with the previous images, the UAV 102 may determine a relative pose estimation between image pairs for determining an initial alignment for restarting the scan plan.

In addition, the scanning program 408 may provide pose information and captured images 1722 to the higher-resolution 3D model generating program 1706. The higher-resolution 3D model generating program 1706 may be executed to configure the processor(s) 402 to optimize camera poses and sparse points similarly to the 3D model generating and updating program 1702 but in a batch manner that processes all the received images, or a large number of the received images for considering joint probabilities more intelligently and using high-resolution correspondences between the images for maximizing accuracy.

The higher-resolution 3D model generating program 1706 may be executed to compute depth images from higher-resolution images, e.g., captured by the higher-resolution image sensor 208, and performing a more detailed 3D reconstruction. In some examples, the higher-resolution 3D model generating program 1706 may be executed in-flight, which provides the ability to map surfaces and plan capture paths. For instance, the higher-resolution 3D model generating program 1706 may receive, as input, two images, may compute correspondences and confidence of those correspondences. Each correspondence may be traced back to the original images and these correspondences may be projected into 3D to triangulate range values. For each pass, the higher-resolution 3D model generating program 1706 may trace the correspondences back to the original images and triangulate to obtain the range to features in the images.

The higher-resolution 3D model generating program 1706 may take final optimized poses, calibrations, and high-resolution range images and may fuse these into a point cloud or TSDF. For example, the higher-resolution 3D model generating program 1706 may perform triangulation or may use marching cubes to construct a higher-resolution mesh 3D model from the higher-resolution range images. When TSDF is employed for this process, the TSDF may be a different, higher-resolution function from that employed by the 3D model generating and updating program 1702 discussed above. Accordingly, the higher-resolution 3D model generating program 1706 may generate a higher-resolution mesh 3D model including a plurality of polygons representing the surface geometry of the scan target. Alternatively, in other examples, a point cloud 3D model may be generated.

The higher-resolution 3D model generating program 1706 may be further executed to select views to which to apply scanned images as textures, such as UV textures, to the 3D mesh model generated by the higher-resolution 3D model generating program 1706. Alternatively, in the case that a point cloud model is generated, the scanned images may be used to texture the point cloud. For example, UV mapping may be used for projecting the captured higher-resolution images onto the surface of the higher-resolution 3D model for texture mapping to match the captured images with their correct locations on the 3D model, such as based on respective U and V coordinates, to provide an accurate high-resolution textured 3D model of the scan target.

In the case that a mesh 3D model of the scan target has been generated, the higher-resolution 3D model generating program 1706 may be executed to select a polygon from the mesh, determine one or more captured images that match the location of the selected polygon for determining a texture to apply to the selected polygon, and may apply the determined texture to the face of the selected polygon. These steps may be repeated for each polygon in the mesh 3D model. The higher-resolution 3D model generating program 1706 may also perform a refinement phase for the mesh vertices to line up image content and/or textures between the plurality of polygons and views to make the mesh 3D model more consistent. The higher-resolution 3D model generating program 1706 may output a higher-resolution 3D model as indicated at 1712 that may be fully textured in some examples and useable for various applications, such as viewing the scan target from various angles, performing closeup inspection of the scan target for damage, defects, wear, corrosion, and the like.

Figure 18:
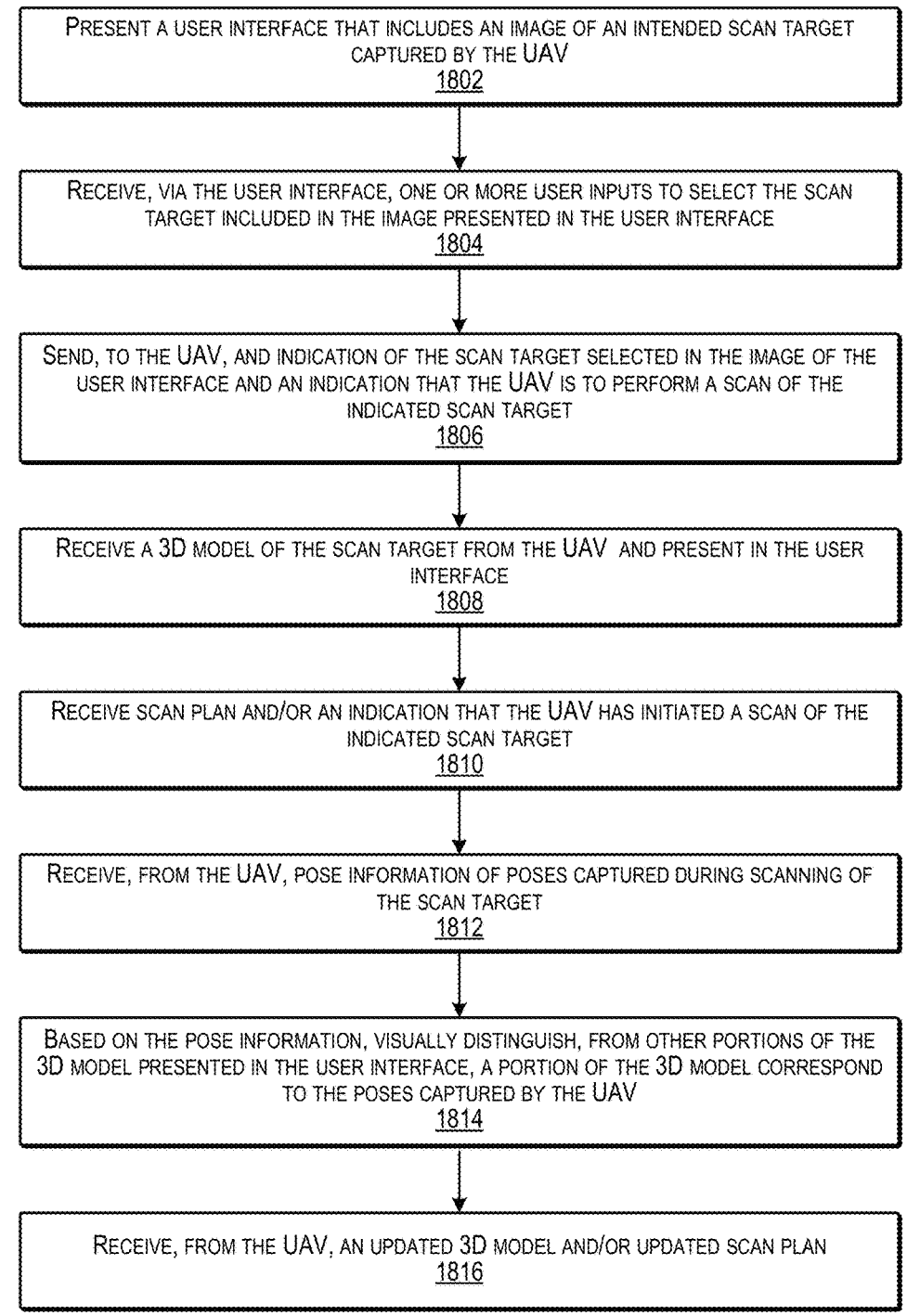
FIG. 18 is a flow diagram illustrating an example process for selecting a scan target according to some implementations.

FIG. 18 is a flow diagram illustrating an example process 1800 for specifying a scan target according to some implementations. In some examples, at least a portion of the process 1800 may be executed by a remote computing device, such as the controller 104 and/or the mobile device 632, e.g., as discussed above with respect to FIGS. 6-12.

At 1802, the remote computing device may present a user interface that includes an image of an intended scan target captured by the UAV 102. As one example, the user may manually navigate the UAV 102 to a location and orientation at which a desired scan target is viewable by at least one image sensor of the UAV 102. Accordingly, an image of the scan target may be presented in the user interface 602 and the user interface 602 may enable selection of the scan target using any of the techniques discussed above with respect to FIGS. 6-10.

At 1804, the remote computing device may receive, via the user interface 602, one or more user inputs to select the scan target included in the image presented in the user interface 602. As one example, the user may manipulate a bounding volume to specify a 3D volume around the desired scan target. As another example, the user may tap on a scan target portion and may rely on the application executing on the remote computing device to perform recognition for selecting the scan target based on recognizing a shape, edges, or the like, of the scan target. As yet another example, the user may use a paint function for selecting the scan target in the user interface. As yet another example, the user may select one or more portions of the scan target in the image, and the remote computing device may perform recognition of the scan target as being a specific structure having a high degree of regularity, such as a transmission tower, jetliner, cell tower, or the like, and may select remaining portions of the scan target based on the recognition.

At 1806, the remote computing device may send, to the UAV 102, an indication of the scan target selected in the image of the user interface 602 and an indication that the UAV 102 is to perform a scan of the indicated scan target.

At 1808, the remote computing device may receive a lower-resolution 3D model of the scan target from the UAV 102 and may present the lower-resolution 3D model in the user interface on the display of the remote computing device. For example, the user may be able to review the lower-resolution 3D model of the scan target to ensure that the UAV 102 will be scanning the portions of the scan target that the user desires to have scanned.

At 1810, the remote computing device may receive a scan plan from the UAV and/or an indication that the UAV 102 has initiated a scan of the indicated scan target. For example, the UAV 102 may navigate autonomously to one or more poses for capturing an initial scan of the scan target, such as for generating a lower-resolution 3D model of the scan target. The user may be able to view the UAVs point of view based on receiving video from one or more of the image sensors on the UAV 100 to during the initial scan of the scan target.

At 1812, the remote computing device may receive, from the UAV 102, pose information of poses captured during scanning of the target.

At 1814, based on the received pose information, the remote computing device may visually distinguish, from other portions of the 3D model presented in the user interface, a portion of the 3D model corresponding to the poses already captured by the UAV 102. For example, the user may be able to monitor the scanning performed by the UAV 102 as the scanning is performed to ensure that all of the desired areas of the scan target are scanned by the UAV 102. The areas captured may be highlighted, painted a different color, outlined, or otherwise visually distinguished from the areas not yet captured.

At 1816, the remote computing device may receive an updated 3D model and/or an updated scan plan. As mentioned previously, in some cases, the UAV may update the 3D model based on additional information obtained during scanning, and further, may update the scan plan based on updates to the 3D model. In some examples, the remote computing device may present the updated 3D model and scan plan in the user interface.

Figure 19:
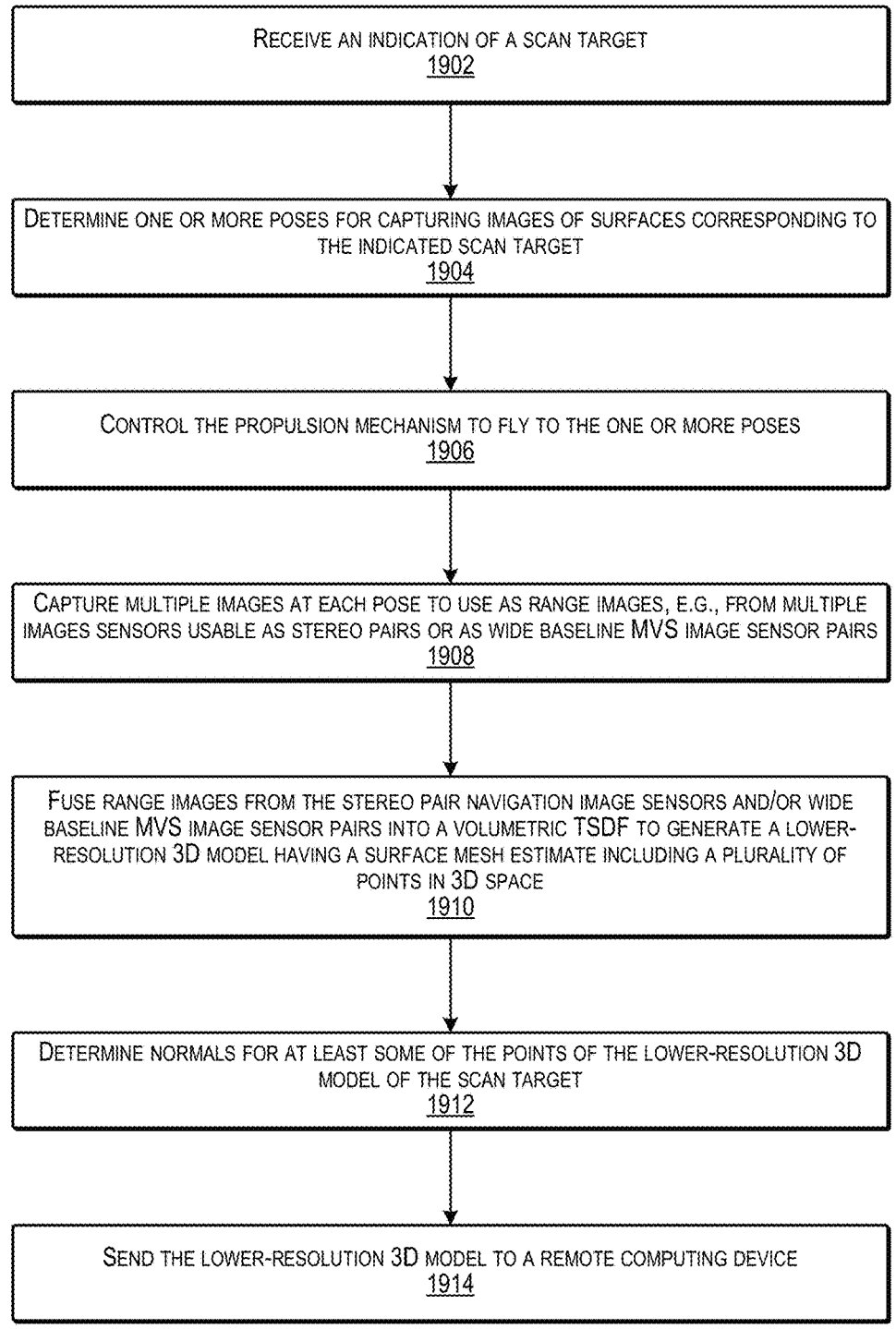
FIG. 19 is a flow diagram illustrating an example process for generating a lower-resolution 3D model of a scan target according to some implementations.

FIG. 19 is a flow diagram illustrating an example process 1900 for generating a lower-resolution 3D model of a scan target according to some implementations. In some examples, at least a portion of the process 1900 may be executed by the UAV 102, such as by executing the scanning program 408 and the vehicle control program 406. Alternatively, in some examples, at least a portion of the process 1900 may be performed by a computing device that is remote from the UAV 102, such as the controller 104 and/or the mobile device 632.

At 1902, the UAV 102 may receive an indication of a scan target. For example, as discussed above, the UAV 102 may receive the indication of the scan target from a remote computing device such as the controller 104 and/or the mobile device 632, or any other computing device able to communicate with the UAV 102.

At 1904, the UAV 102 may determine one or more poses for capturing images of surfaces corresponding to the indicated scan target. For example, in the case that a bounding volume is used to specify the scan target, such as discussed above with respect to FIG. 7, the UAV 102 may determine one or more locations and fields of view at which to capture images of the indicated scan target based on correlating the bounding volume to real-world locations for capturing images of any surfaces within the bounding volume.

At 1906, the UAV 102 may control the propulsion mechanism of the UAV to fly to the determined one or more poses for capturing multiple images at each pose. For instance, the UAV may capture images concurrently with two or more image sensors to enable the image sensors to be used as a stereoscopic rangefinder for determining distances to points on the surfaces of the scan target.

At 1908, the UAV 102 may determine distances from the UAV to the surfaces captured in the images based on determining a parallax between points in the related images. For example, the UAV 102 may employ multi-view stereo analysis of the multiple images for determining the respective distances of the respective points on the surfaces of the scan target.

At 1910, the UAV 102 may generate a lower-resolution 3D model of the scan target services based on the determined distances to points on the surfaces captured in the images. For example, the lower-resolution 3D model may include a plurality of points whose locations in a 3D space may be determined based on image analysis, such as determining a parallax or other differences between two or more images of the points captured using multiple image sensors on the UAV 102. As one example, the lower-resolution 3D model may be determined based in part on application of a truncated signed distance function, or the like.

At 1912, the UAV 102 may determine normals for at least some of the points of the lower-resolution 3D model of the scan target. As one example, the normals may be virtual lines extending outward from the points of the lower-resolution 3D model generally perpendicular to a surface of the scan target on which the respective points are located.

At 1914, the UAV 102 may send the lower-resolution 3D model to a remote computing device. For example, the lower-resolution 3D model may be sent to the controller 104, mobile device 632, or other computing device remote from the UAV 102 that may be in communication with the UAV 102.

Figure 20:
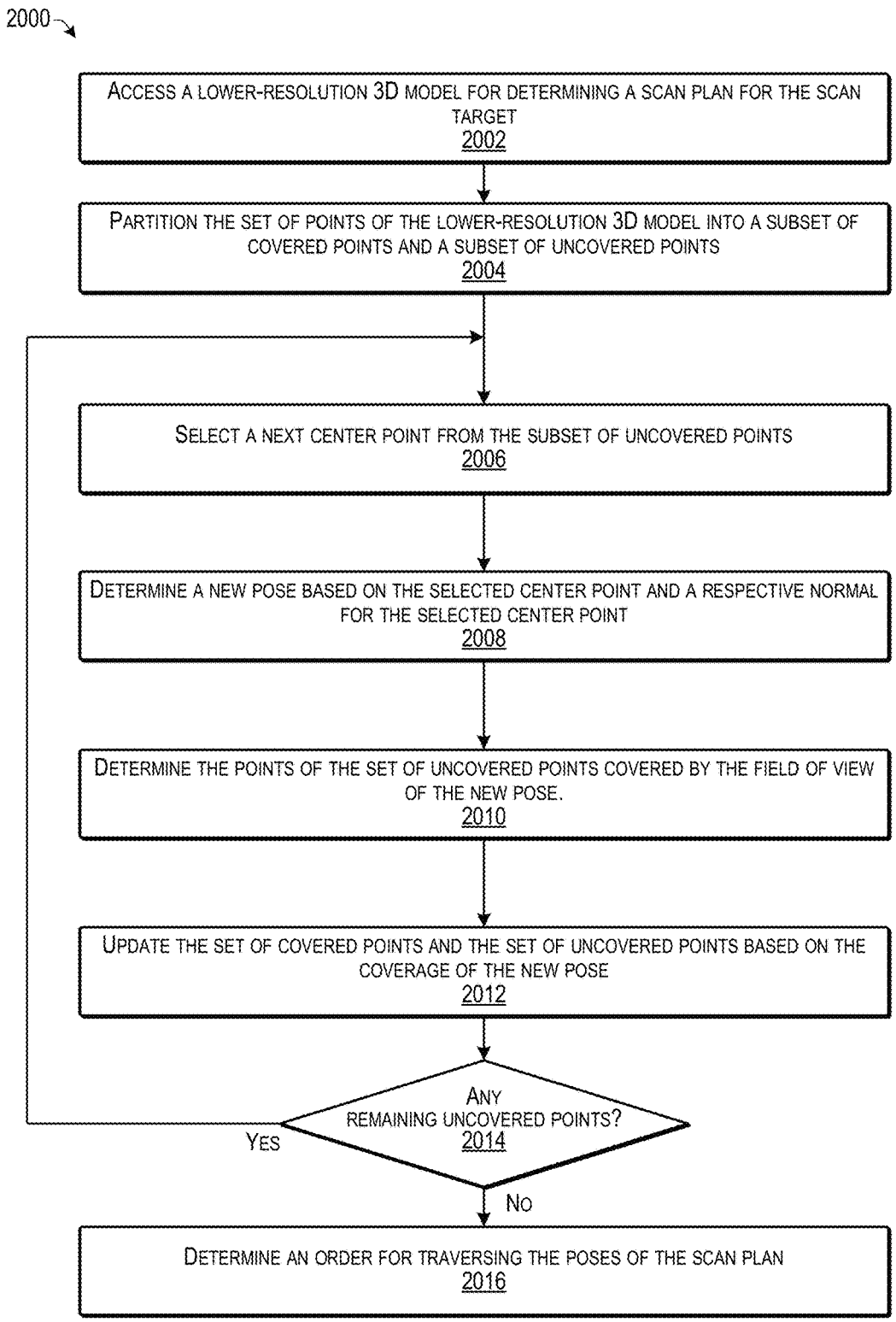
FIG. 20 is a flow diagram illustrating an example process for generating a lower-resolution 3D model of a scan target according to some implementations.

FIG. 20 is a flow diagram illustrating an example process 2000 for generating a lower-resolution 3D model of a scan target according to some implementations. In some examples, at least a portion of the process 2000 may be executed by the UAV 102, such as by executing the scanning program 408 and the vehicle control program 406. Alternatively, in some examples, at least a portion of the process 2000 may be performed by a computing device that is remote from the UAV 102, such as the controller 104 and/or the mobile device 632.

At 2002, the UAV 102 may access a lower-resolution 3D model for determining a scan plan for the scan target. As one example, the UAV 102 may have determined the lower-resolution 3D model as discussed above with respect to FIG. 19. In other examples, the UAV 102 may receive the lower-resolution 3D model such as from a remote computing device or the like.

At 2004, the UAV 102 may partition the set of points of the lower-resolution 3D model into a subset of covered points and a subset of uncovered points. Initially, all the points of the lower-resolution 3D model may be uncovered.

At 2006, the UAV 102 may select a next center point from the subset of uncovered points for determining a new pose. For example, the UAV 102 may select a next point from the set of uncovered points for determining sequential poses based on a distance of the center point from a previously selected center point for a previously determined pose, and further based on an area predicted to be covered by a field of view of the image sensor that will be used to capture an image of the center point and a surrounding area, an expected distance of the UAV 102 from the surface of the scan target on which the point is located when the image will be captured, and a desired amount of overlap between sequential images captured of the scan target. For instance, the center point may be expected to be at an approximate center of the field of view of the image captured for the respective pose.

At 2008, the UAV 102 may determine a new pose based on the selected center point and a respective normal for the selected center point.

At 2010, the UAV 102 may determine the points of the set of uncovered points that will be covered by the field of view of the new pose.

At 2012, the UAV 102 may update the set of covered points and the set of uncovered points based on the coverage of the new pose.

At 2014, the UAV 102 may determine whether there are any remaining uncovered points in the lower-resolution 3D model. If so, the process returns to 2006 to select a next center point. If not, the process proceeds to 2016.

At 2016, when there are no uncovered points remaining, the UAV 102 may determine an order for traversing the poses of the scan plan. For example, various different strategies may be used for traversing the poses of the scan plan such as using a lawnmower traversal path, applying a traveling salesman algorithm, applying a spiral traversal path, or the like.

Figure 21:
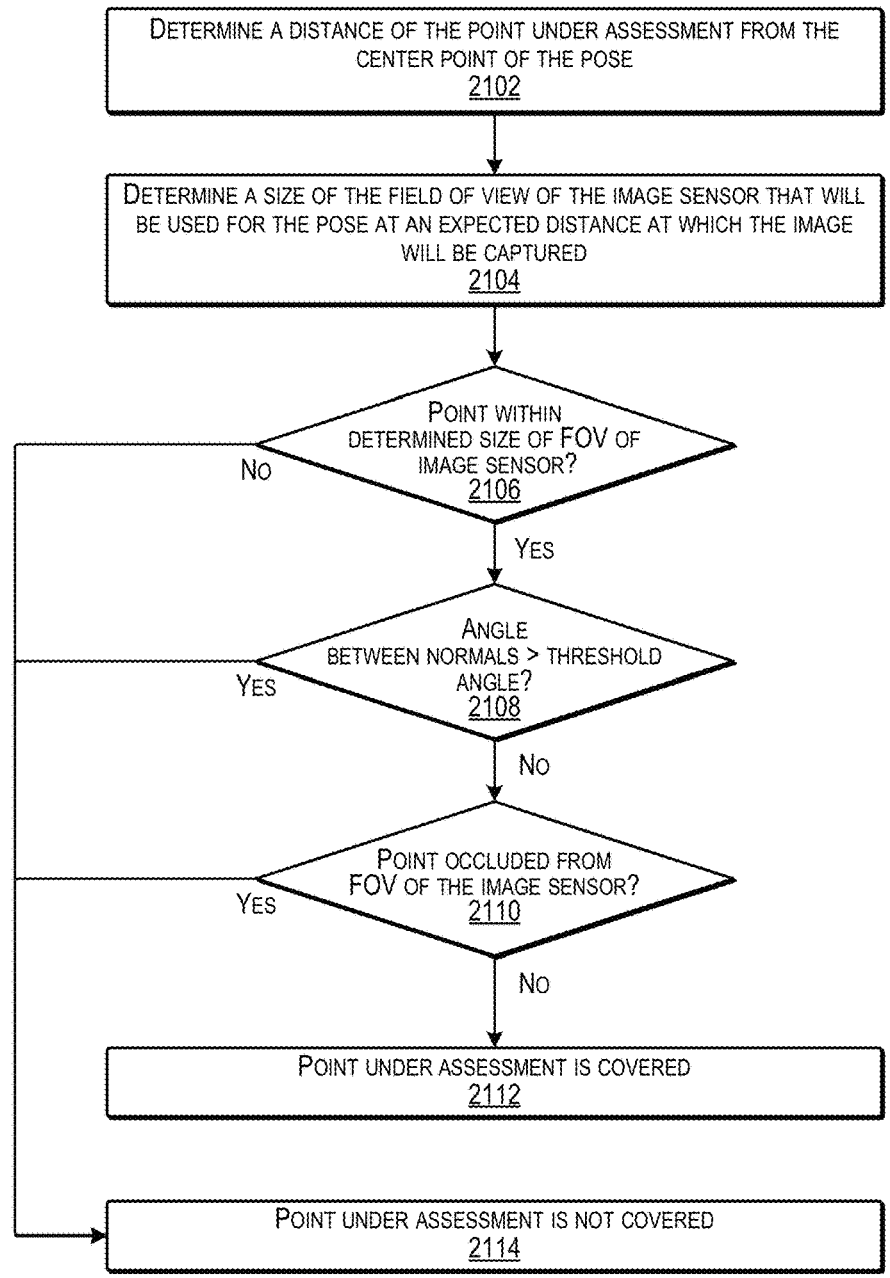
FIG. 21 is a flow diagram illustrating an example process for determining whether a point of a lower-resolution 3D model is covered by a pose according to some implementations.

FIG. 21 is a flow diagram illustrating an example process 2100 for determining whether a point of a lower-resolution 3D model is covered by a pose according to some implementations. In some examples, at least a portion of the process 2100 may be executed by the UAV 102, such as by executing the scanning program 408. Alternatively, in some examples, at least a portion of the process 2100 may be performed by a computing device that is remote from the UAV 102, such as the controller 104 and/or the mobile device 632. In some examples, the process 2100 may correspond to block 2010 of the process 2000 of FIG. 20.

At 2102, the UAV 102 may determine a distance of the point under assessment from the center point of the pose.

At 2104, the UAV 102 may determine a size of the field of view of the image sensor that will be used for the pose at an expected distance at which the image will be captured.

At 2106, the UAV 102 may determine whether the point under assessment is within the determined size of the field of view of the image sensor at the expected distance that will be used for the pose. If so, the process goes to 2108. If not, the process goes to 2114.

At 2108, the UAV 102 may determine whether an angle between the normal of the point under assessment and the normal of the center point for the pose is greater than a threshold angle. For example, if the angle between the two normals is greater than 45 degrees, 60 degrees, or some other threshold amount, then the point under assessment may not be adequately covered even though the point under assessment is within the field of view of the image sensor. If the angle is greater than the threshold, the process goes to 2114. If not, the process goes to 2110.

At 2110, the UAV 102 may determine whether the point under assessment is occluded with respect to the expected location of the image sensor for the pose. As one example, the check for occlusion may be performed using a ray test or the like. If the point under assessment is occluded then the point is not covered and the process goes to 2114. If the point under assessment is not occluded, the process goes to 2112.

At 2112, the UAV 102 may determine, based on the outcomes of blocks 2102-2110, that the point is covered.

At 2114, the UAV 102 may determine, based on the outcomes of blocks 2102-2110, that the point is not covered.

Figure 22:
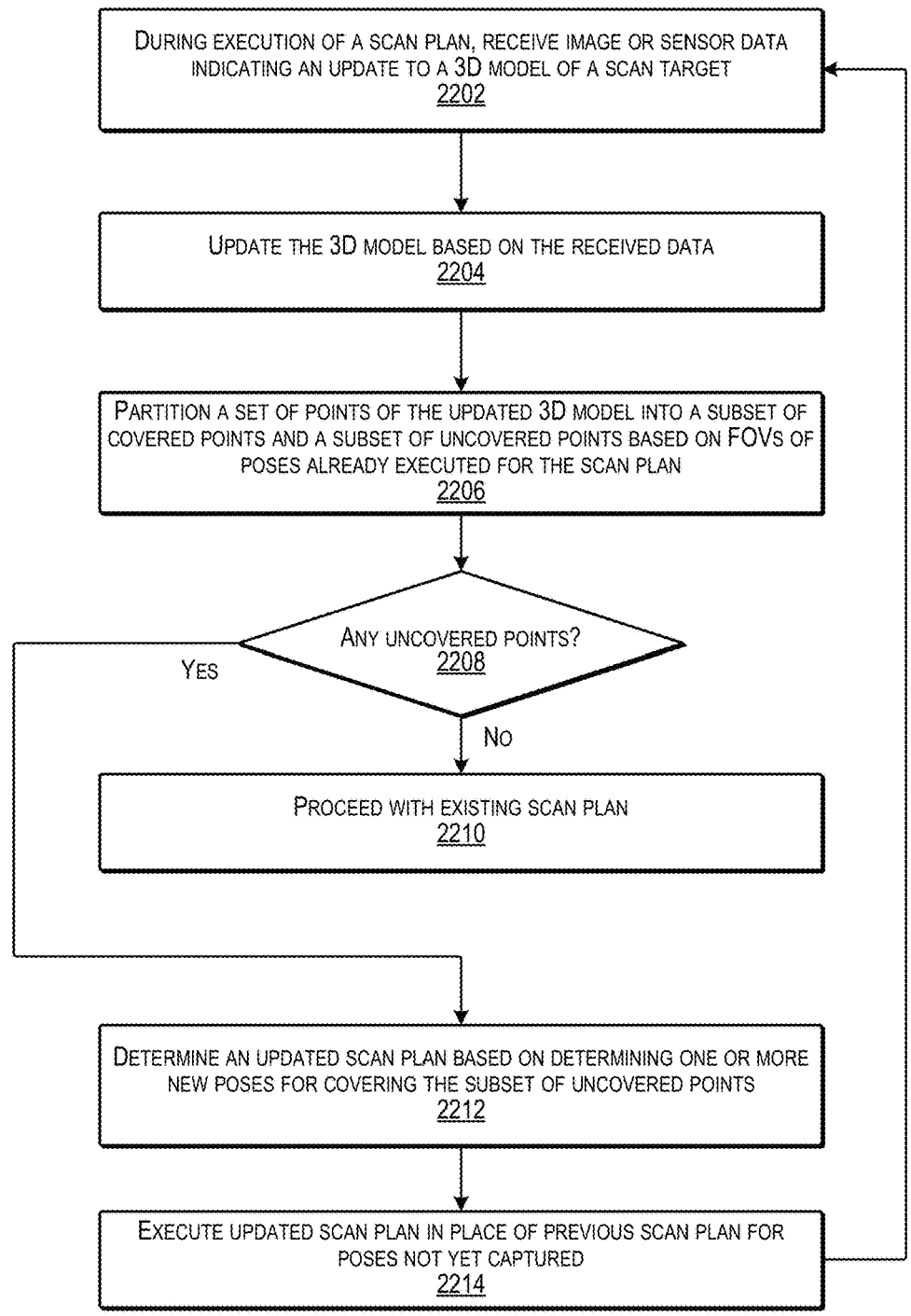
FIG. 22 is a flow diagram illustrating an example process for dynamically updating a scan plan based on an update to a lower-resolution 3D model according to some implementations.

FIG. 22 is a flow diagram illustrating an example process 2200 for dynamically updating a scan plan based on an update to a lower-resolution 3D model according to some implementations. In some examples, at least a portion of the process 2200 may be executed by the UAV 102, such as by executing the scanning program 408. Alternatively, in some examples, at least a portion of the process 2200 may be performed by a computing device that is remote from the UAV 102, such as the controller 104 and/or the mobile device 632.

At 2202, during execution of a scan plan, the UAV 102 may receive image or sensor data indicating an update to a lower-resolution 3D model of a scan target.

At 2204, the UAV 102 may update the lower-resolution 3D model based on the received data.

At 2206, the UAV 102 may partition a set of points of the updated lower-resolution 3D model into a subset of covered points and a subset of uncovered points based on FOVs of poses already executed for the existing scan plan and poses already established by not yet executed for the existing scan plan.

At 2208, the UAV 102 may determine whether there are any uncovered points for the existing scan plan. If so, the process goes to 2212. If not, the process goes to 2210.

At 2210, the UAV 102 may proceed with execution of the existing scan plan.

At 2212, the UAV 102 may determine an updated scan plan based on determining one or more new poses for covering the subset of uncovered points.

At 2214, the UAV 102 may execute the updated scan plan in place of the previous scan plan.

Figure 23:
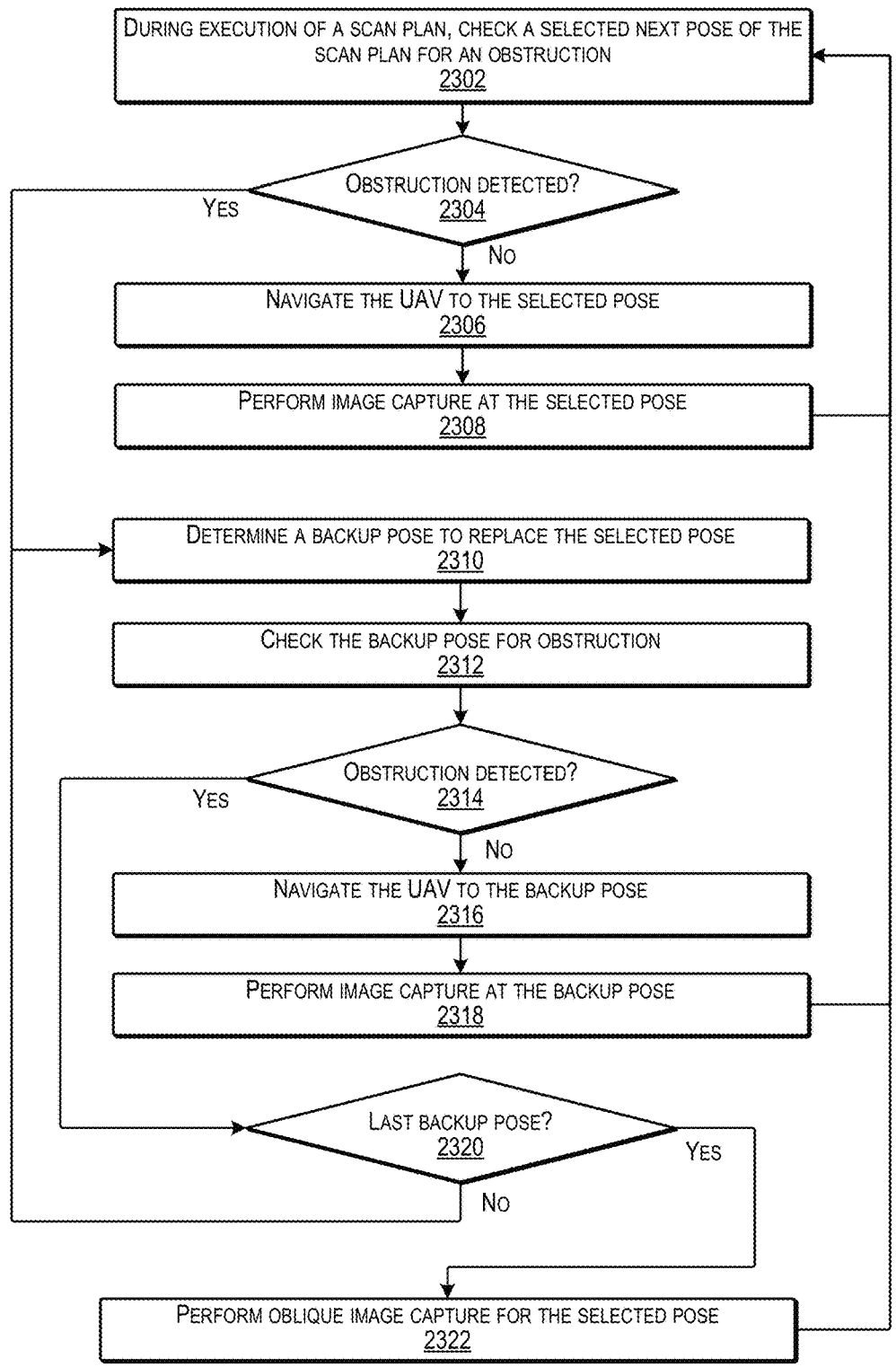
FIG. 23 is a flow diagram illustrating an example process for dynamically adapting a scan plan to an obstruction according to some implementations.

FIG. 23 is a flow diagram illustrating an example process 2300 for dynamically adapting a scan plan to an obstruction according to some implementations. In some examples, at least a portion of the process 2300 may be executed by the UAV 102, such as by executing the scanning program 408 and the vehicle control program 406. Alternatively, in some examples, at least a portion of the process 2300 may be performed by a computing device that is remote from the UAV 102, such as the controller 104 and/or the mobile device 632.

At 2302, during execution of a scan plan, the UAV 102 may check a selected next pose of the scan plan for an obstruction.

At 2304, if an obstruction is detected, the process goes to 2310. If not, the process goes to 2306.

At 2306, the UAV 102 may navigate to the selected pose.

At 2308, the UAV 102 may perform image capture at the selected pose. In some cases, the image capture may be performed orthogonally along the normal of the target point for the pose. In other examples, as mentioned above, the image capture is not limited to orthogonal image capture.

At 2310, when an obstruction was detected for the selected pose, the UAV 102 may determine a backup pose to replace the selected pose.

At 2312, the UAV 102 may check the backup pose for an obstruction.

At 2314, if an obstruction is detected, the process goes 2320. If not, the process goes to 2316.

At 2316, the UAV 102 may navigate to the backup pose.

At 2318, the UAV 102 may perform image capture at the backup pose. For example, the UAV 102 may attempt to capture an image orthogonally along the normal of the target point, such as farther or closer to the desired surface than specified in the distance parameter (GSD). Further, in other examples, the backup pose may be non-orthogonal.

At 2320, the UAV 102 may determine whether there is another backup pose. If so, the process goes to 2310. If not, the process goes to 2322.

At 2322, the UAV 102 may perform an oblique image capture for the selected pose as permitted by the obstruction. For example, the scan parameters may have included a maximum angle away from orthogonal for normal image capture. However, in the case of an obstruction, the parameter may be ignored and capture of the obstructed surface may be performed at an oblique angle that exceeds the maximum angle parameter if no backup pose is able to capture the target point(s).

The process may return to 2302 to determine whether there is an obstruction for the next pose in the scan plan. For example, once the scan corresponding to the selected pose has been performed, either from the original pose or a backup pose, or obliquely from another position (e.g., a current position), the UAV 102 may continue the scan plan with a next pose for processing.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. An unmanned aerial vehicle (UAV) comprising:
   one or more image sensors;
   a propulsion mechanism; and
   one or more processors configured by executable instructions to perform operations comprising:
      receiving, by the one or more processors, from a computing device, an indication of a scan target;
      controlling, by the one or more processors, the propulsion mechanism of the UAV to cause the UAV to assume a plurality of positions for directing a field of view of the one or more image sensors based on the indication of the scan target;
      capturing, using the one or more image sensors, a plurality of images from different respective positions of the plurality of positions;
      determining a three-dimensional (3D) model based on distances to one or more surfaces of the scan target determined based on the plurality of images, the 3D model including a plurality of points corresponding to one or more surfaces of the scan target;
      accessing the 3D model including the plurality of points;
      determining, based on the 3D model, a scan plan for scanning at least a portion of the scan target, the scan plan including a plurality of poses for the UAV to assume to capture, using one or more image sensors, images of the scan target, wherein a respective pose of the scan plan is determined based on a respective point of the 3D model;
      capturing, with the one or more image sensors, while the UAV is in flight, one or more images of the scan target from one or more poses of the plurality of poses;
      determining, while the UAV is in flight, an update to the 3D model based at least in part on the one or more images; and
      based at least in part on the update to the 3D model, updating the scan plan while the UAV is in flight.

2. The UAV as recited in claim 1, the operations further comprising updating, by the one or more processors of the UAV, the scan plan in real time.

3. The UAV as recited in claim 1, the operations further comprising receiving, as the indication of the scan target, at least one of:
  an indication of a 2D shape forming a boundary within which at least a portion the scan target is located;
  an indication of a shape corresponding to a surface of the scan target; or
  an indication of a volume within which at least a portion of the scan target is located.

4. The UAV as recited in claim 1, wherein the respective pose is determined to be along a respective normal for the respective point at a distance from the respective point corresponding to a scanning distance parameter specified for the scan plan.

5. The UAV as recited in claim 1, the operation of determining the scan plan further comprising:
  partitioning the points of the 3D model into a subset of covered points and a subset of uncovered points;
  determining a next pose for the scan plan by selecting a center point for the next pose from the subset of uncovered points;
  determining points of the 3D model covered by a field of view of the next pose; and
  updating the subset of covered points and the subset of uncovered points based on determining the points of the 3D model covered by the field of view of the next pose.

6. The UAV as recited in claim 1, the operations further comprising:
  detecting an obstruction to capturing an image for at least one pose of the plurality of poses; and
  capturing an image of a surface of the scan target corresponding to the at least one pose by performing oblique image capture.

7. A method comprising:
  accessing, by one or more processors of an unmanned aerial vehicle (UAV), a three-dimensional (3D) model including a plurality of points corresponding to one or more surfaces of a scan target;
  determining, by the one or more processors, based on the 3D model, a scan plan for scanning at least a portion of the scan target, the scan plan including a plurality of poses for the UAV to assume to capture, using one or more image sensors, images of the scan target, wherein a respective pose of the scan plan is determined based on a respective point of the 3D model;
  capturing, by the one or more processors, with the one or more image sensors, while the UAV is in flight, one or more images of the scan target from one or more poses of the plurality of poses;
  determining, by the one or more processors, while the UAV is in flight, an update to the 3D model based at least in part on the one or more images; and
  based at least in part on the update to the 3D model, updating the scan plan, by the one or more processors, while the UAV is in flight.

8. The method as recited in claim 7, wherein at least one of determining the update to the 3D model or updating the scan plan is performed by the one or more processors onboard the UAV in real time.

9. The method as recited in claim 7, further comprising receiving, by the one or more processors, from a computing device, an indication of the scan target, the indication of the scan target comprising at least one of:
  an indication of a 2D shape forming a boundary within which at least a portion the scan target is located;
  an indication of a shape corresponding to a surface of the scan target; or
  an indication of a volume within which at least a portion of the scan target is located.

10. The method as recited in claim 7, further comprising:
  receiving, by the one or more processors, from a computing device, an indication of the scan target;
  controlling, by the one or more processors, the propulsion mechanism of the UAV to cause the UAV to assume one or more positions for directing a field of view of the one or more image sensors based on the indication of the scan target, wherein the one or more image sensors include a plurality of lower resolution image sensors and at least one higher resolution image sensor;
  capturing, using the plurality of lower-resolution image sensors, at least one image from the one or more positions; and
  determining the 3D model based on distances to one or more surfaces of the scan target determined based on the at least one image captured using the lower-resolution image sensors, the 3D model initially being a lower-resolution 3D model including the plurality of points corresponding to the one or more surfaces of the scan target.

11. The method as recited in claim 10, wherein determining the 3D model based on distances to one or more surfaces of the scan target determined based on the at least one image comprises performing Truncated Signed Distance Function (TSDF) fusion for at least two images captured from the one or more positions.

12. The method as recited in claim 7, wherein the updated scan plan includes at least one of an additional pose or updated pose, the method further comprising controlling, by the one or more processors, a propulsion mechanism of the UAV to cause the UAV to fly to the at least one additional pose or updated pose.

13. The method as recited in claim 7, the determining the scan plan further comprising:
  partitioning the points of the 3D model into a subset of covered points and a subset of uncovered points;
  determining a next pose for the scan plan by selecting a center point for the next pose from the subset of uncovered points;
  determining points of the 3D model covered by a field of view of the next pose; and
  updating the subset of covered points and the subset of uncovered points based on determining the points of the 3D model covered by the field of view of the next pose.

14. The method as recited in claim 7, further comprising:
  detecting an obstruction to capturing an image for at least one pose of the plurality of poses; and
  capturing an image of a surface of the scan target corresponding to the at least one pose by performing an oblique image capture.

15. An unmanned aerial vehicle (UAV) comprising
  one or more image sensors;
  a propulsion mechanism; and
  one or more processors configured by executable instructions to perform operations comprising:
    determining, by the one or more processors, based on a 3D model including a plurality of points corresponding to a scan target, a scan plan for scanning at least a portion of the scan target, the scan plan including a plurality of poses for the UAV to assume to capture images of the scan target;

capturing, by the one or more processors, with the one or more image sensors, one or more images of the scan target from one or more poses of the plurality of poses;

determining, by the one or more processors, an update to the 3D model based at least in part on the one or more images; and updating the scan plan, by the one or more processors, based at least in part on the update to the 3D model.

16. The UAV as recited in claim 15, the operations further comprising updating the scan plan, by the one or more processors, based at least in part on the update to the 3D model, while the UAV is in flight.

17. The UAV as recited in claim 16, the operations further comprising updating, by the one or more processors of the UAV, the scan plan in real time.

18. The UAV as recited in claim 15, the operations further comprising determining, by the one or more processors, the update to the 3D model while the UAV is in flight.

19. The UAV as recited in claim 15, the operations further comprising receiving, by the one or more processors, from a computing device, an indication of the scan target, the indication of the scan target comprising at least one of:

an indication of a 2D shape forming a boundary within which at least a portion the scan target is located;

an indication of a shape corresponding to a surface of the scan target; or an indication of a volume within which at least a portion of the scan target is located.

20. The UAV as recited in claim 15, the operations further comprising:

receiving, by the one or more processors, from a computing device, an indication of the scan target;

controlling, by the one or more processors, the propulsion mechanism of the UAV to cause the UAV to assume one or more positions for directing a field of view of the one or more image sensors based on the indication of the scan target, wherein the one or more image sensors include a plurality of lower resolution image sensors and at least one higher resolution image sensor;

capturing, using the plurality of lower-resolution image sensors, at least one image from the one or more positions; and determining the 3D model based on distances to one or more surfaces of the scan target determined based on the at least one image captured using the lower-resolution image sensors, the 3D model initially being a lower-resolution 3D model including the plurality of points corresponding to the one or more surfaces of the scan target.

* * * * *